United States Patent
Choi et al.

(10) Patent No.: US 12,219,174 B2
(45) Date of Patent: Feb. 4, 2025

(54) ENCODING METHOD AND DEVICE THEREOF, AND DECODING METHOD AND DEVICE THEREOF

(71) Applicant: SAMSUNG ELECTRONICS CO., LTD., Suwon-si (KR)

(72) Inventors: Narae Choi, Suwon-si (KR); Minsoo Park, Suwon-si (KR); Minwoo Park, Suwon-si (KR); Anish Tamse, Suwon-si (KR); Seungsoo Jeong, Suwon-si (KR); Kiho Choi, Suwon-si (KR); Woongil Choi, Suwon-si (KR); Yinji Piao, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/605,375

(22) Filed: Mar. 14, 2024

(65) Prior Publication Data
US 2024/0223803 A1    Jul. 4, 2024

Related U.S. Application Data

(63) Continuation of application No. 17/375,769, filed on Jul. 14, 2021, now Pat. No. 11,962,800, which is a
(Continued)

(51) Int. Cl.
*H04N 19/593*    (2014.01)
*H04N 19/11*    (2014.01)
(Continued)

(52) U.S. Cl.
CPC .......... *H04N 19/593* (2014.11); *H04N 19/11* (2014.11); *H04N 19/132* (2014.11);
(Continued)

(58) Field of Classification Search
CPC .... H04N 19/105; H04N 19/11; H04N 19/117; H04N 19/132; H04N 19/136;
(Continued)

(56) References Cited

U.S. PATENT DOCUMENTS

| 10,992,933 B2 | 4/2021 | Choi et al. |
| 11,218,706 B2 | 1/2022 | Rath et al. |

(Continued)

FOREIGN PATENT DOCUMENTS

| EP | 3 627 836 A1 | 3/2020 |
| JP | 2018-152852 A | 9/2018 |

(Continued)

OTHER PUBLICATIONS

B. Bross et al., "Versatile Video Coding (Draft 2)", Joint Video Experts Team (JVET) of ITU-T SG 16 WP 3 and ISO/IEC JTC 1/SC 29/WG 11, 11th Meeting, JVET-K1001-v5, July 10-18, 208, XP030193566, (130 pages).

(Continued)

*Primary Examiner* — Kathleen M Walsh
(74) *Attorney, Agent, or Firm* — Sughrue Mion, PLLC

(57) ABSTRACT

A video decoding method includes predicting a current block according to an intra prediction mode of the current block, determining whether to apply position dependent intra prediction filtering to the current block according to the intra prediction mode of the current block, when the position dependent intra prediction filtering is applied to the current block, determining at least one of an upper reference sample, a left reference sample, an upper weight, and a left weight for the position dependent intra prediction filtering of a current sample of the current block according to the intra prediction mode of the current block, and applying the position dependent intra prediction filtering to the current sample of the current block according to at least one of the
(Continued)

upper reference sample, the left reference sample, the upper weight, and the left weight.

4 Claims, 27 Drawing Sheets

Related U.S. Application Data continuation of application No. PCT/KR2020/000693, filed on Jan. 14, 2020.

(60) Provisional application No. 62/811,665, filed on Feb. 28, 2019, provisional application No. 62/792,288, filed on Jan. 14, 2019.

(51) Int. Cl.
| | | |
|---|---|---|
| *H04N 19/132* | (2014.01) | |
| *H04N 19/136* | (2014.01) | |
| *H04N 19/176* | (2014.01) | |
| *H04N 19/82* | (2014.01) | |

(52) U.S. Cl.
CPC ......... *H04N 19/136* (2014.11); *H04N 19/176* (2014.11); *H04N 19/82* (2014.11)

(58) Field of Classification Search
CPC .. H04N 19/159; H04N 19/176; H04N 19/593; H04N 19/82
USPC .................................................. 375/240.12
See application file for complete search history.

(56) References Cited

U.S. PATENT DOCUMENTS

| | | |
|---|---|---|
| 2014/0269914 A1 | 9/2014 | Oh et al. |
| 2018/0139453 A1 | 5/2018 | Park et al. |
| 2018/0184083 A1 | 6/2018 | Panusopone et al. |
| 2018/0316918 A1 | 11/2018 | Drugeon et al. |
| 2018/0367814 A1 | 12/2018 | Seregin et al. |
| 2020/0014922 A1* | 1/2020 | Ramasubramonian ..................... H04N 19/91 |
| 2020/0053385 A1 | 2/2020 | Lee |
| 2020/0137404 A1 | 4/2020 | Yoo et al. |
| 2020/0195921 A1 | 6/2020 | Van der Auwera et al. |
| 2021/0344931 A1* | 11/2021 | Filippov .............. H04N 19/182 |
| 2022/0124368 A1 | 4/2022 | Filippov et al. |
| 2023/0056139 A1 | 2/2023 | Piao et al. |

FOREIGN PATENT DOCUMENTS

| | | | |
|---|---|---|---|
| KR | 10-2014-0057665 A | 5/2014 | |
| KR | 10-2017-0128389 A | 11/2017 | |
| KR | 10-2018-0037599 A | 4/2018 | |
| KR | 10-2018-0107097 A | 10/2018 | |
| WO | 2018/062880 A1 | 4/2018 | |
| WO | 2018/124627 A1 | 7/2018 | |
| WO | 2018/231488 A1 | 12/2018 | |
| WO | 2018/236051 A1 | 12/2018 | |
| WO | 2020/130889 A1 | 6/2020 | |

OTHER PUBLICATIONS

Communication dated May 11, 2020, issued by the International Searching Authority in counterpart International Application No. PCT/KR2020/000693 (PCT/ISA/220, 210, 237).
Communication dated Nov. 4, 2022 issued by the European Patent Office in European Patent Application No. 20742059.7.
G. Van der Auwera et al., "Extension of Simplified PDPC to Diagonal Intra Modes", Joint Video Experts Team (JVET) of ITU-T SG 16 WP 3 and ISO/IEC JTC 1/SC 29/WG 11, 10th Meething, JVET-J0069, Apr. 10-20, 2018, XP030248257 & XP030248258, (11 pages total).
J. Lee et al., "CE3-related: Simplification of PDPC", Joint Video Experts Team (JVET) of ITU-T SG 16 WP 3 and ISO/IEC JTC 1/SC 29/WG 11, 12th Meeting, JVET-L0152-v3, Oct. 3-12, 2018, XP030195186 & XP030195185, (15 total pages).
Office Action dated Feb. 9, 2023, issued by Indian Patent Office for Indian Application No. 202127033898.
Office Action issued on Jan. 26, 2024 by the Korean Patent Office in corresponding KR Patent Application No. 10-2021-7021687.
Xin Zhao et al., "EE1 related: Simplification and extension of PDPC", Joint Video Exploration Team (JVET) of ITU-T SG 16 WP 3 and ISO/IEC JTC 1/SC 29/WG 11, JVET-H0057_r1, Oct. 18-24, 2017, 3 pages.
Office Action issued on Aug. 13, 2024 by the Chinese Patent Office in corresponding CN Patent Application No. 202080021223.X.

* cited by examiner

FIG. 3
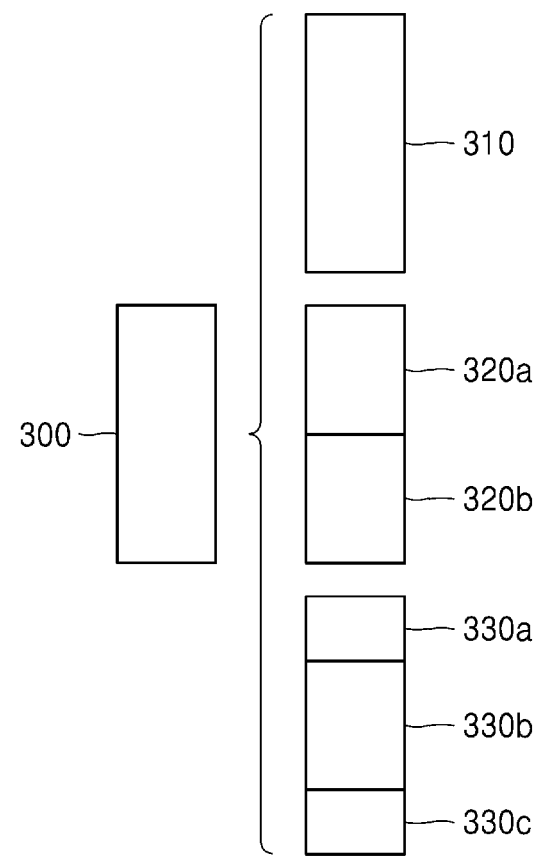
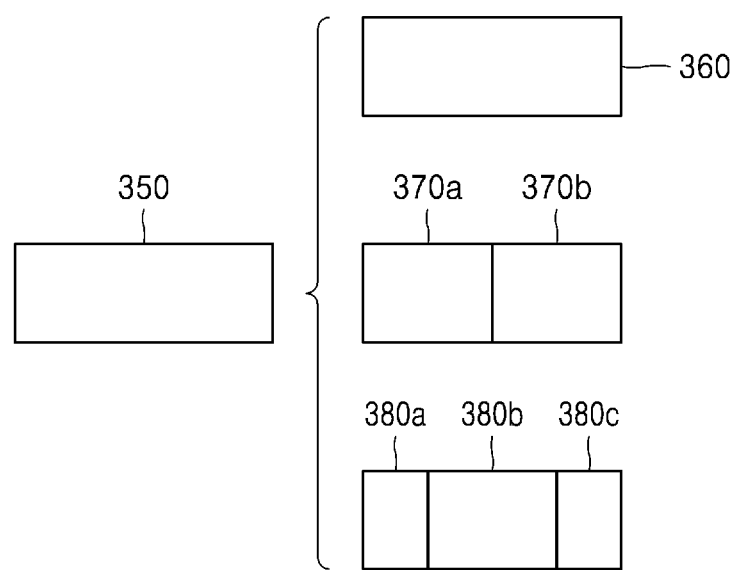

FIG. 12

| BLOCK SHAPE<br>DEPTH | 0: SQUARE | 1: NS_VER | 2: NS_HOR |
|---|---|---|---|
| DEPTH D | 1200 | 1210 | 1220 |
| DEPTH D+1 | 1202 | 1212 | 1222 |
| DEPTH D+2 | 1204 | 1214 | 1224 |
| ... | ... | ... | ... |

ENCODING METHOD AND DEVICE THEREOF, AND DECODING METHOD AND DEVICE THEREOF

CROSS-REFERENCE TO RELATED APPLICATIONS

This application is a continuation application of U.S. application Ser. No. 17/375,769, filed Jul. 14, 2021, which claims priority from International Patent Application No. PCT/KR2020/000693 filed on Jan. 14, 2020, which claims priority from U.S. Provisional Application No. 62/792,228 filed on Jan. 14, 2019 and U.S. Provisional Application No. 62/811,665 filed on Feb. 28, 2019, in the United States Patent and Trademark Office, the disclosures of which are incorporated herein by reference in their entireties.

BACKGROUND

1. Field

The present disclosure relates to a video encoding method and a video decoding method, and more particularly, to a video encoding method and a video decoding method performed using various intra coding tools.

2. Description of the Related Art

A large amount of data is required when a high-quality video is encoded. However, there is a limit in available bandwidth for transmitting video data, and thus, a data rate to be applied to transmission of the video data may be limited. Accordingly, in order to efficiently transmit the video data, there is a demand for video data encoding and decoding methods with minimal degradation of image quality and increased compression rates.

Video data may be compressed by removing spatial redundancy and temporal redundancy between pixels. Pixels adjacent to each other generally have common characteristics, and thus, in order to remove redundancy between the adjacent pixels, encoding information is transmitted in a data unit consisting of pixels.

Pixel values of the pixels included in the data unit are not directly transmitted, and a method required to obtain the pixel values is transmitted. A prediction method of predicting a pixel value similar to an original value is determined for each data unit, and encoding information with respect to the prediction method is transmitted from an encoder to a decoder. Also, because a prediction value is not entirely equal to the original value, residual data of a difference between the original value and the prediction value is transmitted from the encoder to the decoder.

As the accuracy of prediction increases, encoding information required to specify a prediction method increases but a size of residual data decreases. Thus, the prediction method is determined based on the encoding information and the size of the residual data. In particular, data units split from a picture have various sizes, and as a size of a data unit increases, the likelihood that the accuracy of prediction will decrease increases whereas encoding information decreases. Thus, a size of a block is determined in accordance with characteristics of the picture.

Also, prediction methods include intra prediction and inter prediction. The intra prediction refers to a method of predicting pixels of a block from adjacent pixels of the block. The inter prediction refers to a method of predicting pixels by referring to pixels of another picture, referenced by a picture including a block. Thus, spatial redundancy is removed according to the intra prediction, and temporal redundancy is removed according to the inter prediction.

As the number of prediction methods increases, a size of encoding information for indicating the prediction methods increases. Thus, the size of the encoding information to be applied to the block may be reduced by predicting the encoding information from another block.

A loss of video data to the extent that human eyes cannot recognize the loss is allowed, and thus, the amount of residual data may be reduced by performing lossy compression on the residual data in transformation and quantization processes.

SUMMARY

Provided is a video encoding method according to various intra coding tools. Also provided is a video decoding method according to various intra coding tools. Also provided is a computer-readable recording medium having recorded thereon a program for executing a video encoding method and a video decoding method according to an embodiment of the present disclosure on a computer.

In the present disclosure, there is provided a video decoding method including predicting a current block according to an intra prediction mode of the current block, determining whether to apply position dependent intra prediction filtering to the current block according to the intra prediction mode of the current block, when the position dependent intra prediction filtering is applied to the current block, determining at least one of an upper reference sample, a left reference sample, an upper weight, and a left weight for the position dependent intra prediction filtering of a current sample of the current block according to the intra prediction mode of the current block, and applying the position dependent intra prediction filtering to the current sample of the current block according to at least one of the upper reference sample, the left reference sample, the upper weight, and the left weight.

In the present disclosure, there is provided a video decoding method including obtaining, from a bitstream, split information indicating whether a current block predicted according to an intra prediction tool is split into a plurality of partitions, when the split information indicates that the current block is split into the plurality of partitions, splitting the current block into the plurality of partitions, according to split mode information indicating a split mode of the current block obtained from the bitstream, determining intra prediction modes of the plurality of partitions, according to intra prediction mode information obtained from the bitstream, and predicting the plurality of partitions, according to the intra prediction modes of the plurality of partitions.

In the present disclosure, there is provided a video decoding apparatus including a memory configured to store one or more instructions for performing the video decoding method, and a processor configured to execute the one or more instructions. Also, there is provided a computer-readable recording medium having recorded thereon a program including one or more instructions for executing the video decoding method.

In the present disclosure, there is provided a video encoding method including predicting a current block according to each of a plurality of intra prediction modes, determining whether to apply position dependent intra prediction filtering to the current block according to each of the plurality of intra prediction modes, applying the position dependent intra prediction filtering to the current block for an intra prediction mode to which the position dependent intra prediction filtering is applied, and determining an intra prediction mode of the current block according to a prediction result according to each intra prediction mode to which the position dependent intra prediction filtering is applied.

In the present disclosure, there is provided a video encoding method including determining whether a current block predicted according to an intra prediction tool is split into a plurality of partitions, when the current block is split into the plurality of partitions, determining a split mode of the current block, splitting the current block into the plurality of partitions, according to the split mode, determining intra prediction modes of the plurality of partitions, and outputting a bitstream including split information indicating whether the current block is split into the plurality of partitions, split mode information indicating the split mode of the current block, and intra prediction mode information indicating the intra prediction modes of the plurality of partitions.

In the present disclosure, there is provided a video encoding apparatus including a memory configured to store one or more instructions for performing the video encoding method, and a processor configured to execute the one or more instructions. Also, there is provided a computer-readable recording medium having recorded thereon a program including one or more instructions for executing the video encoding method.

The technical problems of the present embodiment are not limited to the aforementioned technical problems, and other unstated technical problems may be inferred from embodiments below.

According to various intra prediction modes described in the present disclosure, video coding efficiency may be improved. Hereinafter, detailed descriptions of effects of the invention will be provided with reference to the specification and the drawings.

BRIEF DESCRIPTION OF DRAWINGS

FIG. 3 illustrates a process of determining at least one coding unit by splitting a non-square coding unit, according to an embodiment.

FIG. 12 illustrates a process of determining a depth of a coding unit as a shape and a size of the coding unit change, when the coding unit is recursively split such that a plurality of coding units are determined, according to an embodiment.

DETAILED DESCRIPTION

Figure 1A:
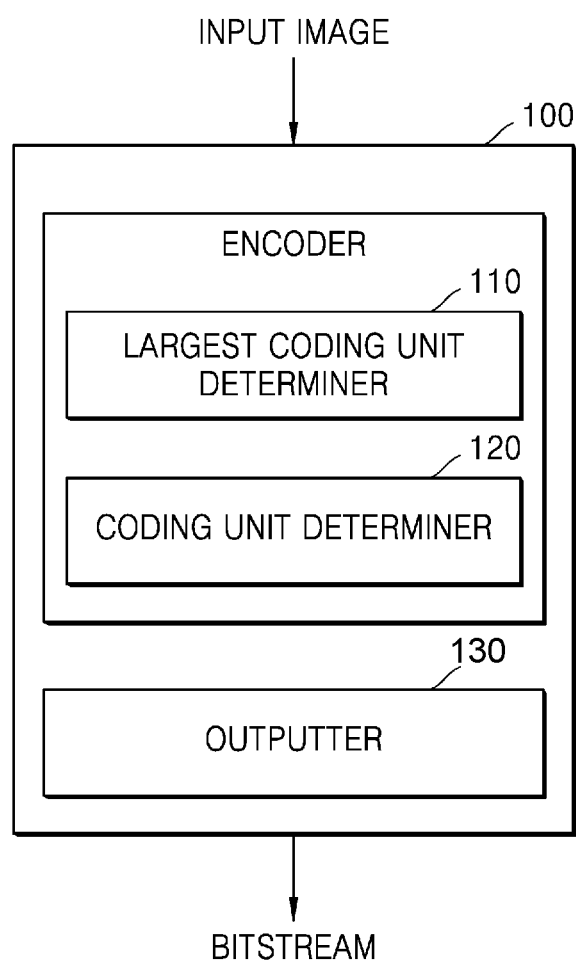
FIG. 1A is a block diagram illustrating an image encoding apparatus based on coding units having a tree structure, according to an embodiment of the present invention.

In the present disclosure, there is provided a video decoding method including predicting a current block according to an intra prediction mode of the current block, determining whether to apply position dependent intra prediction filtering to the current block according to the intra prediction mode of the current block, when the position dependent intra prediction filtering is applied to the current block, determining at least one of an upper reference sample, a left reference sample, an upper weight, and a left weight for the position dependent intra prediction filtering of a current sample of the current block according to the intra prediction mode of the current block, and applying the position dependent intra prediction filtering to the current sample of the current block according to at least one of the upper reference sample, the left reference sample, the upper weight, and the left weight.

Advantages and features of embodiments and methods of accomplishing the same may be understood more readily by reference to the embodiments and the accompanying drawings. In this regard, the present invention may have different forms and should not be construed as being limited to the embodiments set forth herein. Rather, these embodiments are provided so that this disclosure will be thorough and complete and will fully convey the concept of the invention to one of ordinary skill in the art.

The terms used in the specification will be briefly defined, and the embodiments will be described in detail.

Although the terms used in the specification have been described in general terms that are currently used in consideration of the functions referred to in the present invention, the terms are intended to encompass various other terms depending on the intent of those skilled in the art, precedents, or the emergence of new technology. Also, some of the terms used herein may be arbitrarily chosen by the applicant. In this case, these terms are defined in detail below. Accordingly, the terms used in the present invention are not defined based on the meaning of the term, not on the name of a simple term, but on the contents throughout the present invention.

In the following specification, the singular forms include plural forms unless the context clearly indicates otherwise.

When a part "includes" or "comprises" an element, unless there is a particular description contrary thereto, the part may further include other elements, not excluding the other elements. The term "unit" used herein refers to a software component or a hardware component such as a field-programmable gate array (FPGA) or an application-specific integrated circuit (ASIC), which performs certain tasks. However, the "unit" is not limited to software or hardware. The "unit" may be formed so as to be in an addressable storage medium, or may be configured to operate one or more processors. Thus, for example, the term "unit" may include components such as software components, object-oriented software components, class components, and task components, processes, functions, attributes, procedures, subroutines, segments of program code, drivers, firmware, microcode, circuits, data, databases, data structures, tables, arrays, and variables. A function provided by the components and "units" may be combined into fewer components and "units", or may be divided into additional components and "units".

The term "current block" refers to one of a coding unit, a prediction unit, and a transform unit which are currently to be encoded or decoded. Also, the term "lower block" refers to a data unit split from the "current block". The term "upper block" refers to a data unit including the "current block".

Also, the term "sample" used herein refers to data that is allocated to a sampling location of an image and is to be processed. For example, pixel values of an image in a spatial domain or transform coefficients in a transform domain may be samples. A unit including at least one sample may be defined as a block.

Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, all of a, b, and c, or any variations of the aforementioned examples.

Embodiments of the present disclosure will now be described more fully with reference to the accompanying drawings for one of ordinary skill in the art to be able to perform the embodiments without any difficulty. Also, portions irrelevant to the descriptions of the embodiments will be omitted in the drawings for clear descriptions of the embodiments.

FIG. 1A is a block diagram illustrating an image encoding apparatus 100 based on coding units having a tree structure, according to an embodiment of the present disclosure.

The image encoding apparatus 100 includes a largest coding unit determiner 110, a coding unit determiner 120, and an outputter 130.

The largest coding unit determiner 110 splits a picture or a slice included in the picture into a plurality of largest coding units according to a size of a largest coding unit. The largest coding unit may be a data unit having a size of 32×32, 64×64, 128×128, 256×256, or the like, wherein a shape of the data unit is a square shape having a width and length in powers of 2. The largest coding unit determiner 110 may provide largest coding unit size information indicating the size of the largest coding unit to the outputter 130. The outputter 130 may add the largest coding unit size information to a bitstream.

The coding unit determiner 120 determines a coding unit by splitting the largest coding unit. The coding unit may be determined with a largest size and a depth. The depth may be defined as the number of times the coding unit is spatially split from the largest coding unit. Whenever the depth increases by 1, the coding unit is split into two or more coding units. Accordingly, as the depth increases, a size of the coding unit for each depth decreases. Whether to split the coding unit is determined according to whether splitting of the coding unit is efficient according to rate-distortion optimization. Then, split information indicating whether the coding unit is split may be generated. The split information may be represented in the form of a flag.

A coding unit may be split by using various methods. For example, a square coding unit may be split into four square coding units whose width and height are half those of the square coding unit. A square coding unit may be split into two rectangular coding units whose width is half that of the square coding unit. A square coding unit may be split into two rectangular coding units whose height is half that of the square coding unit. A square coding unit may be split into three coding units by splitting its width or height at 1:2:1.

A rectangular coding unit whose width is twice a height may be split into two square coding units. A rectangular coding unit whose width is twice a height may be split into two rectangular coding units whose width is four times a height. A rectangular coding unit whose width is twice a height may be split into two rectangular coding units and one square coding unit by splitting its width at 1:2:1.

Likewise, a rectangular coding unit whose height is twice a width may be split into two square coding units. Also, a rectangular coding unit whose height is twice a width may be split into two rectangular coding units whose height is four times a width. Likewise, a rectangular coding unit whose height is twice a width may be split into two rectangular coding units and one square coding unit by splitting its height at 1:2:1.

When the image encoding apparatus 100 is able to use two or more splitting methods, information on splitting methods that may be used for coding units from among the splitting methods that are usable by the image encoding apparatus 100 may be determined for each picture. Accordingly, only specific splitting methods may be determined to be used for each picture. When the image encoding apparatus 100 uses only one splitting method, information on a splitting method that may be used for coding units is not separately determined.

When split information of a coding unit indicates that the coding unit is split, split shape information indicating a splitting method of the coding unit may be generated. When there is only one splitting method that may be used in a picture to which a coding unit belongs, split shape information may not be generated. When a splitting method is adaptively determined to encoding information around a coding unit, split shape information may not be generated.

A largest coding unit may be split to smallest coding units according to smallest coding unit size information. A depth of the largest coding unit may be an uppermost depth, and a depth of the smallest coding units may be defined to be a lowermost depth. Accordingly, a coding unit having an upper depth may include a plurality of coding units having a lower depth.

As described above, image data of a current picture is split into largest coding units according to a largest size of a coding unit. The largest coding unit may include coding units that are split according to depths. Because the largest coding unit is split according to depths, image data of a spatial domain included in the largest coding unit may be hierarchically split according to depths.

A maximum depth that limits a maximum number of hierarchically splitting the largest coding unit or a minimum size of a coding unit may be preset.

The coding unit determiner 120 compares coding efficiency of hierarchically splitting a coding unit with coding efficiency of not splitting the coding unit. The coding unit determiner 120 determines whether to split the coding unit according to a comparison result. When it is determined that it is more efficient to split the coding unit, the coding unit determiner 120 hierarchically splits the coding unit. When it is determined that it is efficient not to split the coding unit according to the comparison result, the coding unit determiner 120 does not split the coding unit. Whether to split the coding unit may be independently determined from whether an adjacent coding unit is split.

According to an embodiment, whether to split a coding unit may be determined from a coding unit having a large depth during an encoding process. For example, coding efficiency of a coding unit having a maximum depth is compared with coding efficiency of a coding unit having a depth that is less than the maximum depth by 1, and it is determined which one of coding units having the maximum depth and coding units having the depth that is less than the maximum depth by 1 is more efficiently encoded in each area of a largest coding unit. Whether to split the coding units having the depth that is less than the maximum depth by 1 is determined in each area of the largest coding unit according to a determination result. Next, it is determined which one of coding units having a depth that is less than the maximum depth by 2 and one of the coding units having the minimum depth and the coding units having the depth that is less than the maximum depth by 1, the one having been selected according to the determination result, are more efficiently encoded in each area of the largest coding unit. The same determination process is performed on each of coding units having a smaller depth, and finally, whether to split the largest coding unit is determined according to which one of the largest coding unit and a hierarchical structure generated by hierarchically splitting the largest coding unit is more efficiently encoded.

Whether to split a coding unit may be determined from a coding unit having a small depth during an encoding process. For example, coding efficiency of a largest coding unit is compared with coding efficiency of a coding unit having a depth that is greater than that of the largest coding unit by 1, and it is determined which one of the largest coding unit and coding units having the depth that is greater than that of the largest coding unit by 1 is more efficiently encoded. When the coding efficiency of the largest coding unit is higher, the largest coding unit is not split. When the coding efficiency of the coding units having the depth that is greater than that of the largest coding unit by 1 is higher, the largest coding unit is split and the same comparison process is repeatedly applied to split coding units.

When coding efficiency is examined from a coding unit having a large depth, calculation is large but a tree structure having high coding efficiency may be obtained. In contrast, when coding efficiency is examined from a coding unit having a small depth, calculation is small but a tree structure having low coding efficiency may be obtained. Accordingly, an algorithm for obtaining a hierarchical tree structure of a largest coding unit may be designed, in consideration of coding efficiency and calculation, by using various methods.

The coding unit determiner 120 determines prediction and transformation methods that are most efficient for a coding unit, in order to determine efficiency of a coding unit for each depth. A coding unit may be split into certain data units in order to determine the most efficient prediction and transformation methods. A data unit may have any of various shapes according to a method of splitting the coding unit. The method of splitting the coding unit to determine the data unit may be defined as a partition mode. For example, when a coding unit having a size of 2N×2N (N is a positive integer) is not split, a size of a prediction unit included in the coding unit is 2N×2N. When a coding unit having a size of 2N×2N is split, a size of a prediction unit included in the coding unit may be 2N×N, N×2N, or N×N according to the partition mode. The partition mode according to an embodiment may generate symmetric data units obtained by symmetrically splitting a height or width of the coding unit, data units obtained by asymmetrically splitting the height or width of the coding unit, such as by a ratio 1:n or n:1, data units obtained by diagonally splitting the coding unit, data units obtained by geometrically splitting the coding unit, and data units having arbitrary shapes.

The coding unit may be predicted and transformed based on a data unit included in the coding unit. However, according to an embodiment, a data unit for prediction and a data unit for transformation may be separately determined. The data unit for prediction may be defined as a prediction unit, and the data unit for transformation may be defined as a transform unit. A partition mode applied to the prediction unit and a partition mode applied to the transform unit may be different from each other, and prediction of the prediction unit and transformation of the transform unit in the coding unit may be performed in a parallel and independent manner in the coding unit.

The coding unit may be split into at least one prediction unit in order to determine an efficient prediction method. Likewise, the coding unit may be split into at least one transform unit in order to determine an efficient transformation method. The splitting into the prediction unit and the splitting into the transform unit may be independently performed. However, when a reconstruction sample in the coding unit is used for intra prediction, a dependent relation is formed between prediction units or transform units included in the coding unit, and thus the splitting into the prediction unit and the splitting into the transform unit may affect each other.

The prediction unit included in the coding unit may be predicted through intra prediction or inter prediction. The intra prediction is a method of predicting prediction-unit samples by using reference samples around the prediction unit. The inter prediction is a method of predicting prediction-unit samples by obtaining a reference sample from a reference picture referenced by a current picture.

For intra prediction, the coding unit determiner 120 may select a most efficient intra prediction method, by applying a plurality of intra prediction methods to a prediction unit. The intra prediction methods include a DC mode, a planar mode, and a directional mode such as a vertical mode or a horizontal mode.

When a reconstructed sample around a coding unit is used as a reference sample, intra prediction may be performed for each prediction unit. However, when a reconstructed sample in a coding unit is used as a reference sample, reconstruction of the reference sample in the coding unit has to precede prediction, and thus a prediction order of a prediction unit may depend on a transformation order of a transform unit. Accordingly, when the reconstructed sample in the coding unit is used as the reference sample, only an intra prediction method for transform units corresponding to the prediction unit may be determined, and actual intra prediction may be performed on each transform unit.

The coding unit determiner 120 may select a most efficient inter prediction method by determining an optimal motion vector and an optimal reference picture. For inter prediction, the coding unit determiner 120 may determine a plurality of motion vector candidates from a coding unit that is spatially and temporally adjacent to a current coding unit, and may determine, from among the motion vector candidates, a most efficient motion vector as a motion vector. Likewise, the coding unit determiner 120 may determine a plurality of reference picture candidates from the coding unit that is spatially and temporally adjacent to the current coding unit, and may determine a most efficient reference picture from among the reference picture candidates. According to an embodiment, the reference picture may be determined from reference picture lists that are pre-determined for a current picture. According to the embodiment, for accuracy of prediction, the most efficient motion vector from among the plurality of motion vector candidates may be determined as a prediction motion vector, and a motion vector may be determined by correcting the prediction motion vector. Inter prediction may be performed in a parallel manner on each prediction unit in the coding unit.

The coding unit determiner 120 may reconstruct a coding unit by obtaining only information indicating a motion vector and a reference picture according to a skip mode. According to the skip mode, all encoding information including a residual signal is skipped, except for the information indicating the motion vector and the reference picture. Because the residual signal is skipped, the skip mode may be used when accuracy of prediction is very high.

A partition mode to be used may be limited according to a prediction method for a prediction unit. For example, only partition modes for a prediction unit having a size of 2N×2N or N×N may be applied to intra prediction, whereas partition modes for a prediction unit having a size of 2N×2N, 2N×N, N×2N, or N×N may be applied to inter prediction. Also, only a partition mode for a prediction unit having a size of 2N×2N may be applied to a skip mode of the inter prediction. A partition mode allowed for each prediction method in the image encoding apparatus 100 may vary according to coding efficiency.

The image encoding apparatus 100 may perform transformation based on a coding unit or a transform unit included in the coding unit. The image encoding apparatus 100 may transform residual data that is a difference value between an original value and a prediction value with respect to pixels included in the coding unit, through a preset process. For example, the image encoding apparatus 100 may perform lossy-compression on the residual data through quantization and discrete cosine transform (DCT)/discrete sine transform (DST). Alternatively, the image encoding apparatus 100 may perform lossless-compression on the residual data without quantization.

The image encoding apparatus 100 may determine a most efficient transform unit for quantization and transformation. The transform unit in the coding unit may be recursively split into smaller sized transform units in a manner similar to that in which the coding unit is split according to a tree structure, and thus residual data in the coding unit may be split according to the transform unit having the tree structure according to transformation depths. The image encoding apparatus 100 may generate transformation split information on slitting of the coding unit and the transform unit according to the determined tree structure of the transform unit.

A transformation depth indicating the number of times splitting is performed to reach the transform unit by splitting a height and a width of the coding unit may be set by the image encoding apparatus 100. For example, when a size of a transform unit of a current coding unit having a size of 2N×2N is 2N×2N, a transformation depth may be set to 0; when a size of a transform unit is N×N, a transformation depth may be set to 1; and when a size of a transform unit is N/2×N/2, a transformation depth may be set to 2. That is, the transform unit according to the tree structure may be set according to a transformation depth.

As a result, the coding unit determiner 120 determines a most efficient prediction method for a current prediction unit from among a plurality of intra prediction methods and inter prediction methods. The coding unit determiner 120 determines a prediction unit determination scheme according to coding efficiency according to a prediction result. Likewise, the coding unit determiner 120 determines a transform unit determination scheme according to coding efficiency according to a transformation result. Coding efficiency of a coding unit is finally determined according to most efficient prediction unit and transformation unit determination schemes. The coding unit determiner 120 finalizes a hierarchical structure of a largest coding unit according to coding efficiency of a coding unit for each depth.

The coding unit determiner 120 may measure coding efficiency of coding units according to depths, prediction efficiency of prediction methods, or the like by using rate-distortion optimization based on Lagrangian multipliers.

The coding unit determiner 120 may generate split information indicating whether to split a coding unit for each depth according to the determined hierarchical structure of the largest coding unit. Then, the coding unit determiner 120 may generate, for split coding units, partition mode information for determining a prediction unit and transform unit split information for determining a transform unit. Also, when the coding unit may be split by using at least two splitting methods, the coding unit determiner 120 may generate both split information and split shape information that indicates a splitting method. The coding unit determiner 120 may generate information on a prediction method and a transformation method that are used for the prediction unit and the transform unit.

The outputter 130 may output, in a bitstream, a plurality of pieces of information generated by the largest coding unit determiner 110 and the coding unit determiner 120 according to the hierarchical structure of the largest coding unit.

A method of determining a coding unit, a prediction unit, and a transform unit according to a tree structure of a largest coding unit according to an embodiment will be described below in detail with reference to FIGS. 3 through 12.

Figure 1B:
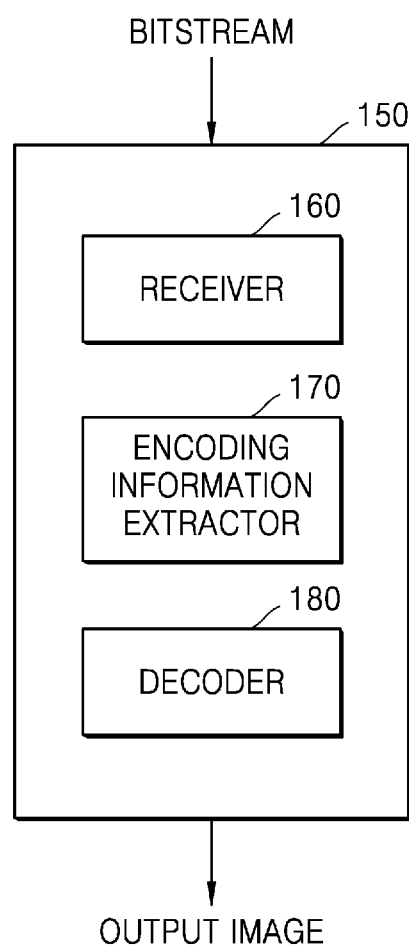
FIG. 1B is a block diagram illustrating a video decoding apparatus based on coding units having a tree structure, according to an embodiment.

FIG. 1B is a block diagram illustrating an image decoding apparatus 150 based on coding units having a tree structure, according to an embodiment.

The image decoding apparatus 150 includes a receiver 160, an encoding information extractor 170, and a decoder 180.

Definitions of the terms including a coding unit, a depth, a prediction unit, a transform unit, and various split information for a decoding operation performed by the image decoding apparatus 150 are the same as those described above with reference to FIG. 1A and the image encoding apparatus 100. Also, because the image decoding apparatus 150 is designed to reconstruct image data, various encoding methods used by the image encoding apparatus 100 may be applied to the image decoding apparatus 150.

The receiver 160 receives and parses a bitstream regarding an encoded video. The encoding information extractor 170 extracts, from the parsed bitstream, a plurality of pieces of information for decoding largest coding units, and provides the information to the decoder 180. The encoding information extractor 170 may extract information on a largest size of a coding unit of a current picture from a header, a sequence parameter set, or a picture parameter set of the current picture.

Furthermore, the encoding information extractor 170 extracts, from the parsed bitstream, a final depth and split information of coding units having a tree structure according to each largest coding unit. The extracted final depth and split information are output to the decoder 180. The decoder 180 may determine a tree structure of the largest coding unit by splitting the largest coding unit according to the extracted final depth and split information.

The split information extracted by the decoder 180 is split information of a tree structure determined by the image encoding apparatus 100 to cause a minimum coding error. Accordingly, the image decoding apparatus 150 may reconstruct an image by decoding data according to a decoding method that causes the minimum coding error.

The encoding information extractor 170 may extract split information of a data unit, such as a prediction unit and a transform unit included in a coding unit. For example, the encoding information extractor 170 may extract information on a most efficient partition mode for a prediction unit. The encoding information extractor 170 may extract transformation split information of a most efficient tree structure for a transform unit.

Also, the encoding information extractor 170 may obtain information on a most efficient prediction method for prediction units split from a coding unit. Then, the encoding information extractor 170 may obtain information on a most efficient transformation method for transform units split from a coding unit.

The encoding information extractor 170 extracts information from a bitstream according to a method in which the outputter 130 of the image encoding apparatus 100 constructs the bitstream.

The decoder 180 may split a largest coding unit into coding units having a most efficient tree structure based on split information. Then, the decoder 180 may split a coding unit into prediction units according to information on a partition mode. The decoder 180 may split a coding unit into transform units according to transformation split information.

The decoder 180 may predict a prediction unit according to information on a prediction method. The decoder 180 may perform inverse quantization and inverse transformation on residual data that is a difference between an original value and a prediction value of a pixel according to information on a method of transforming a transform unit. Also, the decoder 180 may reconstruct pixels of a coding unit according to a prediction result of the prediction unit and a transformation result of the transform unit.

Figure 2:
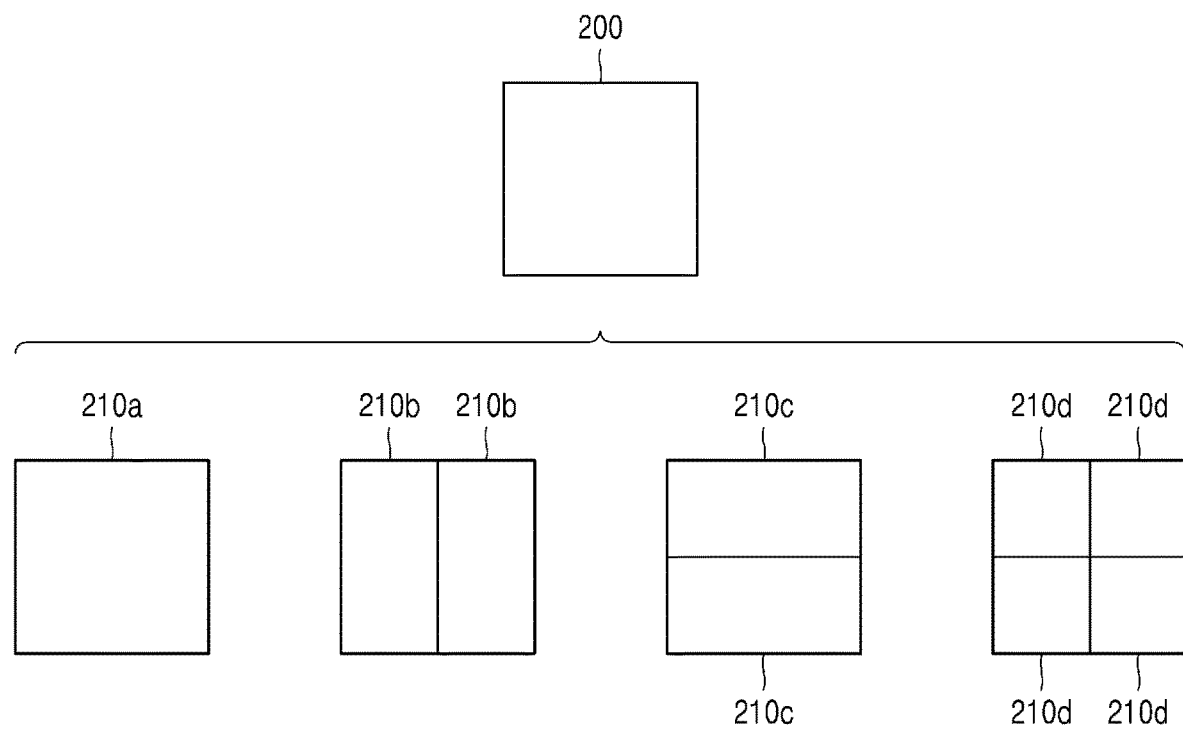
FIG. 2 illustrates a process of determining at least one coding unit by splitting a current coding unit, according to an embodiment.

FIG. 2 illustrates a process, performed by the image decoding apparatus 150, of determining at least one coding unit by splitting a current coding unit, according to an embodiment.

According to an embodiment, the image decoding apparatus 150 may determine a shape of a coding unit by using block shape information, and may determine a shape according to which the coding unit is to be split by using split shape information. That is, a coding unit splitting method, which is indicated by the split shape information, may be determined according to which block shape is indicated by the block shape information used by the image decoding apparatus 150.

According to an embodiment, the image decoding apparatus 150 may use the block shape information indicating that the current coding unit has a square shape. For example, the image decoding apparatus 150 may determine whether or not to split a square coding unit, whether to vertically split the square coding unit, whether to horizontally split the square coding unit, or whether to split the square coding unit into four coding units according to the split shape information. Referring to FIG. 2, when block shape information of a current coding unit 200 indicates a square shape, the decoder 180 may not split a coding unit 210a having the same size as the current coding unit 200 according to split shape information indicating not to perform splitting, or may determine coding units 210b, 210c, and 210d split based on split shape information indicating a certain splitting method.

Referring to FIG. 2, the image decoding apparatus 150 may determine two coding units 210b obtained by vertically splitting the current coding unit 200 based on split shape information indicating to vertically perform splitting according to an embodiment. The image decoding apparatus 150 may determine two coding units 210c obtained by horizontally splitting the current coding unit 200 based on split shape information indicating to horizontally perform splitting. The image decoding apparatus 150 may determine four coding units 210d obtained by vertically and horizontally splitting the current coding unit 200 based on split shape information indicating to vertically and horizontally perform splitting. However, it should not be construed that a split shape for splitting a square coding unit is limited to the above shapes, and the split shape may include various shapes that may be indicated by split shape information. Split shapes for splitting a square coding unit will be described in detail below through various embodiments.

FIG. 3 illustrates a process, performed by the image decoding apparatus 150, of determining at least one coding unit by splitting a non-square coding unit, according to an embodiment.

According to an embodiment, the image decoding apparatus 150 may use block shape information indicating that a current coding unit has a non-square shape. The image decoding apparatus 150 may determine, according to split shape information, whether or not to split the non-square current coding unit or whether to split the non-square current coding unit by using a preset method. Referring to FIG. 3, when block shape information of a current coding unit 300 or 350 indicates a non-square shape, the image decoding apparatus 150 may not split a coding unit 310 or 360 having the same size as the current coding unit 300 or 350 according to split shape information indicating not to perform splitting, or may determine coding units 320a and 320b, 330a, 330b, and 330c, 370a and 370b, 380a, 380b, and 380c that are split according to split shape information indicating a certain splitting method. A certain splitting method of splitting a non-square coding unit will be described in detail below through various embodiments.

According to an embodiment, the image decoding apparatus 150 may determine a shape according to which a coding unit is to be split by using the split shape information, and in this case, the split shape information may indicate the number of at least one coding unit generated when the coding unit is split. Referring to FIG. 3, when the split shape information indicates that the current coding unit 300 or 350 is split into two coding units, the image decoding apparatus 150 may determine two coding units 320a and 320b or 370a and 370b, which are respectively included in the current coding unit 300 or 350 by splitting the current coding unit 300 or 350 based on the split shape information.

According to an embodiment, when the image decoding apparatus 150 splits the current coding unit 300 or 350 having the non-square shape based on the split shape information, the image decoding apparatus 150 may split the current coding unit 300 or 350 having the non-square shape, in consideration of a location of a long side of the current coding unit 300 or 350. For example, the image decoding apparatus 150 may determine a plurality of coding units by splitting the current coding unit 300 or 350 in a direction of splitting the long side of the current coding unit 300 or 350, in consideration of the shape of the current coding unit 300 or 350.

According to an embodiment, when the split shape information indicates that a coding unit is to be split into an odd number of blocks, the image decoding apparatus 150 may determine an odd number of coding units included in the current coding unit 300 or 350. For example, when the split shape information indicates that the current coding unit 300 or 350 is to be split into three coding units, the image decoding apparatus 150 may split the current coding unit 300 or 350 into three coding units 330a, 330b, and 330c or 380a, 380b, and 380c. According to an embodiment, the image decoding apparatus 150 may determine the odd number of coding units included in the current coding unit 300 or 350, and sizes of the determined coding units may not be uniform. For example, a size of the coding unit 330b or 380b from among the odd number of coding units 330a, 330b, and 330c or 380a, 380b, and 380c may be different from sizes of the coding units 330a and 330c or 380a and 380c. That is, coding units that may be determined when the current coding unit 300 or 350 is split may have multiple sizes.

According to an embodiment, when the split shape information indicates that a coding unit is to be split into an odd number of blocks, the image decoding apparatus 150 may determine an odd number of coding units included in the current coding unit 300 or 350 and may put a restriction on at least one coding unit from among the odd number of coding units generated by splitting the current coding unit 300 or 350. Referring to FIG. 3, the image decoding apparatus 150 may decode the coding unit 330b or 380b at the center of the three coding units 330a, 330b, and 330c or 380a, 380b, and 380c generated when the current coding unit 300 or 350 is split, in a different manner from the coding units 330a and 330c or 380a and 380c. For example, the image decoding apparatus 150 may restrict the coding unit 330b or 380b at the center not to be further split or to be split only a certain number of times, unlike the coding units 330a and 330c or 380a and 380c.

Figure 4:
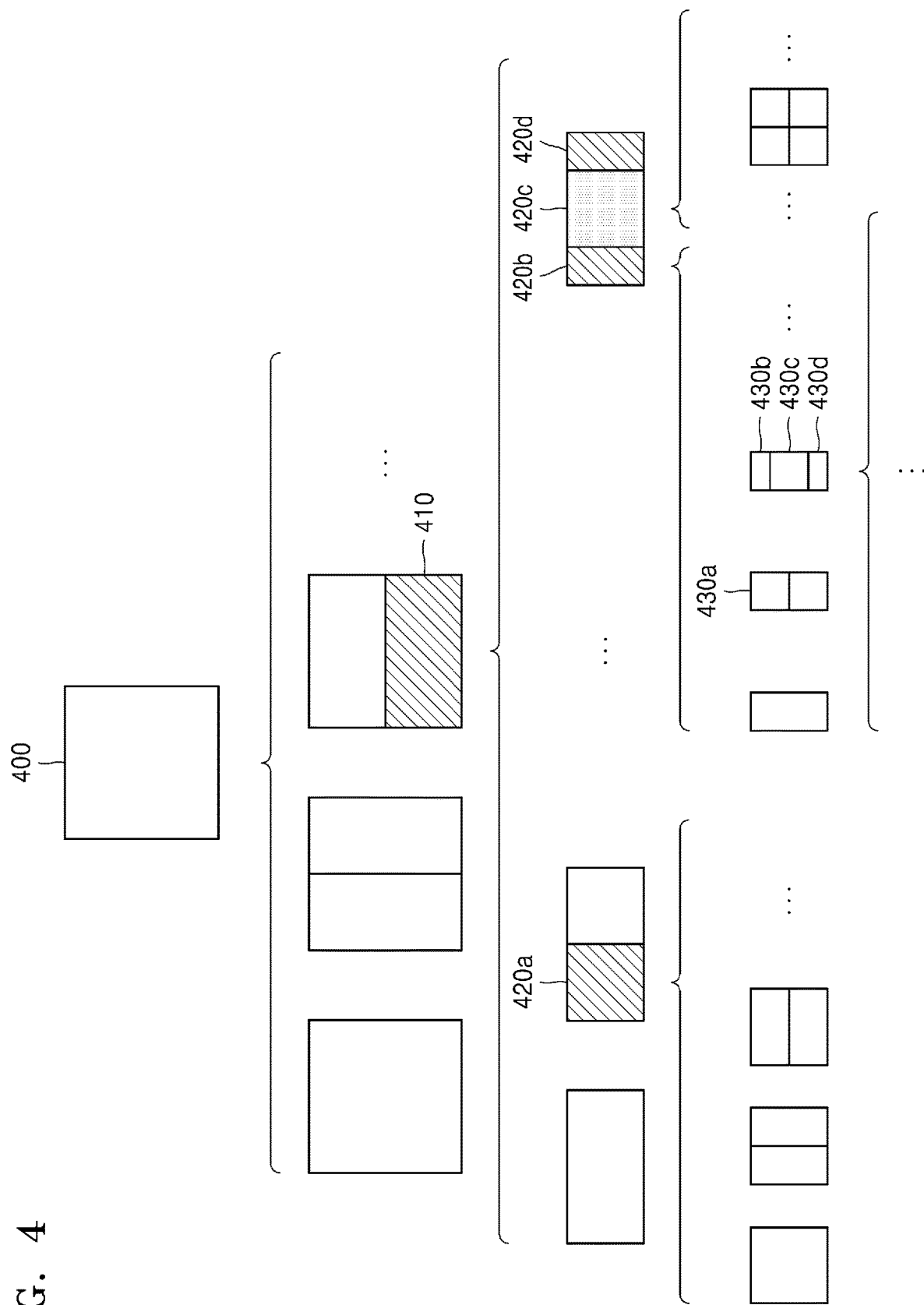
FIG. 4 illustrates a process of splitting a coding unit based on at least one of block shape information and split shape information, according to an embodiment.

FIG. 4 illustrates a process, performed by the image decoding apparatus 150, of splitting a coding unit based on at least one of block shape information and split shape information, according to an embodiment.

According to an embodiment, the image decoding apparatus 150 may determine to split or not to split a square first coding unit 400 into coding units based on at least one of the block shape information and the split shape information. According to an embodiment, when the split shape information indicates to split the first coding unit 400 in a horizontal direction, the image decoding apparatus 150 may determine a second coding unit 410 by splitting the first coding unit 400 in a horizontal direction. A first coding unit, a second coding unit, and a third coding unit used according to an embodiment are terms used to understand a relation before and after coding units are split. For example, the second coding unit may be determined by splitting the first coding unit, and the third coding unit may be determined by splitting the second coding unit. It will be understood that a relation among the first coding unit, the second coding unit, and the third coding unit is applied to the following descriptions.

According to an embodiment, the image decoding apparatus 150 may determine to split or not to split the second coding unit 410 into coding units, based on at least one of the block shape information and the split shape information. Referring to FIG. 4, the image decoding apparatus 150 may or may not split the non-square second coding unit 410, which is determined by splitting the first coding unit 400, into one or more third coding units 420a, or 420b, 420c, and 420d based on at least one of the block shape information and the split shape information. The image decoding apparatus 150 may obtain at least one of the block shape information and the split shape information, and may obtain a plurality of various-shaped second coding units (e.g., 410) by splitting the first coding unit 400, based on at least one of the obtained block shape information and split shape information, and the second coding unit 410 may be split by using a splitting method of the first coding unit 400, based on at least one of the block shape information and the split shape information. According to an embodiment, when the first coding unit 400 is split into the second coding units 410 based on at least one of the block shape information and the split shape information of the first coding unit 400, the second coding unit 410 may also be split into the third coding units 420a, or 420b, 420c, and 420d based on at least one of the block shape information and the split shape information of the second coding unit 410. That is, a coding unit may be recursively split based on at least one of the block shape information and the split shape information of each coding unit. A method that may be used to recursively split the coding unit will be described below through various embodiments.

According to an embodiment, the image decoding apparatus 150 may determine to split each of the third coding units 420a, 420b, 420c, and 420d into coding units (e.g., fourth coding units 430a, 430b, 430c, and 430d that are split from the third coding unit 420b), or may determine not to split the second coding unit 410, based on at least one of the block shape information and the split shape information. According to an embodiment, the image decoding apparatus 150 may split the non-square second coding unit 410 into the odd number of third coding units 420b, 420c, and 420d. The image decoding apparatus 150 may put a certain restriction on a third coding unit from among the odd number of third coding units 420b, 420c, and 420d. For example, the image decoding apparatus 150 may restrict the third coding unit 420c at a center location from among the odd number of third coding units 420b, 420c, and 420d to be no longer split or to be split a settable number of times. Referring to FIG. 4, the image decoding apparatus 150 may restrict the third coding unit 420c, which is at the center location from among the odd number of third coding units 420b, 420c, and 420d included in the non-square second coding unit 410, to be no longer split, to be split by using a certain splitting method (e.g., split into only four coding units or split into a shape corresponding to that into which the second coding unit 410 is split), or to be split only a certain number of times (e.g., split only n times (where n>0)). However, the restrictions on the third coding unit 420c at the center location are not limited to the above-described examples, and may include various restrictions for decoding the third coding unit 420c at the center location differently from the other third coding units 420b and 420d.

According to an embodiment, the image decoding apparatus 150 may obtain at least one of block shape information and split shape information, which is used to split a current coding unit, from a certain location in the current coding unit.

According to an embodiment, when a current coding unit is split into a certain number of coding units, the image decoding apparatus 150 may select one of the coding units. Various methods that may be used to select one of a plurality of coding units will be described below through various embodiments.

According to an embodiment, the image decoding apparatus 150 may split a current coding unit into a plurality of coding units, and may determine a coding unit at a certain location.

Figure 5:
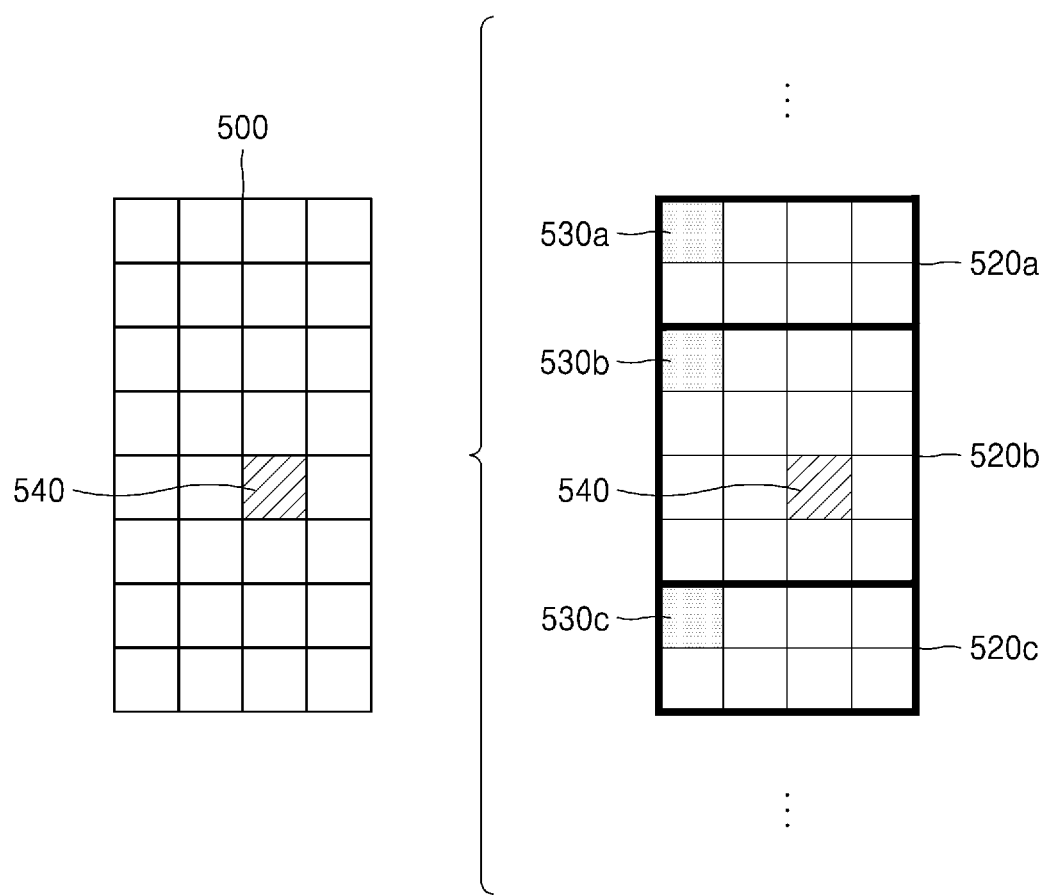
FIG. 5 illustrates a method of determining a certain coding unit from among an odd number of coding units, according to an embodiment.

FIG. 5 illustrates a method, performed by the image decoding apparatus 150, of determining a coding unit of a certain location from among an odd number of coding units, according to an embodiment.

According to an embodiment, the image decoding apparatus 150 may use information indicating each of locations of an odd number of coding units to determine a coding unit at a center location from among the odd number of coding units. Referring to FIG. 5, the image decoding apparatus 150 may determine an odd number of coding units 520a, 520b, and 520c by splitting a current coding unit 500. The image decoding apparatus 150 may determine the coding unit 520b at a center location by using information on locations of the odd number of coding units 520a, 520b, and 520c. For example, the image decoding apparatus 150 may determine the coding unit 520b of the center location by determining the locations of the coding units 520a, 520b, and 520c based on information indicating locations of certain samples included in the coding units 520a, 520b, and 520c. In detail, the image decoding apparatus 150 may determine the coding unit 520b at the center location by determining the locations of the coding units 520a, 520b, and 520c based on information indicating locations of top left samples 530a, 530b, and 530c of the coding units 520a, 520b, and 520c.

According to an embodiment, the information indicating the locations of the top left samples 530a, 530b, and 530c, which are included in the coding units 520a, 520b, and 520c, respectively, may include information on locations or coordinates of the coding units 520a, 520b, and 520c in a picture. According to an embodiment, the information indicating the locations of the top left samples 530a, 530b, and 530c, which are respectively included in the coding units 520a, 520b, and 520c, may include information indicating widths or heights of the coding units 520a, 520b, and 520c included in the current coding unit 500, and the widths or heights may correspond to information indicating a difference between the coordinates of the coding units 520a, 520b, and 520c in the picture. That is, the image decoding apparatus 150 may determine the coding unit 520b at the center location by directly using the information on the locations or coordinates of the coding units 520a, 520b, and 520c in the picture, or by using the information on the widths or heights of the coding units, which correspond to a difference value between the coordinates.

According to an embodiment, information indicating the location of the top left sample 530a of the upper coding unit 520a may include coordinates (xa, ya), information indicating the location of the top left sample 530b of the middle coding unit 520b may include coordinates (xb, yb), and information indicating the location of the top left sample 530c of the lower coding unit 520c may include coordinates (xc, yc). The image decoding apparatus 150 may determine the middle coding unit 520b by using the coordinates of the top left samples 530a, 530b, and 530c which are included in the coding units 520a, 520b, and 520c, respectively. For example, when the coordinates of the top left samples 530a, 530b, and 530c are sorted in an ascending or descending order, the coding unit 520b including the coordinates (xb, yb) of the sample 530b at a center location may be determined as a coding unit at a center location from among the coding units 520a, 520b, and 520c determined by splitting the current coding unit 500. However, the coordinates indicating the locations of the top left samples 530a, 530b, and 530c may include coordinates indicating absolute locations in the picture, or may use coordinates (dxb, dyb) indicating a relative location of the top left sample 530b of the middle coding unit 520b and coordinates (dxc, dyc) indicating a relative location of the top left sample 530c of the lower coding unit 520c, with reference to the location of the top left sample 530a of the upper coding unit 520a. Also, a method of determining a coding unit at a certain location by using coordinates of a sample included in the coding unit as information indicating a location of the sample is not limited to the above-described method, and may include various arithmetic methods capable of using the coordinates of the sample.

According to an embodiment, the image decoding apparatus 150 may split the current coding unit 500 into the plurality of coding units 520a, 520b, and 520c, and may select one of the coding units 520a, 520b, and 520c based on a certain criterion. For example, the image decoding apparatus 150 may select the coding unit 520b whose size is different from that of the others, from among the coding units 520a, 520b, and 520c.

According to an embodiment, the image decoding apparatus 150 may determine the widths or heights of the coding units 520a, 520b, and 520c by using the coordinates (xa, ya) indicating the location of the top left sample 530a of the upper coding unit 520a, the coordinates (xb, yb) indicating the location of the top left sample 530b of the middle coding unit 520b, and the coordinates (xc, yc) indicating the location of the top left sample 530c of the lower coding unit 520c. The image decoding apparatus 150 may determine respective sizes of the coding units 520a, 520b, and 520c by using the coordinates (xa, ya), (xb, yb), and (xc, yc) indicating the locations of the coding units 520a, 520b, and 520c.

According to an embodiment, the image decoding apparatus 150 may determine the width of the upper coding unit 520a to be xb−xa and the height of the upper coding unit 520a to be yb−ya. According to an embodiment, the image decoding apparatus 150 may determine the width of the middle coding unit 520b to be xc−xb and the height of the middle coding unit 520b to be yc−yb. According to an embodiment, the image decoding apparatus 150 may determine the width or height of the lower coding unit 520c by using the width or height of the current coding unit 500 and the widths and heights of the upper and middle coding units 520a and 520b. The image decoding apparatus 150 may determine a coding unit, which has a size different from that of the others, based on the determined widths and heights of the coding units 520a, 520b, and 520c. Referring to FIG. 5, the image decoding apparatus 150 may determine the middle coding unit 520b, which has a size different from the size of the upper and lower coding units 520a and 520c, to be the coding unit of the certain location. However, the above-described method, performed by the image decoding apparatus 150, of determining a coding unit having a size different from the size of the other coding units merely corresponds to an example of determining a coding unit at a certain location by using sizes of coding units, which are determined based on coordinates of samples, and thus various methods of determining a coding unit at a certain location by comparing sizes of coding units, which are determined based on coordinates of certain samples, may be used.

However, locations of samples considered to determine locations of coding units are not limited to the above-described top left locations, and information on arbitrary locations of samples included in the coding units may be used.

According to an embodiment, the image decoding apparatus 150 may select a coding unit at a certain location from among an odd number of coding units determined by splitting a current coding unit, in consideration of a shape of the current coding unit. For example, when the current coding unit whose width is longer than its height has a non-square shape, the image decoding apparatus 150 may determine the coding unit at the certain location in a horizontal direction. That is, the image decoding apparatus 150 may determine one of coding units at different locations in a horizontal direction and may put a restriction on the coding unit. When the current coding unit whose height is longer than its width has a non-square shape, the image decoding apparatus 150 may determine the coding unit at the certain location in a vertical direction. That is, the image decoding apparatus 150 may determine one of coding units at different locations in a vertical direction and may put a restriction on the coding unit.

According to an embodiment, the image decoding apparatus 150 may use information indicating respective locations of an even number of coding units, so as to determine the coding unit at the certain location from among the even number of coding units. The image decoding apparatus 150 may determine the even number of coding units by splitting the current coding unit, and may determine the coding unit at the certain location by using information on locations of the even number of coding units. An operation related thereto may correspond to the operation of determining a coding unit at a certain location (e.g., a center location) from among an odd number of coding units, which has been described in detail above with reference to FIG. 5, and thus detailed descriptions thereof are not provided here.

According to an embodiment, when a non-square current coding unit is split into a plurality of coding units, certain information on a coding unit at a certain location may be used in a splitting operation to determine the coding unit at the certain location from among the plurality of coding units. For example, the image decoding apparatus 150 may use at least one of block shape information and split shape information, which is stored in a sample included in a coding unit at a center location, in a splitting operation to determine the coding unit at the center location from among the plurality of coding units determined by splitting the current coding unit.

Referring to FIG. 5, the image decoding apparatus 150 may split the current coding unit 500 into the plurality of coding units 520a, 520b, and 520c based on at least one of the block shape information and the split shape information, and may determine the coding unit 520b at a center location from among the plurality of the coding units 520a, 520b, and 520c. Furthermore, the image decoding apparatus 150 may determine the coding unit 520b at the center location, in consideration of a location from which at least one of the block shape information and the split shape information is obtained. That is, at least one of the block shape information and the split shape information of the current coding unit 500 may be obtained from a sample 540 at a center location of the current coding unit 500 and, when the current coding unit 500 is split into the plurality of coding units 520a, 520b, and 520c based on at least one of the block shape information and the split shape information, the coding unit 520b including the sample 540 may be determined to be the coding unit at the center location. However, information used to determine the coding unit at the center location is not limited to at least one of the block shape information and the split shape information, and various kinds of information may be used to determine the coding unit at the center location.

According to an embodiment, certain information for identifying the coding unit at the certain location may be obtained from a certain sample included in a coding unit to be determined. Referring to FIG. 5, the image decoding apparatus 150 may use at least one of the block shape information and the split shape information, which is obtained from a sample at a certain location in the current coding unit 500 (e.g., a sample at a center location of the current coding unit 500) to determine a coding unit at a certain location from among the plurality of the coding units 520a, 520b, and 520c determined by splitting the current coding unit 500 (e.g., a coding unit at a center location from among a plurality of split coding units). That is, the image decoding apparatus 150 may determine the sample at the certain location by considering a block shape of the current coding unit 500, may determine the coding unit 520b including a sample, from which certain information (e.g., at least one of the block shape information and the split shape information) may be obtained, from among the plurality of coding units 520a, 520b, and 520c determined by splitting the current coding unit 500, and may put a certain restriction on the coding unit 520b. Referring to FIG. 5, according to an embodiment, the image decoding apparatus 150 may determine the sample 540 at the center location of the current coding unit 500 as the sample from which the certain information may be obtained, and may put a certain restriction on the coding unit 520b including the sample 540, in a decoding operation. However, the location of the sample from which the certain information may be obtained is not limited to the above-described location, and may include arbitrary locations of samples included in the coding unit 520b to be determined for a restriction.

According to an embodiment, the location of the sample from which the certain information may be obtained may be determined based on a shape of the current coding unit 500. According to an embodiment, the block shape information may indicate whether the current coding unit has a square or non-square shape, and the location of the sample from which the certain information may be obtained may be determined based on the shape. For example, the image decoding apparatus 150 may determine a sample located on a boundary for splitting at least one of a width and a height of the current coding unit in half, as the sample from which the certain information may be obtained, by using at least one of information on the width of the current coding unit and information on the height of the current coding unit. As another example, when the block shape information of the current coding unit indicates a non-square shape, the image decoding apparatus 150 may determine one of samples adjacent to a boundary for splitting a long side of the current coding unit in half, as the sample from which the certain information may be obtained.

According to an embodiment, when the current coding unit is split into a plurality of coding units, the image decoding apparatus 150 may use at least one of the block shape information and the split shape information so as to determine a coding unit at a certain location from among the plurality of coding units. According to an embodiment, the image decoding apparatus 150 may obtain at least one of the block shape information and the split shape information from a sample at a certain location in a coding unit, and may split the plurality of coding units, which are generated by splitting the current coding unit, by using at least one of the split shape information and the block shape information, which is obtained from the sample of the certain location in each of the plurality of coding units. That is, a coding unit may be recursively split based on at least one of the block shape information and the split shape information, which is obtained from the sample at the certain location in each coding unit. An operation of recursively splitting a coding unit has been described above with reference to FIG. 4, and thus detailed descriptions thereof will not be provided here.

According to an embodiment, the image decoding apparatus 150 may determine one or more coding units by splitting the current coding unit, and may determine an order of decoding the one or more coding units based on a certain block (e.g., the current coding unit).

Figure 6:
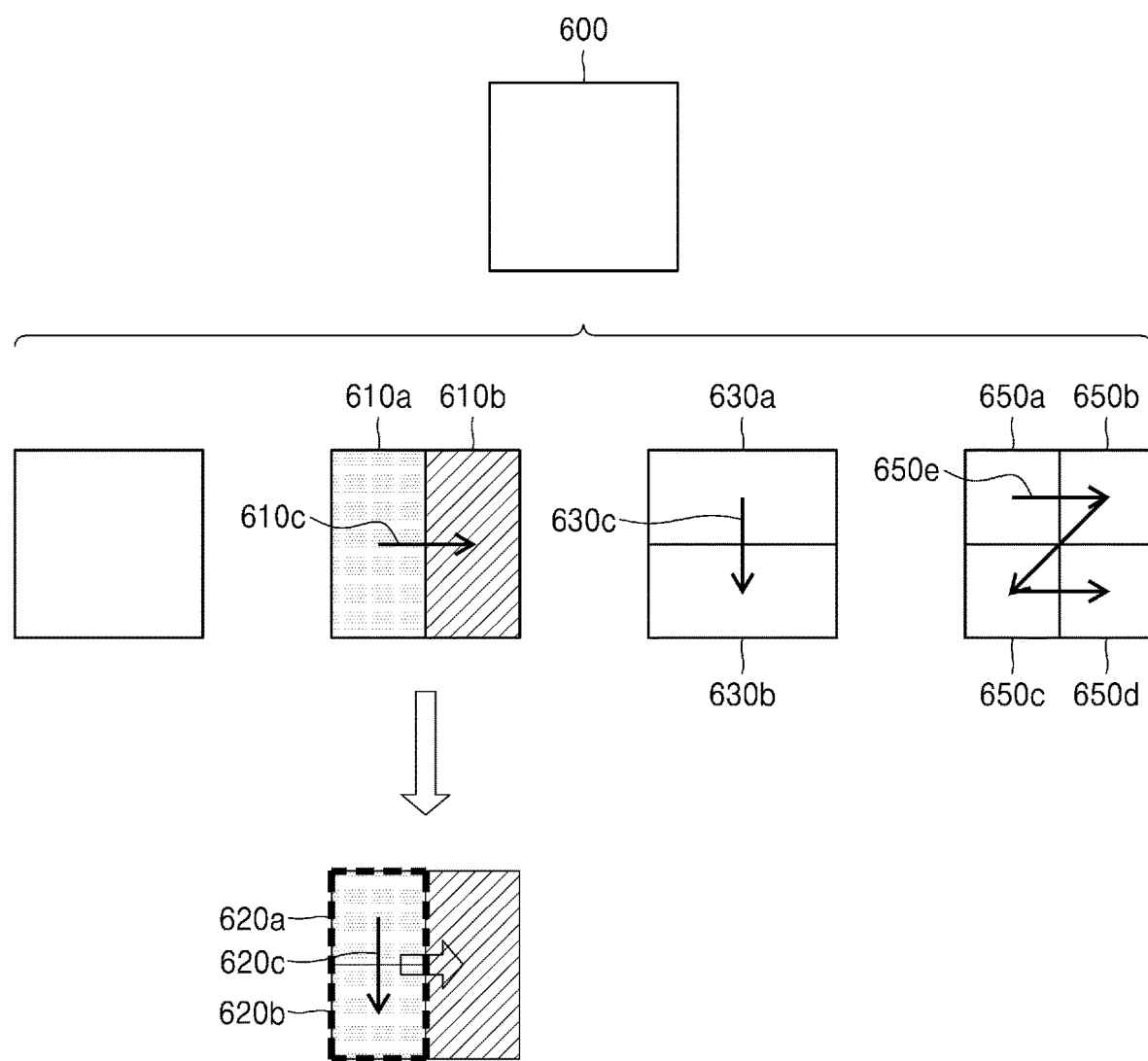
FIG. 6 illustrates an order of processing a plurality of coding units when the plurality of coding units are determined by splitting a current coding unit, according to an embodiment.

FIG. 6 illustrates an order of processing a plurality of coding units when the image decoding apparatus 150 determines the plurality of coding units by splitting a current coding unit, according to an embodiment.

According to an embodiment, the image decoding apparatus 150 may determine second coding units 610a and 610b by splitting a first coding unit 600 in a vertical direction, may determine second coding units 630a and 630b by splitting the first coding unit 600 in a horizontal direction, or may determine second coding units 650a, 650b, 650c, and 650d by splitting the first coding unit 600 in vertical and horizontal directions, based on block shape information and split shape information.

Referring to FIG. 6, the image decoding apparatus 150 may determine to process the second coding units 610a and 610b, which are determined by splitting the first coding unit 600 in a vertical direction, in a horizontal direction order 610c. The image decoding apparatus 150 may determine to process the second coding units 630a and 630b, which are determined by splitting the first coding unit 600 in a horizontal direction, in a vertical direction order 630c. The image decoding apparatus 150 may determine the second coding units 650a, 650b, 650c, and 650d, which are determined by splitting the first coding unit 600 in vertical and horizontal directions, according to a certain order (e.g., a raster scan order or a Z-scan order 650e) by which coding units in a row are processed and then coding units in a next row are processed.

According to an embodiment, the image decoding apparatus 150 may recursively split coding units. Referring to FIG. 6, the image decoding apparatus 150 may determine the plurality of second coding units 610a and 610b, 630a and 630b, and 650a, 650b, 650c, and 650d by splitting the first coding unit 600, and may recursively split each of the determined plurality of second coding units 610a, 610b, 630a, 630b, 650a, 650b, 650c, and 650d. A method of splitting the plurality of second coding units 610a, 610b, 630a, 630b, 650a, 650b, 650c, and 650d may correspond to a method of splitting the first coding unit 600. Accordingly, each of the plurality of second coding units 610a, 610b, 630a, 630b, 650a, 650b, 650c, and 650d may be independently split into a plurality of coding units. Referring to FIG. 6, the image decoding apparatus 150 may determine the second coding units 610a and 610b by splitting the first coding unit 600 in a vertical direction, and may determine to independently split or not to split each of the second coding units 610a and 610b.

According to an embodiment, the image decoding apparatus 150 may determine third coding units 620a and 620b by splitting the left second coding unit 610a in a horizontal direction, and may not split the right second coding unit 610b.

According to an embodiment, a processing order of coding units may be determined based on an operation of splitting a coding unit. In other words, a processing order of split coding units may be determined based on a processing order of coding units immediately before being split. The image decoding apparatus 150 may determine a processing order of the third coding units 620a and 620b determined by splitting the left second coding unit 610a, independently of the right second coding unit 610b. Because the third coding units 620a and 620b are determined by splitting the left second coding unit 610a in a horizontal direction, the third coding units 620a and 620b may be processed in a vertical direction order 620c. Also, because the left and right second coding units 610a and 610b are processed in the horizontal direction order 610c, the right second coding unit 610b may be processed after the third coding units 620a and 620b included in the left second coding unit 610a are processed in the vertical direction order 620c. An operation of determining a processing order of coding units based on a coding unit before being split is not limited to the above-described example, and various methods may be used to independently process coding units, which are split and determined to various shapes, in a certain order.

Figure 7:
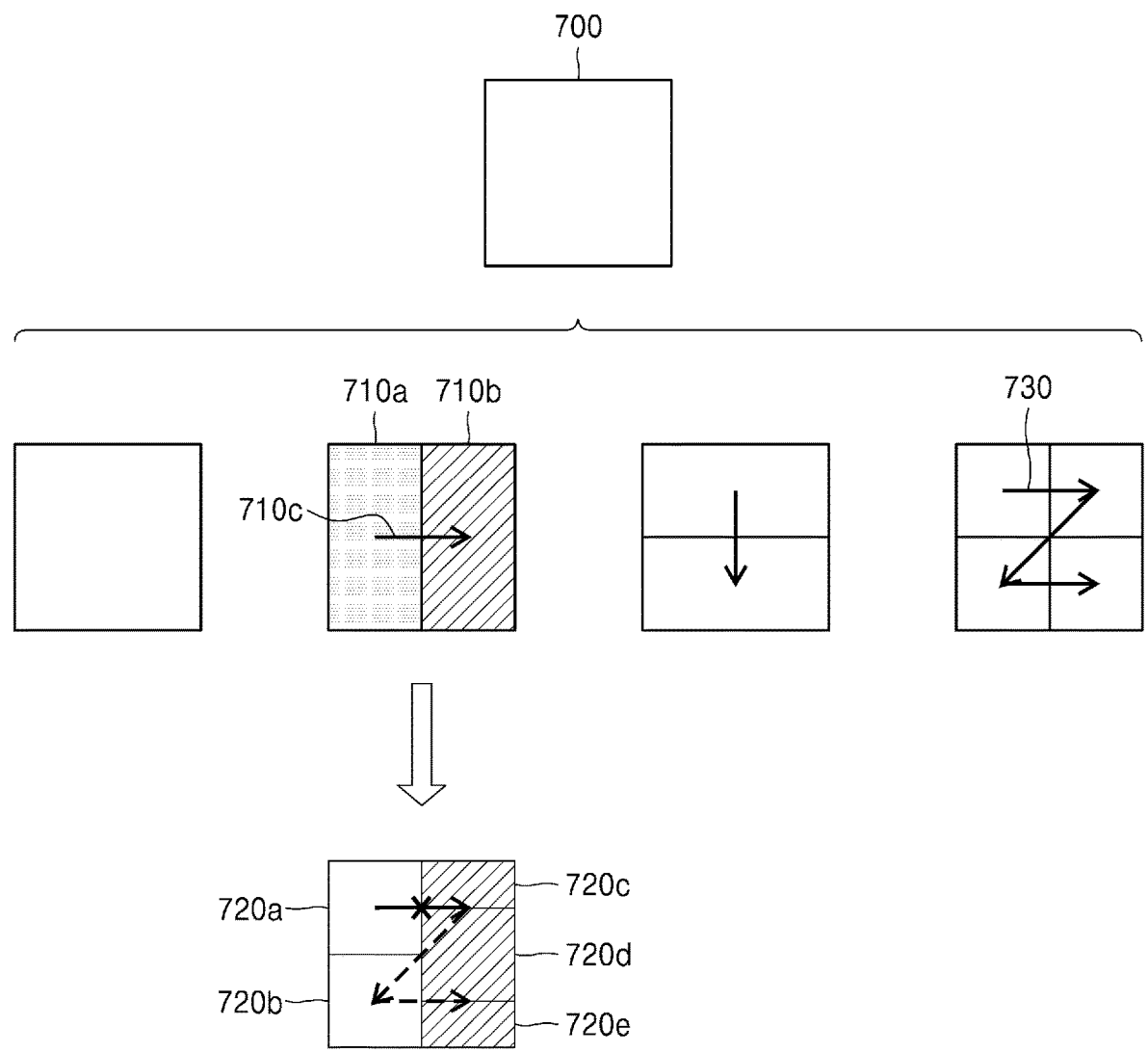
FIG. 7 illustrates a process of determining that a current coding unit is to be split into an odd number of coding units when the coding units are not processable in a certain order, according to an embodiment.

FIG. 7 illustrates a process, performed by the image decoding apparatus 150, of determining that a current coding unit is to be split into an odd number of coding units when the coding units are not processable in a certain order, according to an embodiment.

According to an embodiment, the image decoding apparatus 150 may determine that the current coding unit is to be split into an odd number of coding units, based on obtained block shape information and split shape information. Referring to FIG. 7, a square first coding unit 700 may be split into non-square second coding units 710a and 710b, and the second coding units 710a and 710b may be independently split into third coding units 720a and 720b, and 720c, 720d, and 720e. According to an embodiment, the image decoding apparatus 150 may determine the plurality of third coding units 720a and 720b by splitting the left second coding unit 710a in a horizontal direction 710c, and may split the right second coding unit 710b into an odd number of third coding units 720c, 720d, and 720e.

According to an embodiment, the image decoding apparatus 150 may determine whether any coding unit is split into an odd number of coding units, by determining whether the third coding units 720a and 720b, and 720c, 720d, and 720e are processable in a certain order. Referring to FIG. 7, the image decoding apparatus 150 may determine the third coding units 720a and 720b, and 720c, 720d, and 720e by recursively splitting the first coding unit 700. The image decoding apparatus 150 may determine whether any of the first coding unit 700, the second coding units 710a and 710b, and the third coding units 720a and 720b, and 720c, 720d, and 720e is to be split into an odd number of coding units, based on at least one of block shape information and split shape information. For example, a second coding unit located in the right from among the second coding units 710a and 710b may be split into an odd number of third coding units 720c, 720d, and 720e. A processing order of a plurality of coding units included in the first coding unit 700 may be a certain order (e.g., a Z-scan order 730), and the image decoding apparatus 150 may determine whether the third coding units 720c, 720d, and 720e, which are determined by splitting the right second coding unit 710b into an odd number of coding units, satisfy a condition for processing in the certain order.

According to an embodiment, the image decoding apparatus 150 may determine whether the third coding units 720a and 720b, and 720c, 720d, and 720e included in the first coding unit 700 satisfy the condition for processing in the certain order, and the condition relates to whether at least one of a width and a height of the second coding units 710a and 710b is to be split in half along a boundary of the third coding units 720a and 720b, and 720c, 720d, and 720e. For example, although the third coding units 720a and 720b determined by splitting the height of the non-square left second coding unit 710a in half may satisfy the condition, because boundaries of the third coding units 720c, 720d, and 720e determined by splitting the right second coding unit 710b into three coding units do not split the width or height of the right second coding unit 710b in half, it may be determined that the third coding units 720c, 720d, and 720e do not satisfy the condition. When the condition is not satisfied as described above, the image decoding apparatus 150 may decide disconnection of a scan order, and may determine that the right second coding unit 710b is to be split into an odd number of coding units, based on a result of the decision. According to an embodiment, when a coding unit is split into an odd number of coding units, the image decoding apparatus 150 may put a certain restriction on a coding unit at a certain location from among the split coding units, and the restriction or the certain location has been described above through various embodiments and thus detailed descriptions thereof will not be provided here.

Figure 8:
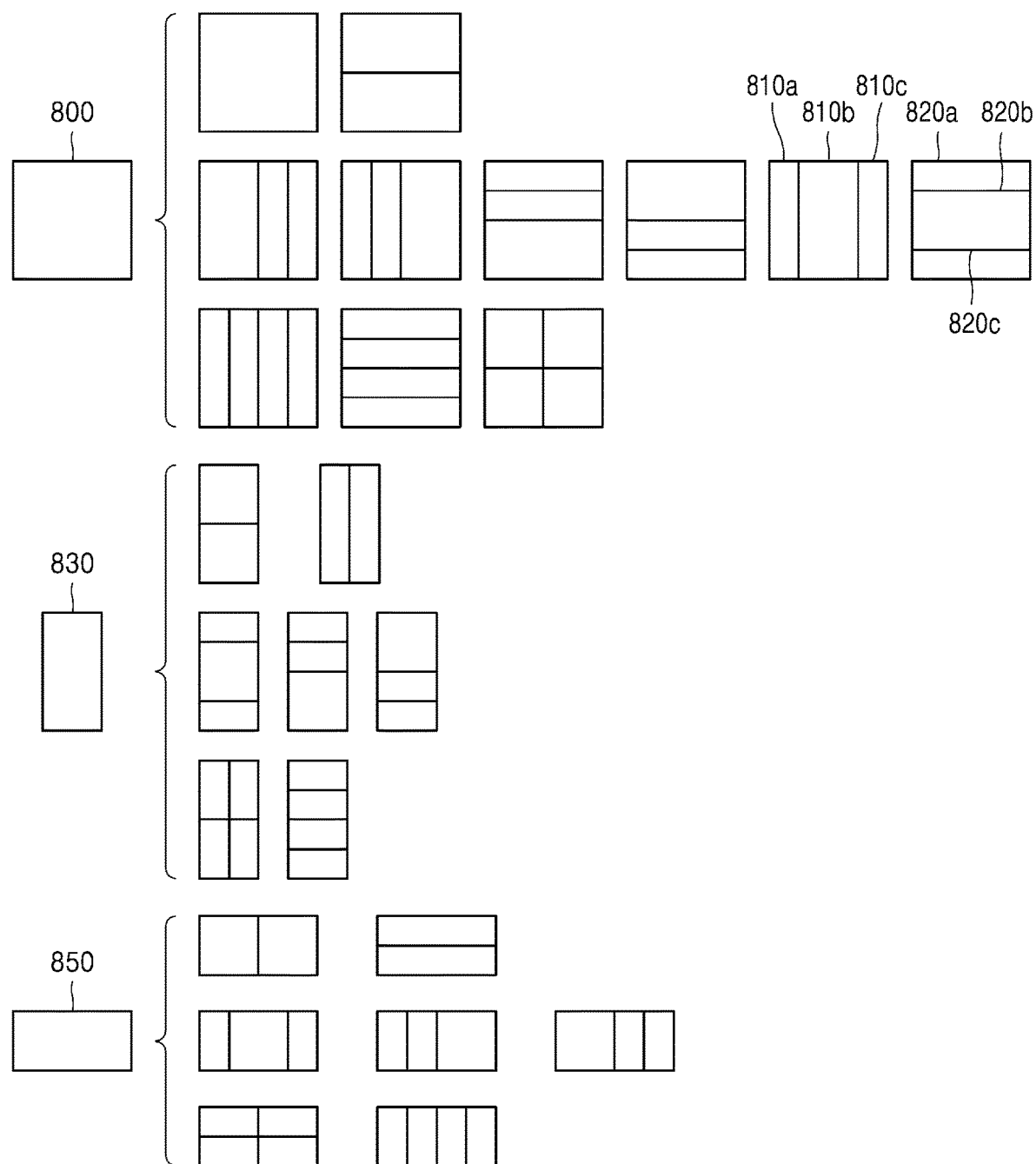
FIG. 8 illustrates a process of determining at least one coding unit by splitting a first coding unit, according to an embodiment.

FIG. 8 illustrates a process, performed by the image decoding apparatus 150, of determining at least one coding unit by splitting a first coding unit 800, according to an embodiment. According to an embodiment, the image decoding apparatus 150 may split the first coding unit 800, based on at least one of block shape information and split shape information, which is obtained by the receiver 160. The square first coding unit 800 may be split into four square coding units, or may be split into a plurality of non-square coding units. For example, referring to FIG. 8, when the block shape information indicates that the first coding unit 800 has a square shape and the split shape information indicates to split the first coding unit 800 into non-square coding units, the image decoding apparatus 150 may split the first coding unit 800 into a plurality of non-square coding units. In detail, when the split shape information indicates to determine an odd number of coding units by splitting the first coding unit 800 in a horizontal direction or a vertical direction, the image decoding apparatus 150 may split the square first coding unit 800 into an odd number of coding units, e.g., second coding units 810a, 810b, and 810c determined by splitting the square first coding unit 800 in a vertical direction or second coding units 820a, 820b, and 820c determined by splitting the square first coding unit 800 in a horizontal direction.

According to an embodiment, the image decoding apparatus 150 may determine whether the second coding units 810a, 810b, and 810c, and 820a, 820b, and 820c which are included in the first coding unit 800 satisfy a condition for processing in a certain order, and the condition relates to whether at least one of a width and a height of the first coding unit 800 is split in half along a boundary of the second coding units 810a, 810b, and 810c, and 820a, 820b, and 820c. Referring to FIG. 8, because boundaries of the second coding units 810a, 810b, and 810c determined by splitting the square first coding unit 800 in a vertical direction do not split the width of the first coding unit 800 in half, it may be determined that the first coding unit 800 does not satisfy the condition for processing in the certain order. Also, because boundaries of the second coding units 820a, 820b, and 820c determined by splitting the square first coding unit 800 in a horizontal direction do not split the height of the first coding unit 800 in half, it may be determined that the first coding unit 800 does not satisfy the condition for processing in the certain order. When the condition is not satisfied as described above, the image decoding apparatus 150 may decide disconnection of a scan order, and may determine that the first coding unit 800 is to be split into an odd number of coding units, based on a result of the decision. According to an embodiment, when a coding unit is split into an odd number of coding units, the image decoding apparatus 150 may put a certain restriction on a coding unit at a certain location from among the split coding units, and the restriction or the certain location has been described above through various embodiments and thus detailed descriptions thereof will not be provided here.

According to an embodiment, the image decoding apparatus 150 may determine various-shaped coding units by splitting a first coding unit.

Referring to FIG. 8, the image decoding apparatus 150 may split the square first coding unit 800 or a non-square first coding unit 830 or 850 into various-shaped coding units.

Figure 9:
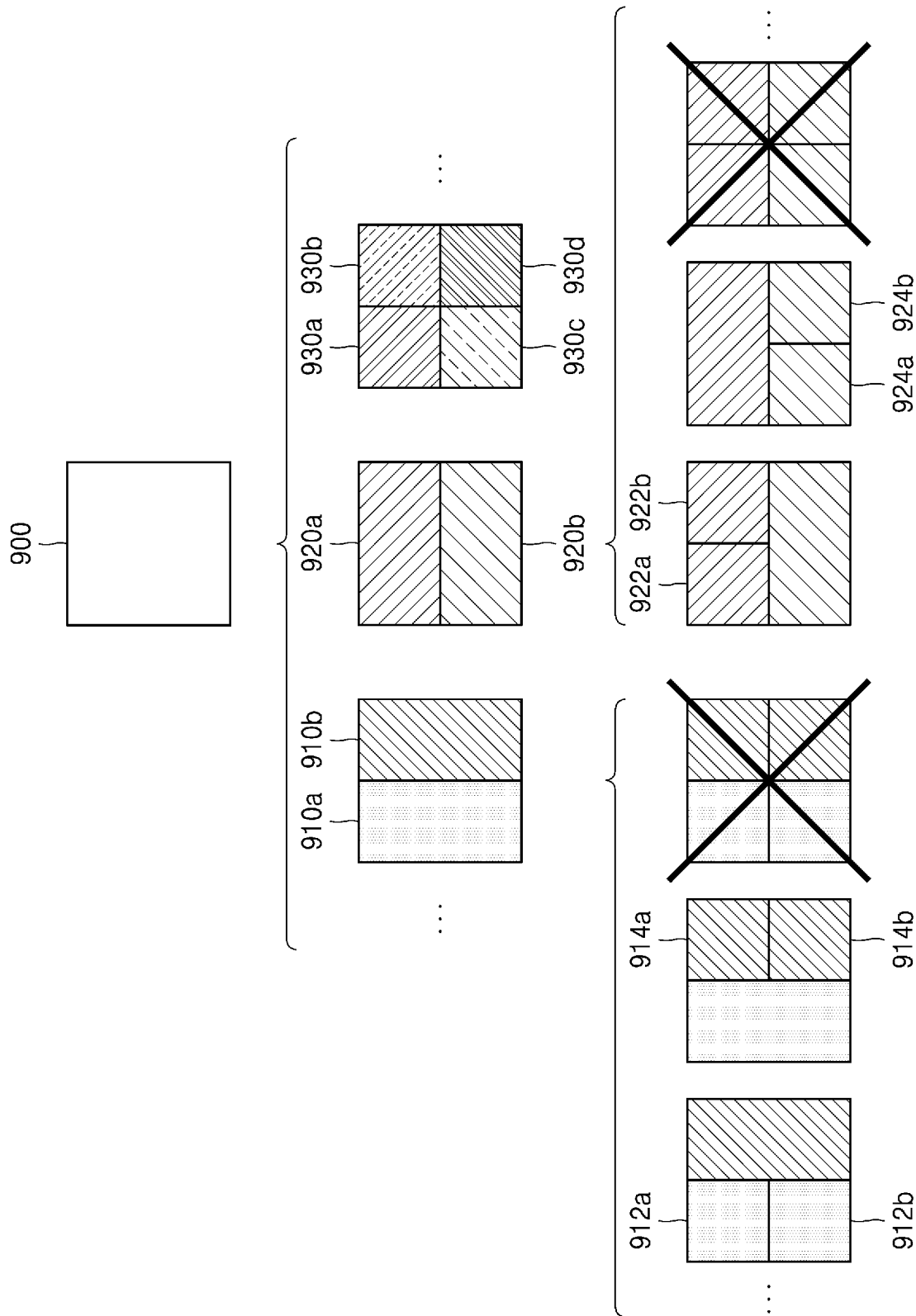
FIG. 9 illustrates that a shape into which a second coding unit is splittable is restricted when a non-square second coding unit determined by splitting a first coding unit satisfies a certain condition, according to an embodiment.

FIG. 9 illustrates that a shape into which a second coding unit is splittable by the image decoding apparatus 150 is restricted when a non-square second coding unit determined by splitting a first coding unit 900 satisfies a certain condition, according to an embodiment.

According to an embodiment, the image decoding apparatus 150 may determine to split the square first coding unit 900 into non-square second coding units 910a, 910b, 920a, and 920b, based on at least one of block shape information and split shape information, which is obtained by the receiver 160. The second coding units 910a, 910b, 920a, and 920b may be independently split. Accordingly, the image decoding apparatus 150 may determine to split or not to split the first coding unit 900 into a plurality of coding units, based on at least one of the block shape information and the split shape information of each of the second coding units 910a, 910b, 920a, and 920b. According to an embodiment, the image decoding apparatus 150 may determine third coding units 912a and 912b by splitting the non-square left second coding unit 910a, which is determined by splitting the first coding unit 900 in a vertical direction, in a horizontal direction. However, when the left second coding unit 910a is split in a horizontal direction, the image decoding apparatus 150 may restrict the right second coding unit 910b not to be split in a horizontal direction in which the left second coding unit 910a is split. When third coding units 914a and 914b are determined by splitting the right second coding unit 910b in the same direction, because the left and right second coding units 910a and 910b are independently split in a horizontal direction, the third coding units 912a and 912b, and 914a and 914b may be determined. However, this case serves equally as a case in which the image decoding apparatus 150 splits the first coding unit 900 into four square second coding units 930a, 930b, 930c, and 930d, based on at least one of the block shape information and the split shape information, and may be inefficient in terms of image decoding.

According to an embodiment, the image decoding apparatus 150 may determine third coding units 922a and 922b, or third coding units 924a and 924b by splitting the non-square second coding unit 920a or 920b, which is determined by splitting the first coding unit 900 in a horizontal direction, in a vertical direction. However, when a second coding unit (e.g., the upper second coding unit 920a) is split in a vertical direction, for the above-described reason, the image decoding apparatus 150 may restrict the other second coding unit (e.g., the lower second coding unit 920b) not to be split in a vertical direction in which the upper second coding unit 920a is split.

Figure 10:
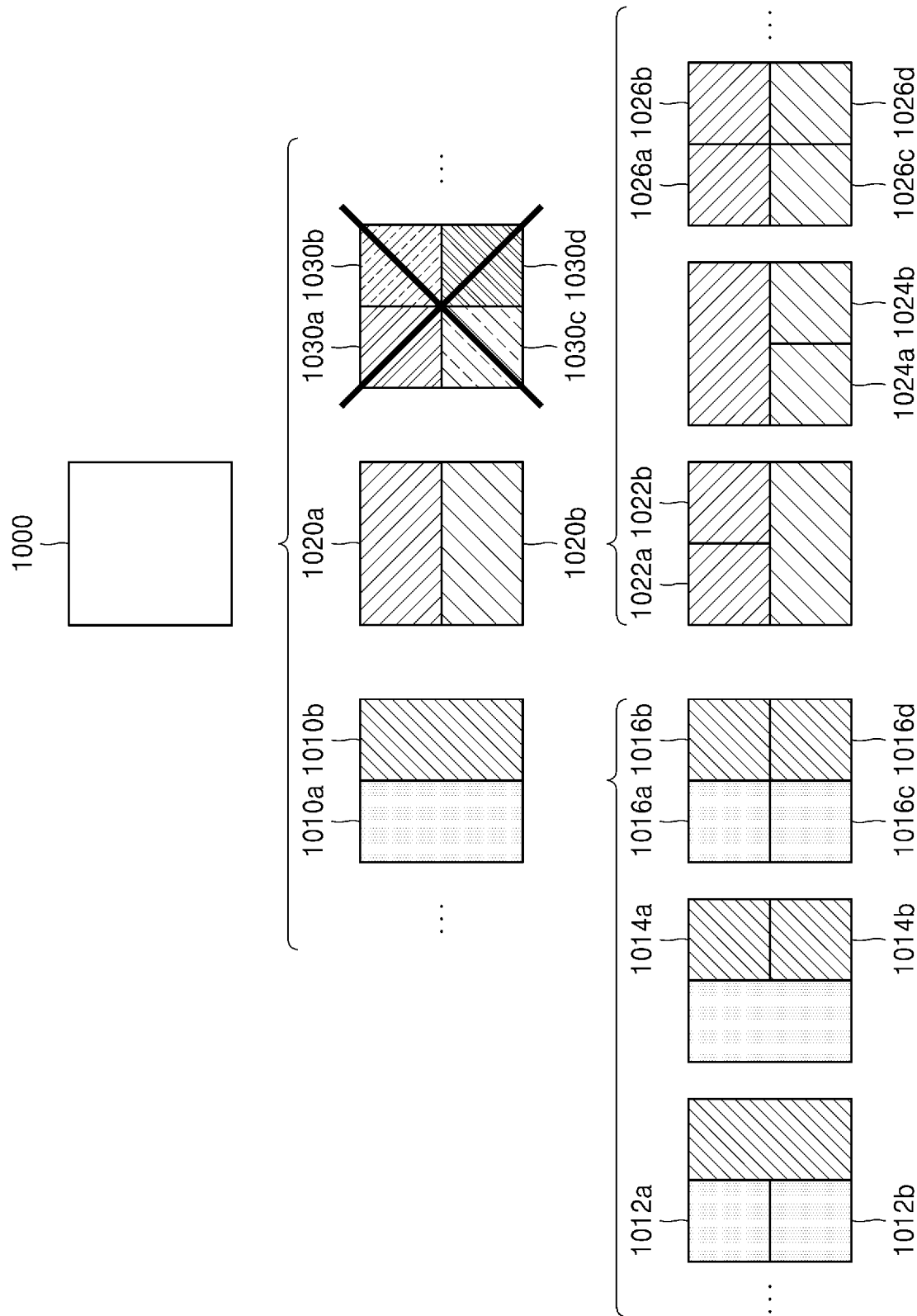
FIG. 10 illustrates a process of splitting a square coding unit when split shape information is unable to indicate that the square coding unit is to be split into four square coding units, according to an embodiment.

FIG. 10 illustrates a process, performed by the image decoding apparatus 150, of splitting a square coding unit when split shape information is unable to indicate that the square coding unit is to be split into four square coding units, according to an embodiment.

According to an embodiment, the image decoding apparatus 150 may determine second coding units 1010a, 1010b, 1020a, 1020b, etc. by splitting a first coding unit 1000, based on at least one of block shape information and split shape information. The split shape information may include information on various shapes into which a coding unit may be split, but, the information on various shapes may not include information for splitting a coding unit into four square coding units. According to such split shape information, the image decoding apparatus 150 may not split the first square coding unit 1000 into four square second coding units 1030a, 1030b, 1030c, and 1030d. The image decoding apparatus 150 may determine the non-square second coding units 1010a, 1010b, 1020a, 1020b, etc., based on the split shape information.

According to an embodiment, the image decoding apparatus 150 may independently split each of the non-square second coding units 1010a, 1010b, 1020a, 1020b, etc. Each of the second coding units 1010a, 1010b, 1020a, 1020b, etc. may be recursively split in a certain order, and this splitting method may correspond to a method of splitting the first coding unit 1000 based on at least one of the block shape information and the split shape information.

For example, the image decoding apparatus 150 may determine square third coding units 1012a and 1012b by splitting the left second coding unit 1010a in a horizontal direction, and may determine square third coding units 1014a and 1014b by splitting the right second coding unit 1010b in a horizontal direction. Furthermore, the image decoding apparatus 150 may determine square third coding units 1016a, 1016b, 1016c, and 1016d by splitting both the left and right second coding units 1010a and 1010b in a horizontal direction. In this case, coding units having the same shape as the four square second coding units 1030a, 1030b, 1030c, and 1030d split from the first coding unit 1000 may be determined.

As another example, the image decoding apparatus 150 may determine square third coding units 1022a and 1022b by splitting the upper second coding unit 1020a in a vertical direction, and may determine square third coding units 1024a and 1024b by splitting the lower second coding unit 1020b in a vertical direction. Furthermore, the image decoding apparatus 150 may determine square third coding units 1026a, 1026b, 1026c, and 1026d by splitting both the upper and lower second coding units 1020a and 1020b in a vertical direction. In this case, coding units having the same shape as the four square second coding units 1030a, 1030b, 1030c, and 1030d split from the first coding unit 1000 may be determined.

Figure 11:
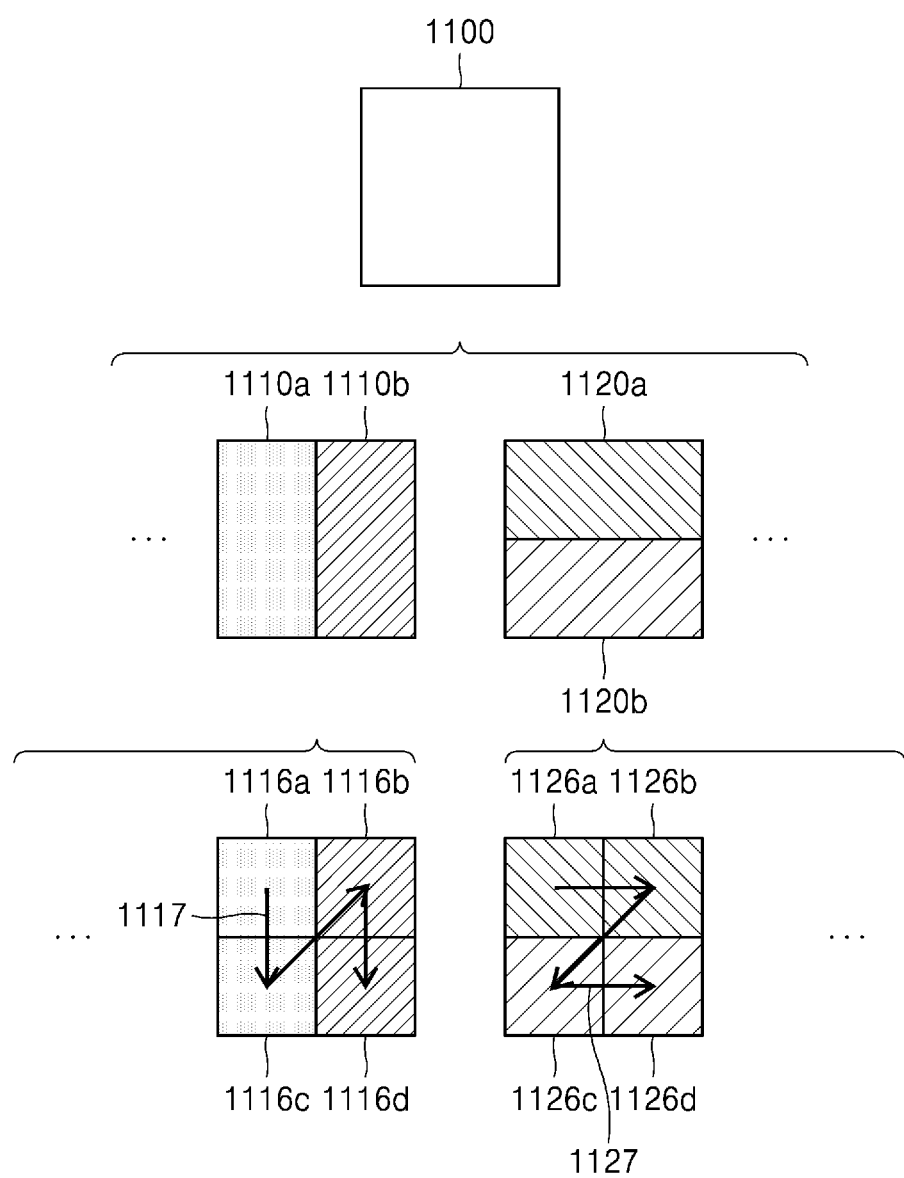
FIG. 11 illustrates that a processing order between a plurality of coding units may vary according to a process of splitting a coding unit, according to an embodiment.

FIG. 11 illustrates that a processing order between a plurality of coding units may vary according to a process of splitting a coding unit, according to an embodiment.

According to an embodiment, the image decoding apparatus 150 may split a first coding unit 1100 based on block shape information and split shape information. When the block shape information indicates a square shape and the split shape information indicates to split the first coding unit 1100 in at least one of horizontal and vertical directions, the image decoding apparatus 150 may determine second coding units (e.g., second coding units 1110a, 1110b, 1120a, 1120b, 1130a, 1130b, 1130c, 1130d, etc.) by splitting the first coding unit 1100. Referring to FIG. 11, the non-square second coding units 1110a, 1110b, 1120a, and 1120b determined by splitting the first coding unit 1100 in only a horizontal direction or vertical direction may be independently split based on the block shape information and the split shape information of each coding unit. For example, the image decoding apparatus 150 may determine third coding units 1116a, 1116b, 1116c, and 1116d by splitting the second coding units 1110a and 1110b, which are generated by splitting the first coding unit 1100 in a vertical direction, in a horizontal direction, and may determine third coding units 1126a, 1126b, 1126c, and 1126d by splitting the second coding units 1120a and 1120b, which are generated by splitting the first coding unit 1100 in a horizontal direction, in a horizontal direction. An operation of splitting the second coding units 1110a, 1110b, 1120a, and 1120b has been described above with reference to FIG. 9, and thus detailed descriptions thereof will not be provided here.

According to an embodiment, the image decoding apparatus 150 may process coding units in a certain order. An operation of processing coding units in a certain order has been described above with reference to FIG. 6, and thus detailed descriptions thereof will not be provided here. Referring to FIG. 11, the image decoding apparatus 150 may determine four square third coding units 1116a, 1116b, 1116c, and 1116d, and 1126a, 1126b, 1126c, and 1126d by splitting the square first coding unit 1100. According to an embodiment, the image decoding apparatus 150 may determine processing orders of the third coding units 1116a, 1116b, 1116c, and 1116d, and 1126a, 1126b, 1126c, and 1126d based on shapes into which the first coding unit 1100 is split.

According to an embodiment, the image decoding apparatus 150 may determine the third coding units 1116a, 1116b, 1116c, and 1116d by splitting the second coding units 1110a and 1110b generated by splitting the first coding unit 1100 in a vertical direction, in a horizontal direction, and may process the third coding units 1116a, 1116b, 1116c, and 1116d in a processing order 1117 for initially processing the third coding units 1116a and 1116b, which are included in the left second coding unit 1110a, in a vertical direction and then processing the third coding unit 1116c and 1116d, which are included in the right second coding unit 1110b, in a vertical direction.

According to an embodiment, the image decoding apparatus 150 may determine the third coding units 1126a, 1126b, 1126c, and 1126d by splitting the second coding units 1120a and 1120b generated by splitting the first coding unit 1100 in a horizontal direction, in a vertical direction, and may process the third coding units 1126a, 1126b, 1126c, and 1126d in a processing order 1127 for initially processing the third coding units 1126a and 1126b, which are included in the upper second coding unit 1120a, in a horizontal direction and then processing the third coding unit 1126c and 1126d, which are included in the lower second coding unit 1120b, in a horizontal direction.

Referring to FIG. 11, the square third coding units 1116a, 1116b, 1116c, and 1116d, and 1126a, 1126b, 1126c, and 1126d may be determined by splitting the second coding units 1110a, 1110b, 1120a, and 1120b, respectively. Although the second coding units 1110a and 1110b are determined by splitting the first coding unit 1100 in a vertical direction differently from the second coding units 1120a and 1120b which are determined by splitting the first coding unit 1100 in a horizontal direction, the third coding units 1116a, 1116b, 1116c, and 1116d, and 1126a, 1126b, 1126c, and 1126d split therefrom eventually show same-shaped coding units split from the first coding unit 1100. Accordingly, by recursively splitting a coding unit in different manners based on at least one of the block shape information and the split shape information, the image decoding apparatus 150 may process a plurality of coding units in different orders even when the coding units are eventually determined to have the same shape.

FIG. 12 illustrates a process of determining a depth of a coding unit as a shape and a size of the coding unit change, when the coding unit is recursively split such that a plurality of coding units are determined, according to an embodiment.

According to an embodiment, the image decoding apparatus 150 may determine the depth of the coding unit based on a certain criterion. For example, the certain criterion may be the length of a long side of the coding unit. When the length of a long side of a coding unit before being split is 2n times (n>0) the length of a long side of a split current coding unit, the image decoding apparatus 150 may determine that a depth of the current coding unit is increased from a depth of the coding unit before being split, by n. In the following descriptions, a coding unit having an increased depth is represented as a coding unit of a deeper depth.

Referring to FIG. 12, according to an embodiment, the image decoding apparatus 150 may determine a second coding unit 1202, a third coding unit 1204, etc. of deeper depths by splitting a square first coding unit 1200 based on block shape information indicating a square shape (e.g., the block shape information may indicate '0: SQUARE'). Assuming that the size of the square first coding unit 1200 is 2N×2N, the second coding unit 1202 determined by splitting a width and height of the first coding unit 1200 in ½ may have a size of N×N. Furthermore, the third coding unit 1204 determined by splitting a width and a height of the second coding unit 1202 in ½ may have a size of N/×N/2. In this case, a width and height of the third coding unit 1204 correspond to ½ times those of the first coding unit 1200. When a depth of the first coding unit 1200 is D, a depth of the second coding unit 1202, the width and height of which are ½ times those of the first coding unit 1200, may be D+1, and a depth of the third coding unit 1204, the width and height of which are ½ times those of the first coding unit 1200, may be D+2.

According to an embodiment, the image decoding apparatus 150 may determine a second coding unit 1212 or 1222, a third coding unit 1214 or 1224, etc. of deeper depths by splitting a non-square first coding unit 1210 or 1220 based on block shape information indicating a non-square shape (e.g., the block shape information may indicate '1: NS_VER' indicating a non-square shape, a height of which is longer than its width, or as '2: NS_HOR' indicating a non-square shape, a width of which is longer than its height).

The image decoding apparatus 150 may determine the second coding unit 1202, 1212, or 1222 by splitting at least one of a width and height of the first coding unit 1210 having a size of N×2N. That is, the image decoding apparatus 150 may determine the second coding unit 1202 having a size of N×N or the second coding unit 1222 having a size of N×N/2 by splitting the first coding unit 1210 in a horizontal direction, or may determine the second coding unit 1212 having a size of N/2×N by splitting the first coding unit 1210 in horizontal and vertical directions.

According to an embodiment, the image decoding apparatus 150 may determine the second coding unit 1202, 1212, or 1222 by splitting at least one of a width and height of the first coding unit 1220 having a size of 2N×N. That is, the image decoding apparatus 150 may determine the second coding unit 1202 having a size of N×N or the second coding unit 1212 having a size of N/2×N by splitting the first coding unit 1220 in a vertical direction, or may determine the second coding unit 1222 having a size of N×N/2 by splitting the first coding unit 1220 in horizontal and vertical directions.

According to an embodiment, the image decoding apparatus 150 may determine the third coding unit 1204, 1214, or 1224 by splitting at least one of a width and height of the second coding unit 1202 having a size of N×N. That is, the image decoding apparatus 150 may determine the third coding unit 1204 having a size of N/2×N/2, the third coding unit 1214 having a size of N/2×N/2, or the third coding unit 1224 having a size of N/2×N/2 by splitting the second coding unit 1202 in vertical and horizontal directions.

According to an embodiment, the image decoding apparatus 150 may determine the third coding unit 1204, 1214, or 1224 by splitting at least one of a width and height of the second coding unit 1212 having a size of N/2×N. That is, the image decoding apparatus 150 may determine the third coding unit 1204 having a size of N/2×N/2 or the third coding unit 1224 having a size of N/2×N/2 by splitting the second coding unit 1212 in a horizontal direction, or may determine the third coding unit 1214 having a size of N/2×N/2 by splitting the second coding unit 1212 in vertical and horizontal directions.

According to an embodiment, the image decoding apparatus 150 may determine the third coding unit 1204, 1214, or 1224 by splitting at least one of a width and height of the second coding unit 1214 having a size of N×N/2. That is, the image decoding apparatus 150 may determine the third coding unit 1204 having a size of N/2×N/2 or the third coding unit 1214 having a size of N/2×N/2 by splitting the second coding unit 1212 in a vertical direction, or may determine the third coding unit 1224 having a size of N/2×N/2 by splitting the second coding unit 1212 in vertical and horizontal directions.

According to an embodiment, the image decoding apparatus 150 may split a square coding unit (e.g., 1200, 1202, or 1204) in a horizontal or vertical direction. For example, the image decoding apparatus 150 may determine the first coding unit 1210 having a size of N×2N by splitting the first coding unit 1200 having a size of 2N×2N in a vertical direction, or may determine the first coding unit 1220 having a size of 2N×N by splitting the first coding unit 1200 in a horizontal direction. According to an embodiment, when a depth is determined based on the length of a longest side of a coding unit, a depth of a coding unit determined by splitting the first coding unit 1200, 1202, or 1204 having a size of 2N×2N in a horizontal or vertical direction may be the same as a depth of the first coding unit 1200, 1202, or 1204.

According to an embodiment, a width and height of the third coding unit 1214 or 1224 may be ½ times those of the first coding unit 1210 or 1220. When a depth of the first coding unit 1210 or 1220 is D, a depth of the second coding unit 1212 or 1214, the width and height of which are ½ times those of the first coding unit 1210 or 1220, may be D+1, and a depth of the third coding unit 1214 or 1224, the width and height of which are ¼ times those of the first coding unit 1210 or 1220, may be D+2.

Figure 13:
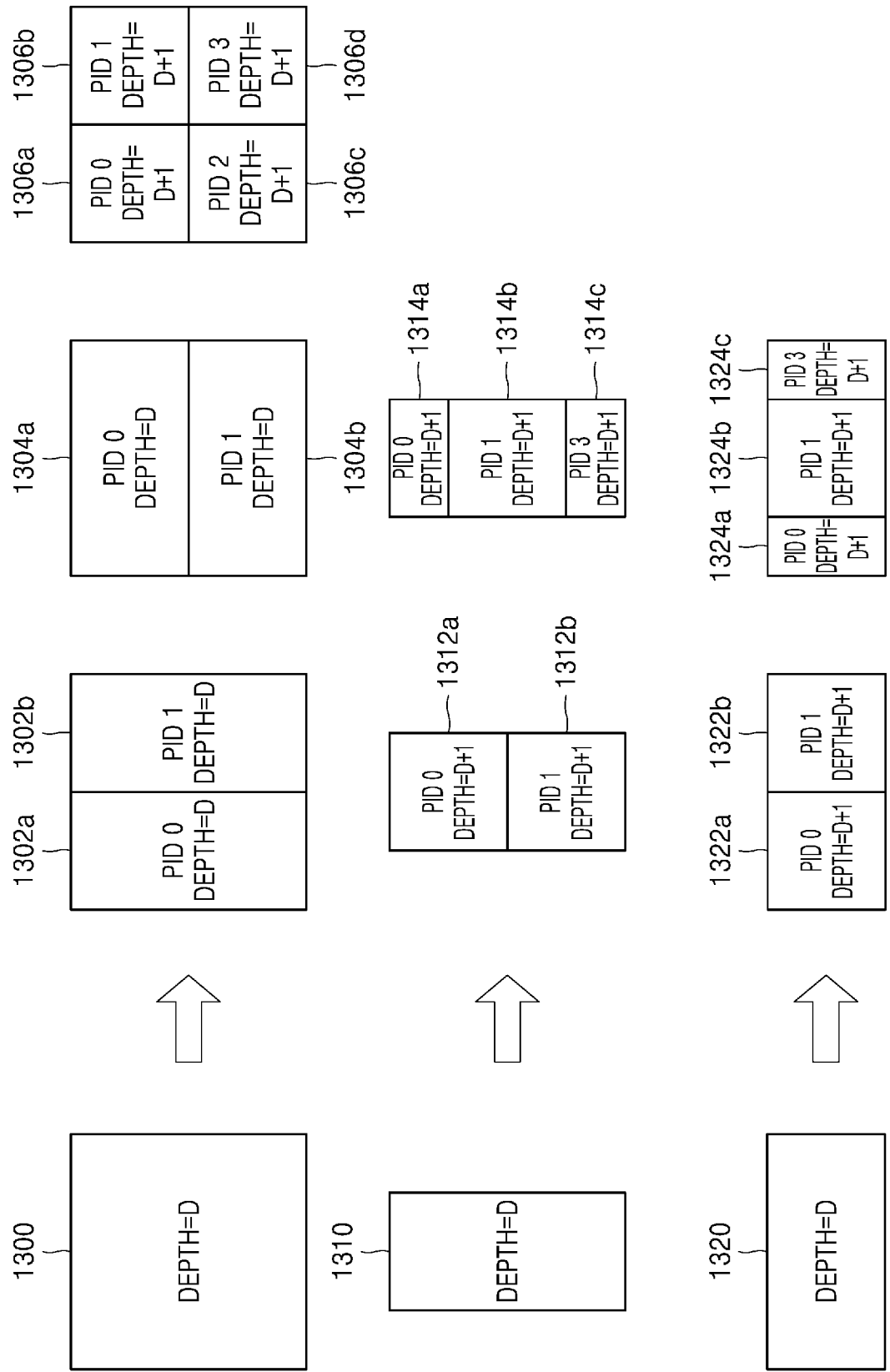
FIG. 13 illustrates depths that are determinable based on shapes and sizes of coding units, and part indexes (PIDs) that are for identifying the coding units, according to an embodiment.

FIG. 13 illustrates depths that are determinable based on shapes and sizes of coding units, and part indexes (PIDs) that are for identifying the coding units, according to an embodiment.

According to an embodiment, the image decoding apparatus 150 may determine various-shaped second coding units by splitting a square first coding unit 1300. Referring to FIG. 13, the image decoding apparatus 150 may determine second coding units 1302*a* and 1302*b*, 1304*a* and 1304*b*, and 1306*a*, 1306*b*, 1306*c*, and 1306*d* by splitting the first coding unit 1300 in at least one of vertical and horizontal directions based on split shape information. That is, the image decoding apparatus 150 may determine the second coding units 1302*a* and 1302*b*, 1304*a* and 1304*b*, and 1306*a*, 1306*b*, 1306*c*, and 1306*d*, based on the split shape information of the first coding unit 1300.

According to an embodiment, a depth of the second coding units 1302*a* and 1302*b*, 1304*a* and 1304*b*, and 1306*a*, 1306*b*, 1306*c*, and 1306*d*, which are determined based on the split shape information of the square first coding unit 1300, may be determined based on the length of a long side thereof. For example, because the length of a side of the square first coding unit 1300 is equal to the length of a long side of the non-square second coding units 1302*a* and 1302*b*, and 1304*a* and 1304*b*, the first coding unit 1300 and the non-square second coding units 1302*a* and 1302*b*, and 1304*a* and 1304*b* may have the same depth, e.g., D. However, when the image decoding apparatus 150 splits the first coding unit 1300 into the four square second coding units 1306*a*, 1306*b*, 1306*c*, and 1306*d* based on the split shape information, because the length of a side of the square second coding units 1306*a*, 1306*b*, 1306*c*, and 1306*d* is ½ times the length of a side of the first coding unit 1300, a depth of the second coding units 1306*a*, 1306*b*, 1306*c*, and 1306*d* may be D+1 which is deeper than the depth D of the first coding unit 1300 by 1.

According to an embodiment, the image decoding apparatus 150 may determine a plurality of second coding units 1312*a* and 1312*b*, and 1314*a*, 1314*b*, and 1314*c* by splitting a first coding unit 1310, a height of which is longer than its width, in a horizontal direction based on the split shape information. According to an embodiment, the image decoding apparatus 150 may determine a plurality of second coding units 1322*a* and 1322*b*, and 1324*a*, 1324*b*, and 1324*c* by splitting a first coding unit 1320, a width of which is longer than its height, in a vertical direction based on the split shape information.

According to an embodiment, a depth of the second coding units 1312*a*, 1312*b*, 1314*a*, 1314*b*, and 1314*c*, or 1322*a*, 1322*b*, 1324*a*, 1324*b*, and 1324*c*, which are determined based on the split shape information of the non-square first coding unit 1310 or 1320, may be determined based on the length of a long side thereof. For example, because the length of a side of the square second coding units 1312*a* and 1312*b* is ½ times the length of a side of the first coding unit 1310 having a non-square shape, a height of which is longer than its width, a depth of the square second coding units 1302*a*, 1302*b*, 1304*a*, and 1304*b* is D+1 which is deeper than the depth D of the non-square first coding unit 1310 by 1.

Furthermore, the image decoding apparatus 150 may split the non-square first coding unit 1310 into an odd number of second coding units 1314*a*, 1314*b*, and 1314*c*, based on the split shape information. The odd number of second coding units 1314*a*, 1314*b*, and 1314*c* may include the non-square second coding units 1314*a* and 1314*c* and the square second coding unit 1314*b*. In this case, because the length of a long side of the non-square second coding units 1314*a* and 1314*c* and the length of a side of the square second coding unit 1314*b* are ½ times the length of a side of the first coding unit 1310, a depth of the second coding units 1314*a*, 1314*b*, and 1314*c* may be D+1 which is deeper than the depth D of the first coding unit 1310 by 1. The image decoding apparatus 150 may determine depths of coding units split from the non-square first coding unit 1320, a width of which is longer than its height, by using the above-described method of determining depths of coding units split from the first coding unit 1310.

According to an embodiment, the image decoding apparatus 150 may determine PIDs for identifying split coding units, based on a size ratio between the coding units when an odd number of split coding units do not have equal sizes. Referring to FIG. 13, the coding unit 1314*b* of a center location among the odd number of split coding units 1314*a*, 1314*b*, and 1314*c* may have a width which is equal to that of the other coding units 1314*a* and 1314*c* and a height which is two times that of the other coding units 1314*a* and 1314*c*. That is, in this case, the coding unit 1314*b* at the center location may include two of the other coding units 1314*a* and 1314*c*. Accordingly, when a PID of the coding unit 1314*b* at the center location is 1 based on a scan order, a PID of the coding unit 1314*c* located next to the coding unit 1314*b* may be increased by 2 and thus may be 3. That is, discontinuity in PID values may be present. According to an embodiment, the image decoding apparatus 150 may determine whether an odd number of split coding units do not have equal sizes based on whether discontinuity is present in PIDs for identifying the split coding units.

According to an embodiment, the image decoding apparatus 150 may determine whether to use a specific splitting method based on PID values for identifying a plurality of coding units determined by splitting a current coding unit. Referring to FIG. 13, the image decoding apparatus 150 may determine an even number of coding units 1312a and 1312b or an odd number of coding units 1314a, 1314b, and 1314c by splitting the first coding unit 1310 having a rectangular shape, a height of which is longer than its width. The image decoding apparatus 150 may use PIDs indicating respective coding units so as to identify the respective coding units. According to an embodiment, the PID may be obtained from a sample of a certain location (e.g., a top left sample) of each coding unit.

According to an embodiment, the image decoding apparatus 150 may determine a coding unit at a certain location from among the split coding units, by using the PIDs for identifying the coding units. According to an embodiment, when the split shape information of the first coding unit 1310 having a rectangular shape, a height of which is longer than its width, indicates to split a coding unit into three coding units, the image decoding apparatus 150 may split the first coding unit 1310 into three coding units 1314a, 1314b, and 1314c. The image decoding apparatus 150 may assign a PID to each of the three coding units 1314a, 1314b, and 1314c. The image decoding apparatus 150 may compare PIDs of an odd number of split coding units to determine a coding unit at a center location from among the coding units. The image decoding apparatus 150 may determine the coding unit 1314b having a PID corresponding to a median value among the PIDs of the coding units, as the coding unit at the center location from among the coding units determined by splitting the first coding unit 1310. According to an embodiment, the image decoding apparatus 150 may determine PIDs for identifying split coding units, based on a size ratio between the coding units when the split coding units do not have equal sizes. Referring to FIG. 13, the coding unit 1314b generated by splitting the first coding unit 1310 may have a width which is equal to that of the other coding units 1314a and 1314c and a height which is two times that of the other coding units 1314a and 1314c. In this case, when the PID of the coding unit 1314b at the center location is 1, the PID of the coding unit 1314c located next to the coding unit 1314b may be increased by 2 and thus may be 3. When the PID is not uniformly increased as described above, the image decoding apparatus 150 may determine that a coding unit is split into a plurality of coding units including a coding unit having a size different from that of the other coding units. According to an embodiment, when the split shape information indicates to split a coding unit into an odd number of coding units, the image decoding apparatus 150 may split a current coding unit in such a manner that a coding unit of a certain location (e.g., a coding unit of a center location) among an odd number of coding units has a size different from that of the other coding units. In this case, the image decoding apparatus 150 may determine the coding unit of the center location, which has a different size, by using PIDs of the coding units. However, the PID and the size or location of the coding unit of the certain location to be determined are not limited to the above-described examples, and various PIDs and various locations and sizes of coding units may be used.

According to an embodiment, the image decoding apparatus 150 may use a certain data unit where a coding unit starts to be recursively split.

Figure 14:
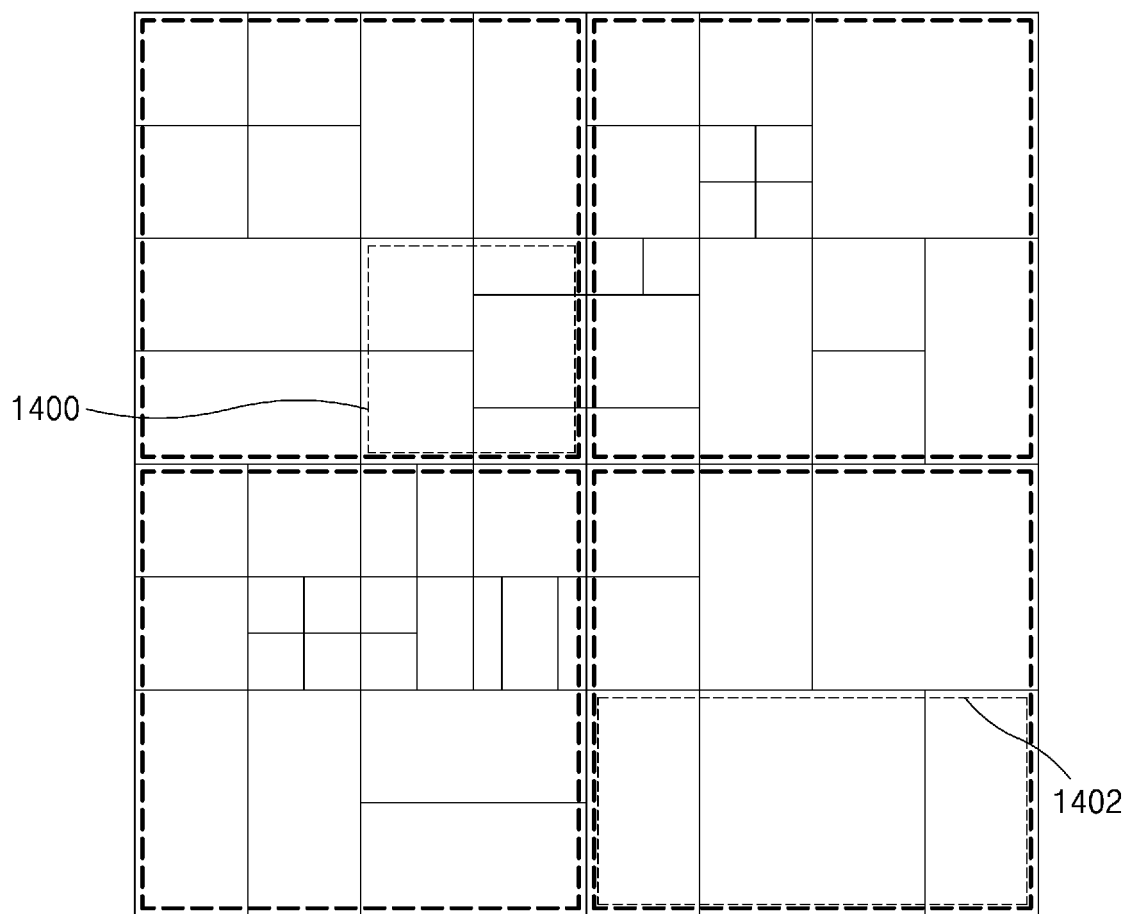
FIG. 14 illustrates that a plurality of coding units are determined based on a plurality of certain data units included in a picture, according to an embodiment.

FIG. 14 illustrates that a plurality of coding units are determined based on a plurality of certain data units included in a picture, according to an embodiment.

According to an embodiment, a certain data unit may be defined as a data unit where a coding unit starts to be recursively split by using at least one of block shape information and split shape information. That is, the certain data unit may correspond to a coding unit of an uppermost depth, which is used to determine a plurality of coding units split from a current picture. In the following descriptions, for convenience of explanation, the certain data unit is referred to as a reference data unit.

According to an embodiment, the reference data unit may have a certain size and a certain shape. According to an embodiment, the reference data unit may include M×N samples. Herein, M and N may be equal to each other, and may be integers expressed as powers of 2. That is, the reference data unit may have a square or non-square shape, and may be split into an integer number of coding units.

According to an embodiment, the image decoding apparatus 150 may split a current picture into a plurality of reference data units. According to an embodiment, the image decoding apparatus 150 may split the plurality of reference data units, which are split from the current picture, by using split shape information of each reference data unit. An operation of splitting the reference data unit may correspond to a splitting operation using a quadtree structure.

According to an embodiment, the image decoding apparatus 150 may previously determine a minimum size allowed for the reference data units included in the current picture. Accordingly, the image decoding apparatus 150 may determine various reference data units having sizes equal to or greater than the minimum size, and may determine one or more coding units by using the split shape information and block shape information with reference to the determined reference data units.

Referring to FIG. 14, the image decoding apparatus 150 may use a square reference coding unit 1400 or a non-square reference coding unit 1402. According to an embodiment, the shape and size of reference coding units may be determined based on various data units capable of including one or more reference coding units (e.g., sequences, pictures, slices, slice segments, largest coding units, or the like).

According to an embodiment, the receiver 160 of the image decoding apparatus 150 may obtain, from a bitstream, at least one of reference coding unit shape information and reference coding unit size information for each of the various data units. An operation of determining one or more coding units included in the square reference coding unit 1400 has been described above in relation to the operation of splitting the current coding unit 300 of FIG. 10, and an operation of determining one or more coding units included in the non-square reference coding unit 1402 has been described above in relation to the operation of splitting the current coding unit 1100 or 1150 of FIG. 11, and thus, detailed descriptions thereof will not be provided here.

According to an embodiment, the image decoding apparatus 150 may use a PID for identifying the size and shape of reference coding units, to determine the size and shape of reference coding units according to some data units previously determined based on a certain condition. That is, the receiver 160 may obtain, from the bitstream, only the PID for identifying the size and shape of reference coding units for each slice, slice segment, or largest coding unit which is a data unit satisfying a certain condition (e.g., a data unit having a size equal to or smaller than a slice) among the various data units (e.g., sequences, pictures, slices, slice segments, largest coding units, or the like). The image decoding apparatus 150 may determine the size and shape of reference data units for each data unit, which satisfies the certain condition, by using the PID. When the reference coding unit shape information and the reference coding unit size information are obtained and used from the bitstream according to each data unit having a relatively small size, efficiency of using the bitstream may not be high, and therefore, only the PID may be obtained and used instead of directly obtaining the reference coding unit shape information and the reference coding unit size information. In this case, at least one of the size and shape of reference coding units corresponding to the PID for identifying the size and shape of reference coding units may be predetermined. That is, the image decoding apparatus 150 may determine at least one of the size and shape of reference coding units included in a data unit serving as a unit for obtaining the PID, by selecting the previously determined at least one of the size and shape of reference coding units based on the PID.

According to an embodiment, the image decoding apparatus 150 may use one or more reference coding units included in one largest coding unit. That is, a largest coding unit split from an image may include one or more reference coding units, and coding units may be determined by recursively splitting each reference coding unit. According to an embodiment, at least one of a width and height of the largest coding unit may be integer times at least one of the width and height of the reference coding units. According to an embodiment, the size of reference coding units may be obtained by splitting the largest coding unit n times based on a quadtree structure. That is, the image decoding apparatus 150 may determine the reference coding units by splitting the largest coding unit n times based on a quadtree structure, and may split the reference coding unit based on at least one of the block shape information and the split shape information according to various embodiments.

Figure 15:
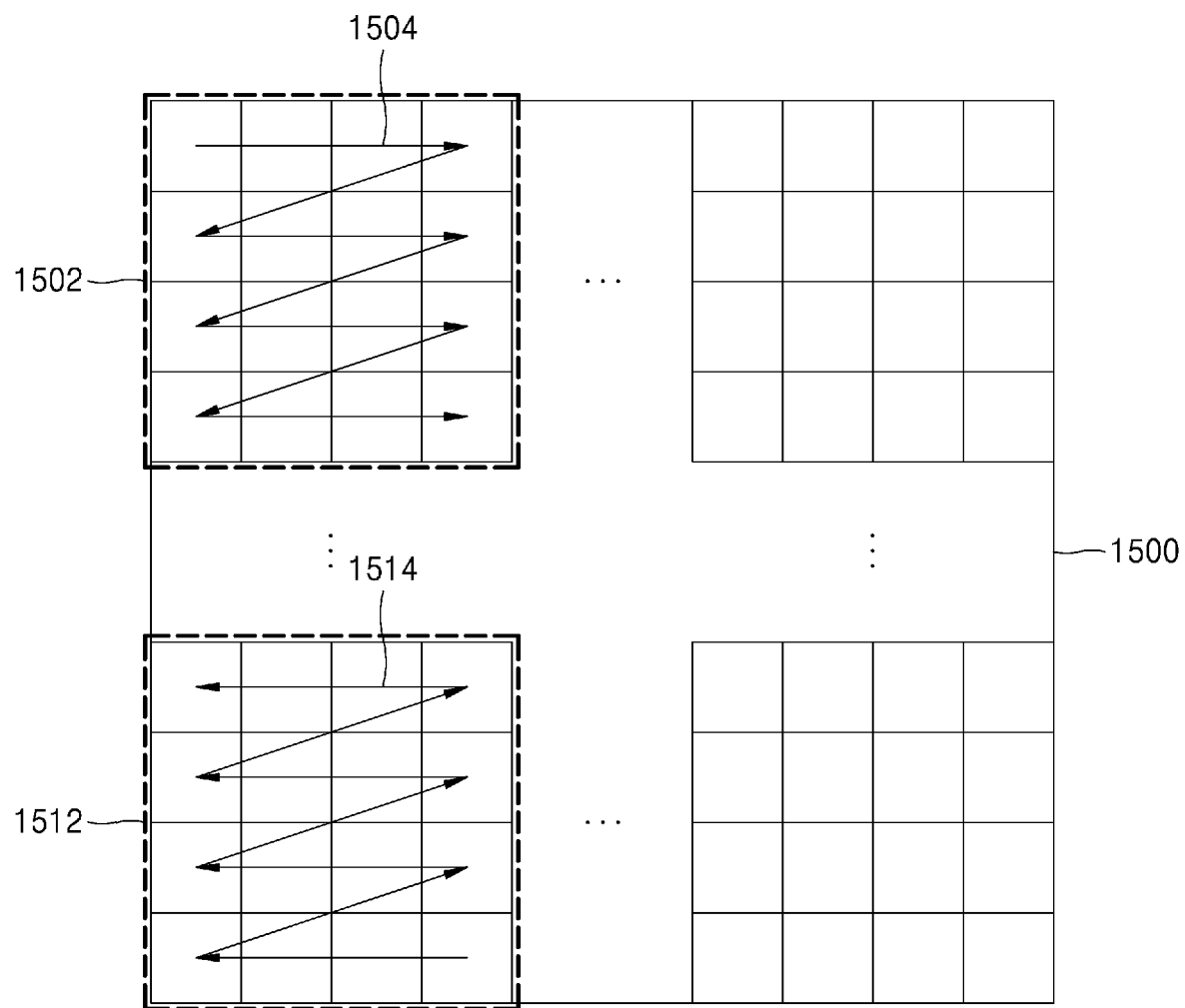
FIG. 15 illustrates a processing block serving as a criterion for determining a determination order of reference coding units included in a picture, according to an embodiment.

FIG. 15 illustrates a processing block serving as a criterion for determining a determination order of reference coding units included in a picture 1500, according to an embodiment.

According to an embodiment, the image decoding apparatus 150 may determine one or more processing blocks split from a picture. The processing block is a data unit including one or more reference coding units split from an image, and the one or more reference coding units included in the processing block may be determined according to a specific order. That is, a determination order of one or more reference coding units determined in each processing block may correspond to one of various types of orders for determining reference coding units, and may vary depending on the processing block. The determination order of reference coding units, which is determined for each processing block, may be one of various orders, e.g., raster scan, Z-scan, N-scan, up-right diagonal scan, horizontal scan, and vertical scan, but is not limited to the above-mentioned scan orders.

According to an embodiment, the image decoding apparatus 150 may obtain processing block size information and may determine the size of one or more processing blocks included in the image. The image decoding apparatus 150 may obtain the processing block size information from a bitstream and may determine the size of one or more processing blocks included in the image. The size of processing blocks may be a certain size of data units, which is indicated by the processing block size information.

According to an embodiment, the receiver 160 of the image decoding apparatus 150 may obtain the processing block size information from the bitstream for each specific data unit. For example, the processing block size information may be obtained from the bitstream in a data unit such as an image, sequence, picture, slice, or slice segment. That is, the receiver 160 may obtain the processing block size information from the bitstream for each of the various data units, the image decoding apparatus 150 may determine the size of one or more processing blocks, which are split from the picture by using the obtained processing block size information, and the size of the processing blocks may be integer times that of the reference coding units.

According to an embodiment, the image decoding apparatus 150 may determine the size of processing blocks 1502 and 1512 included in the picture 1500. For example, the image decoding apparatus 150 may determine the size of processing blocks based on the processing block size information obtained from the bitstream. Referring to FIG. 15, according to an embodiment, the image decoding apparatus 150 may determine the width of the processing blocks 1502 and 1512 to be four times the width of the reference coding units, and may determine the height of the processing blocks 1502 and 1512 to be four times the height of the reference coding units. The image decoding apparatus 150 may determine a determination order of one or more reference coding units in one or more processing blocks.

According to an embodiment, the image decoding apparatus 150 may determine the processing blocks 1502 and 1512, which are included in the picture 1500, based on the size of processing blocks, and may determine a determination order of one or more reference coding units included in the processing blocks 1502 and 1512. According to an embodiment, determination of reference coding units may include determination of the size of the reference coding units.

According to an embodiment, the image decoding apparatus 150 may obtain, from the bitstream, determination order information of one or more reference coding units included in one or more processing blocks, and may determine a determination order of one or more reference coding units based on the obtained determination order information. The determination order information may be defined as an order or direction for determining the reference coding units in the processing block. That is, the determination order of reference coding units may be independently determined for each processing block.

According to an embodiment, the image decoding apparatus 150 may obtain, from the bitstream, the determination order information of reference coding units for each specific data unit. For example, the receiver 160 may obtain the determination order information of reference coding units from the bitstream according to each data unit such as an image, sequence, picture, slice, slice segment, or processing block. Because the determination order information of reference coding units indicates an order for determining reference coding units in a processing block, the determination order information may be obtained for each specific data unit including an integer number of processing blocks.

According to an embodiment, the image decoding apparatus 150 may determine one or more reference coding units based on the determined determination order.

According to an embodiment, the receiver 160 may obtain the determination order information of reference coding units from the bitstream as information related to the processing blocks 1502 and 1512, and the image decoding apparatus 150 may determine a determination order of one or more reference coding units included in the processing blocks 1502 and 1512 and may determine one or more reference coding units, which are included in the picture

1500, based on the determination order of the reference coding units. Referring to FIG. 15, the image decoding apparatus 150 may determine determination orders 1504 and 1514 of one or more reference coding units in the processing blocks 1502 and 1512, respectively. For example, when the determination order information of reference coding units is obtained for each processing block, different types of the determination order information of reference coding units may be obtained for the processing blocks 1502 and 1512. When the determination order 1504 of reference coding units in the processing block 1502 is a raster scan order, reference coding units included in the processing block 1502 may be determined according to the raster scan order. On the contrary, when the determination order 1514 of reference coding units in the other processing block 1512 is a backward raster scan order, reference coding units included in the processing block 1512 may be determined according to the backward raster scan order. With reference to FIGS. 1 through 15, a method of splitting an image into largest coding units and splitting the largest coding units into coding units having a hierarchical tree structure is described. With reference to FIGS. 16 through 26, various embodiments of video encoding and decoding methods according to various intra coding tools will be described.

Position dependent intra prediction filtering is a coding tool that corrects a prediction value of a sample of a current block predicted according to an intra prediction mode, according to reference samples adaptively determined to a position of the sample and weights of the reference samples. The reference samples adjacent to the current block are reflected in the prediction value of the sample of the current block, according to the position dependent intra prediction filtering, and thus prediction accuracy according to intra prediction may be improved.

Figure 16:
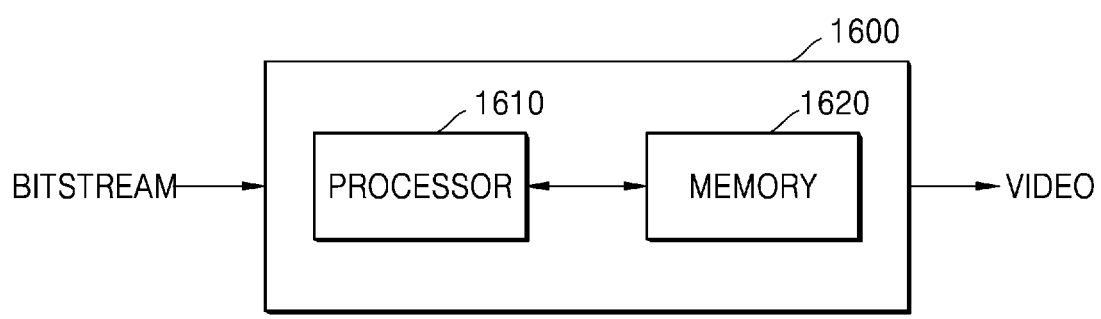
FIG. 16 is a block diagram illustrating a video decoding apparatus to which various intra prediction tools are applied.

FIG. 16 is a block diagram illustrating a video decoding apparatus 1600 to which various intra coding tools are applied.

Referring to FIG. 16, the video decoding apparatus 1600 according to an embodiment may include a processor 1610 and a memory 1620.

The processor 1610 according to an embodiment may generally control the video decoding apparatus 1600. The processor 1610 according to an embodiment may execute one or more programs stored in the memory 1620.

The memory 1620 according to an embodiment may store various data, program, or application for driving and controlling the video decoding apparatus 1600. The program stored in the memory 1620 may include one or more instructions. The program (the one or more instructions) or the application stored in the memory 1620 may be executed by the processor 1610.

The video decoding apparatus 1600 may perform position dependent intra prediction filtering on a predicted sample of a current block, according to an intra prediction mode of the current block.

The processor 1610 may predict the current block according to the intra prediction mode of the current block.

The processor 1610 may determine whether to apply the position dependent intra prediction filtering to the current block according to the intra prediction mode of the current block.

According to an embodiment, when the intra prediction mode of the current block is a certain intra prediction mode, the processor 1610 may determine to apply the position dependent intra prediction filtering the current block. Examples of the certain intra prediction mode may include a DC mode, a planar mode, a vertical mode, a horizontal mode, a lower left directional intra prediction mode, and an upper right directional intra prediction mode.

The lower left directional intra prediction mode is an intra prediction mode that refers to a sample located in a lower left direction from a current sample. The lower left directional intra prediction mode may include a lower left diagonal mode and an intra prediction mode between the horizontal mode and the lower left diagonal mode. For example, when an index of the horizontal mode is 18 and an index of the lower left diagonal mode is 2, the lower left directional intra prediction mode may include an intra prediction mode having an index ranging from 2 to 17.

Also, the upper right directional intra prediction mode is an intra prediction mode that refers to a sample located in an upper right direction from the current sample. The upper right directional intra prediction mode may include an upper right diagonal mode and an intra prediction mode between the vertical mode and the upper right diagonal mode. For example, when an index of the vertical mode is 50 and an index of the upper right diagonal mode is 66, the upper right directional intra prediction mode may include an intra prediction mode having an index ranging from 51 to 66. The certain intra prediction mode may be easily changed by one of ordinary skill in the art.

When the position dependent intra prediction filtering is applied to the current block, the processor 1610 determines a parameter for the position dependent intra prediction filtering of the current sample of the current block, according to the intra prediction mode of the current block. The parameter may include at least one of an upper reference sample, a left reference sample, an upper weight, and a left weight.

A method of determining the upper reference sample, the left reference sample, the upper weight, and the left weight for the position dependent intra prediction filtering may vary according to the intra prediction mode of the current block.

According to an embodiment, when the intra prediction mode of the current block is the DC mode or the planar mode, the processor 1610 may determine an upper reference sample, a left reference sample, an upper weight, and a left weight as follows. First, the upper reference sample may be determined according to a reference sample located in an upper direction of the current sample. The left reference sample may be determined according to a reference sample located in a left direction of the current sample. The upper weight may be determined according to a vertical distance between the current sample and an upper sample of the current block. The left weight may be determined according to a horizontal distance between the current sample and a left sample of the current block.

According to an embodiment, when the intra prediction mode of the current block is the DC mode or the planar mode, the upper weight may be set to decrease as the vertical distance between the current sample and the upper sample of the current block increases. The left weight may be set to decrease as the horizontal distance between the current sample and the left sample of the current block increases.

According to an embodiment, the amount of decrease in the upper weight as the vertical distance between the current sample and the upper sample of the current block increases may be determined according to a size of the current block. For example, as the size of the current block increases, the amount of decrease in the upper weight may decrease.

Likewise, the amount of decrease in the left weight as the horizontal distance between the current sample and the left sample of the current block increases may be determined according to the size of the current block. For example, as the size of the current block increases, the amount of decrease in the left weight may decrease.

According to an embodiment, when the intra prediction mode of the current block is the horizontal mode, a left reference sample and/or a left weight of the current sample may be determined to be 0 or may not be determined. Accordingly, the left reference sample of the current sample is not used for the position dependent intra prediction filtering.

An upper reference sample of the current sample may be determined according to a reference sample located in an upper direction of the current sample. A sample value of the upper reference sample is adjusted by summing a prediction value of the current sample and subtracting a sample value of an upper left adjacent sample of the current block. The adjusted sample value of the upper reference sample is used for the position dependent intra prediction filtering.

Also, an upper weight of the current sample may be determined according to a vertical distance between the current sample and an upper sample of the current block. The upper weight may be set to decrease as the vertical distance between the current sample and the upper sample of the current block increases. The amount of decrease in the upper weight as the vertical distance between the current sample and the upper sample of the current block increases may be determined according to a size of the current block. For example, the amount of decrease in the upper weight may decrease as the size of the current block increases.

According to an embodiment, when the intra prediction mode of the current block is the vertical mode, an upper reference sample and/or an upper weight of the current sample may be determined to be 0 or may not be determined. Accordingly, the upper reference sample of the current sample is not used for the position dependent intra prediction filtering.

A left reference sample of the current sample may be determined according to a reference sample located in a left direction of the current sample. A sample value of the left reference sample is adjusted by summing a prediction value of the current sample and subtracting a sample value of an upper left adjacent sample of the current block. The adjusted sample value of the left reference sample is used for the position dependent intra prediction filtering.

Also, a left weight of the current sample may be determined according to a horizontal distance between the current sample and a left sample of the current block. The left weight may be set to decrease as the horizontal distance between the current sample and the left sample of the current block increases. The amount of decrease in the left weight as the horizontal distance between the current sample and the left sample of the current block increases may be determined according to a size of the current block. For example, as the size of the current block increases, the amount of decrease in the left weight may decrease.

According to an embodiment, when the intra prediction mode of the current block is the lower left directional intra prediction mode, a left reference sample and a left weight of the current sample may be determined to be 0 or may not be determined. An upper weight may be determined according to a vertical distance between the current sample and an upper side of the current block. An upper reference sample of the current sample may be determined according to an upper reference position in a direction opposite to a prediction direction of a lower left directional intra prediction mode from the current sample.

According to an embodiment, when the upper reference position is an integer, a sample at the upper reference position is determined as the upper reference sample. However, when the upper reference position is a fraction, a sample closest to the upper reference position may be determined as the upper reference sample. Alternatively, when a sample located on the left of the upper reference position may be determined as the upper reference sample. Alternatively, a sample located on the right of the upper reference position may be determined as the upper reference sample. Alternatively, a sample interpolated according to a sample located on the left of the upper reference position and a sample on the right of the upper reference position may be determined as the upper reference sample.

According to an embodiment, when the intra prediction mode of the current block is the upper right directional intra prediction mode, an upper reference sample and an upper weight of the current sample may be determined to be 0 or may not be determined. A left weight may be determined according to a horizontal distance between the current sample and a left side of the current block. A left reference sample of the current sample may be determined according to a left reference position in a direction opposite to a prediction direction of an upper right directional intra prediction mode of the current sample.

According to an embodiment, when the left reference position is an integer, a sample of the left reference position is determined as the left reference sample. However, when the left reference position is a fraction, a sample closest to the left reference position may be determined as the left reference sample. Alternatively, a sample located above the left reference position may be determined as the left reference sample. Alternatively, a sample located below the left reference position may be determined as the left reference sample. Alternatively, a sample interpolated according to a sample located above the left reference position and a sample located below the left reference position may be determined as the left reference sample.

According to an embodiment, the position dependent intra prediction filtering may be applied to samples whose distance with respect to an upper side of the current block is less than a certain threshold value. Accordingly, the position dependent intra prediction filtering may be applied to samples close to the upper side of the current block. The position dependent intra prediction filtering may not be applied to samples far from the upper side of the current block.

For example, when the intra prediction mode of the current block is the lower left directional intra prediction mode, an upper weight may be determined to be 0 when a distance between the current sample and the upper side of the current block is equal to or greater than a threshold value. Also, when the intra prediction mode of the current block is the upper right directional intra prediction mode, a left weight may be determined to be 0 when a distance between the current sample and a left surface of the current block is equal to or greater than a threshold value. The threshold value may be determined according to a size of the current block.

The processor 1610 applies the position dependent intra prediction filtering to the current sample of the current block, according to at least one of the upper reference sample, the left reference sample, the upper weight, and the left weight. For example, the position dependent intra prediction filtered current sample may be determined, according to a weighted average value of the current sample, the upper reference sample, and the left reference sample.

Weights of the upper reference sample and the left reference sample applied to obtain the weighted average value may be respectively the upper weight and the left weight, or may be determined according to the upper weight and the left weight. A weight of the current sample is determined according to the upper weight and the left weight. For example, the weight of the current sample may be determined from a value obtained by subtracting the upper weight and the left weight from a certain value. In this case, the certain value may be determined according to a size of the current block or a pre-determined scaling or shift value.

The video decoding apparatus 1600 may predict a current luma block according to an intra sub-partition coding mode.

The processor 1610 obtains, from a bitstream, split information indicating whether to split the current luma block predicted according to an intra prediction tool into a plurality of partitions.

When the split information indicates that the current luma block is split into the plurality of partitions, the processor 1610 splits the current luma block into the plurality of partitions, according to split mode information indicating a split mode of the current luma block obtained from the bitstream. The split mode information may indicate whether a split direction of the current luma block is a vertical direction or a horizontal direction. Also, the split mode information may indicate the number of the plurality of partitions split from the current luma block. The split mode information may indicate both the split direction of the current luma block and the number of partitions.

The processor 1610 determines intra prediction modes of the plurality of partitions, according to intra prediction mode information obtained from the bitstream.

According to an embodiment, the intra prediction mode indicated by the intra prediction mode information may be equally applied to all partitions.

According to an embodiment, the intra prediction mode information may indicate a main directional intra prediction mode. The main directional intra prediction mode may be applied to one of the plurality of partitions.

One or more adjacent directional intra prediction modes adjacent to the main directional intra prediction mode may be additionally determined. For example, when the current luma block is split into two partitions, one adjacent directional intra prediction mode may be determined. The adjacent directional intra prediction mode may be allocated to a partition other than a partition to which the main directional intra prediction mode is applied. In another example, when the current luma block is split into four partitions, three adjacent directional intra prediction modes may be determined. The three adjacent directional intra prediction modes may be respectively allocated to three partitions other than a partition to which the main directional intra prediction mode is applied.

According to an embodiment, the one or more adjacent directional intra prediction modes may be determined so that an index difference from the main directional intra prediction mode has a certain value. An index of an intra prediction mode is an identification number sequentially assigned according to a prediction direction of the intra prediction mode. For example, prediction directions of an intra prediction mode having a $10^{th}$ index and an intra prediction mode having an $11^{th}$ index are adjacent to each other.

When one adjacent directional intra prediction mode is determined, one adjacent directional intra prediction mode in which an index difference between the adjacent directional intra prediction mode and the main directional intra prediction mode is +1 or −1 may be determined. When three adjacent directional intra prediction modes are determined, three adjacent directional intra prediction modes in which an index difference between the adjacent directional intra prediction modes and the main directional intra prediction mode is +1, +2, and +3 or −1, −2, and −3 may be determined. An index difference between the adjacent directional intra prediction mode and the main directional intra prediction mode may be easily changed by one of ordinary skill in the art. Accordingly, a plurality of intra prediction modes having consecutive indexes may be derived from the intra prediction mode information. The intra prediction mode information may be set to indicate intra prediction modes of a certain order from among the plurality of intra prediction modes having the consecutive indexes.

According to an embodiment, a main directional intra prediction mode and one adjacent directional intra prediction mode may be determined. A prediction value of a sample of a partition may be determined to be a weighted average value of a prediction value according to the main directional intra prediction mode and a prediction value according to the adjacent directional intra prediction mode. A weight used to determine the weighted average value may be determined according to a position of the partition in a current luma block.

For example, for a leftmost partition of the current luma block, a weight of the prediction value according to the main directional intra prediction mode may be set to be large and a weight of the prediction value according to the adjacent directional intra prediction mode may be set to be small; and for a rightmost partition of the current luma block, a weight of the prediction value according to the main directional intra prediction mode may be set to be small and a weight of the prediction value according to the adjacent directional intra prediction mode may be set to be large. In another example, for an uppermost partition of the current luma block, a weight of the prediction value according to the main directional intra prediction mode may be set to be large and a weight of the prediction value according to the adjacent directional intra prediction mode may be set to be small; and for a lower most partition of the current luma block, a weight of the prediction value according to the main directional intra prediction mode may be set to be small and a weight of the prediction value according to the adjacent directional intra prediction mode may be set to be large. According to a split direction of the current luma block and the number of partitions, a weight of a prediction value may be easily changed by one of ordinary skill in the art according to an embodiment.

According to an embodiment, when intra prediction mode information indicates a non-directional intra prediction mode such as a DC mode and a planar mode, an intra prediction mode of a partition may be determined to be a DC mode or a planar mode, according to a position of the partition in a current luma block.

According to an embodiment, a most probable mode (MPM) may be determined according to a shape of the partition. The MPM indicates an intra prediction mode that is likely to be applied to the current luma block. For example, when widths of partitions of the current luma block are greater than heights, an intra prediction mode having horizontal directivity may be preferentially allocated to the MPM. When heights of partitions of the current luma block are greater than widths, an intra prediction mode having vertical directivity may be preferentially allocated to the MPM. When heights and widths of partitions of the current luma block are the same, a non-directional mode such as a planar mode may be preferentially allocated to the MPM.

According to an embodiment, intra prediction mode sameness information indicating whether intra prediction modes of a plurality of partitions are the same may be obtained from a bitstream. When the intra prediction mode information indicates that all of the intra prediction modes of the plurality of partitions are the same, an intra prediction mode indicated by the intra prediction mode information is equally applied to all of the partitions. In contrast, when the intra prediction mode information indicates that the intra prediction modes of the plurality of partitions are not the same, a main directional intra prediction mode and at least one adjacent directional intra prediction mode determined from the intra prediction mode information are allocated to each of the partitions. Alternatively, a main directional intra prediction mode and one adjacent directional intra prediction mode may be determined, and a prediction value of a sample of a partition may be determined to be a weighted average value of a prediction value according to the main directional intra prediction mode and a prediction value according to the adjacent directional intra prediction mode.

According to an embodiment, the intra prediction mode sameness information may be obtained for the current luma block. Alternatively, the intra prediction mode sameness information may be obtained for an upper data unit of the current luma block. For example, the intra prediction mode sameness information may be obtained for a largest coding unit, a slice segment, a slice, a picture, a sequence, or a video including the current luma block.

The processor 1610 predicts a plurality of partitions, according to intra prediction modes of the plurality of partitions.

According to an embodiment, when a current luma block is split into a plurality of partitions, a linear model (LM) chroma mode may not be applied to a current chroma block corresponding to the current luma block. The LM chroma mode is an intra prediction tool that derives a luma-chroma LM from an adjacent luma sample of the current luma block and an adjacent chroma sample of the current chroma block, and predicts the current chroma block from the current luma block according to the luma-chroma LM.

According to an embodiment, when the current luma block is split into the plurality of partitions, the adjacent luma sample and the adjacent chroma sample referenced by the LM chroma mode may be determined, according to a split direction of the current luma block. For example, when the current luma block is split in a horizontal direction, the adjacent luma sample may be set to be located only on the left of the current luma block. Alternatively, when the current luma block is split in a vertical direction, the adjacent luma sample may be set to be located only above the current luma block.

According to an embodiment, the current chroma block corresponding to the current luma block may also be split into partitions according to split information and split mode information of the current luma block. When a DM mode is applied to the current chroma block, an intra prediction mode of a partition of the current chroma block may be determined according to an intra prediction mode of a partition of the current luma block. The DM mode indicates an intra prediction mode of the current luma block corresponding to the current chroma block.

The video decoding apparatus 1600 may determine whether to split a block according to a restriction condition for block splitting.

According to an embodiment, when a size of a current luma block is 8×8 and the current luma block is quad-split, an inter mode may not be allowed for lower luma blocks split from the current luma block. Instead, only an intra mode may be applied to the lower luma blocks. The term 'quad-splitting' refers to a method of splitting a block once in a vertical direction and once in a horizontal direction, to generate four lower blocks having the same size. A size of the current luma block under the above condition may be set to be greater than 8×8.

According to an embodiment, when a width of a current luma block is 64 and the current luma block is split, an inter mode may not be allowed for lower luma blocks split from the current luma block. Instead, only an intra mode may be applied to the lower luma blocks. A width of the current luma block under the above condition may be set to be greater than 64.

According to an embodiment, when a size of a current luma block is 8×8, it may be set not to allow splitting of a current chroma block having a size of 4×4 corresponding to the current luma block in an image having a color format of 4:2:0. When the current luma block having a size of 8×8 is quad-split, an intra prediction mode of a chroma block having a size of 4×4 may be derived from intra prediction modes of four lower luma blocks having a size of 4×4. For example, the intra prediction mode of the chroma block having a size of 4×4 may be determined to be one of the intra prediction modes of the four lower luma blocks having a size of 4×4. Alternatively, the intra prediction mode of the chroma block having a size of 4×4 may be determined to be an average of prediction directions of the intra prediction modes of the four lower luma blocks having a size of 4×4.

According to an embodiment, when a current slice is an I slice that uses only intra prediction, all blocks having a size of 4×4 may be set to be predicted according to a current picture referencing (CPR) prediction mode. The CPR prediction mode is a prediction mode in which a reference block of the current block is searched for from a current picture and the current block is predicted according to the reference block. According to an embodiment, blocks having a size of 4×n or n×4 may also be set to be predicted according to the CPR prediction mode (n is a natural number equal to or greater than 8). A size of a block to which only the CPR prediction mode is applied may be easily changed by one of ordinary skill in the art.

According to an embodiment, only a certain intra prediction mode may be allowed for blocks smaller than a specific size. For example, for a block having a size of 4×4, only a DC mode, a planar mode, a vertical mode, and a horizontal mode may be allowed. Also, according to an embodiment, even for blocks having a size of 4×n or n×4 (n is a natural number equal to or greater than 8), only a DC mode, a planar mode, a vertical mode, and a horizontal mode may be allowed. A size of a block to which only a DC mode, a planar mode, a vertical mode, and a horizontal mode are applied may be easily changed by one of ordinary skill in the art.

According to an embodiment, certain intra prediction modes in addition to a DC mode, a planar mode, a vertical mode, and a horizontal mode may be allowed for blocks having sizes of 4×4, 4×n, and n×4, by one of ordinary skill in the art. For example, the certain intra prediction modes may include an intra prediction mode referring to only one sample adjacent to a block. Also, the certain intra prediction modes may include an intra prediction mode referring to an average value of two samples adjacent to a block.

According to an embodiment, in an image having a color format of 4:2:0, there may be no restriction on an intra prediction mode of a luma block having a size of 4×4. Instead, there may be a restriction on an intra prediction mode allowed for a chroma block having a size of 2×2 corresponding to the luma block having a size of 4×4.

The video decoding apparatus 1600 may transform residual information of the current block according to a multiple transform selection (MTS) mode. According to the MTS mode, two or more transform modes may be applied to transform the residual information.

According to an embodiment, the processor 1610 may obtain MTS mode information indicating whether to apply the MTS mode, for a block to which an intra prediction mode is applied. Also, the processor 1610 may obtain the MTS mode information indicating whether to apply the MTS mode, for the block to which the intra prediction mode is applied.

Also, for the block to which the inter prediction mode is applied, transform mode sameness information indicating whether different transform modes are respectively applied to a plurality of partitions of the block may be obtained.

When the MTS mode is applied to a current block according to the MTS mode information, a combination of discrete cosine transform (DCT)-7 and DCT-8 may be applied to the current block to transform the current block. Alternatively, transformation according to DCT-7 may be applied in a vertical direction, and transformation according to DCT-8 may be applied in a horizontal direction. In contrast, transformation according to DCT-7 may be applied in a horizontal direction, and transformation according to DCT-8 may be applied in a vertical direction. When the MTS mode is not applied to the current block according to the MTS mode information, only DCT-2 may be applied to transform the current block. When the MTS mode is applied to the current block according to the MTS mode information and the current block is a non-square block having a width or a height of 4, a combination of DCT-2 and DCT-7 may be applied to transform the current block.

Figure 17:
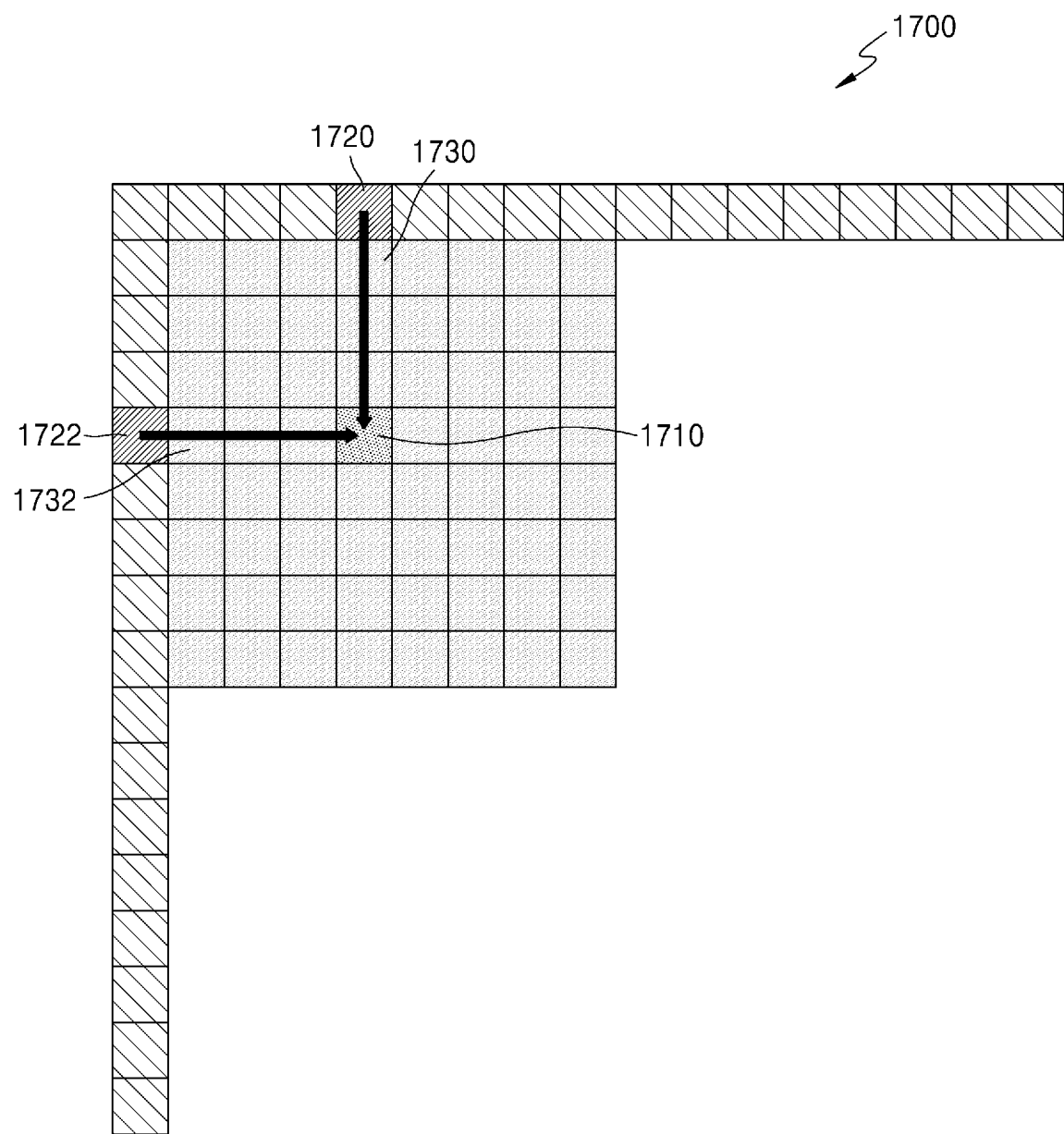
FIG. 17 illustrates a position dependent intra prediction filtering method according to a DC mode and a planar mode.
Figure 18:
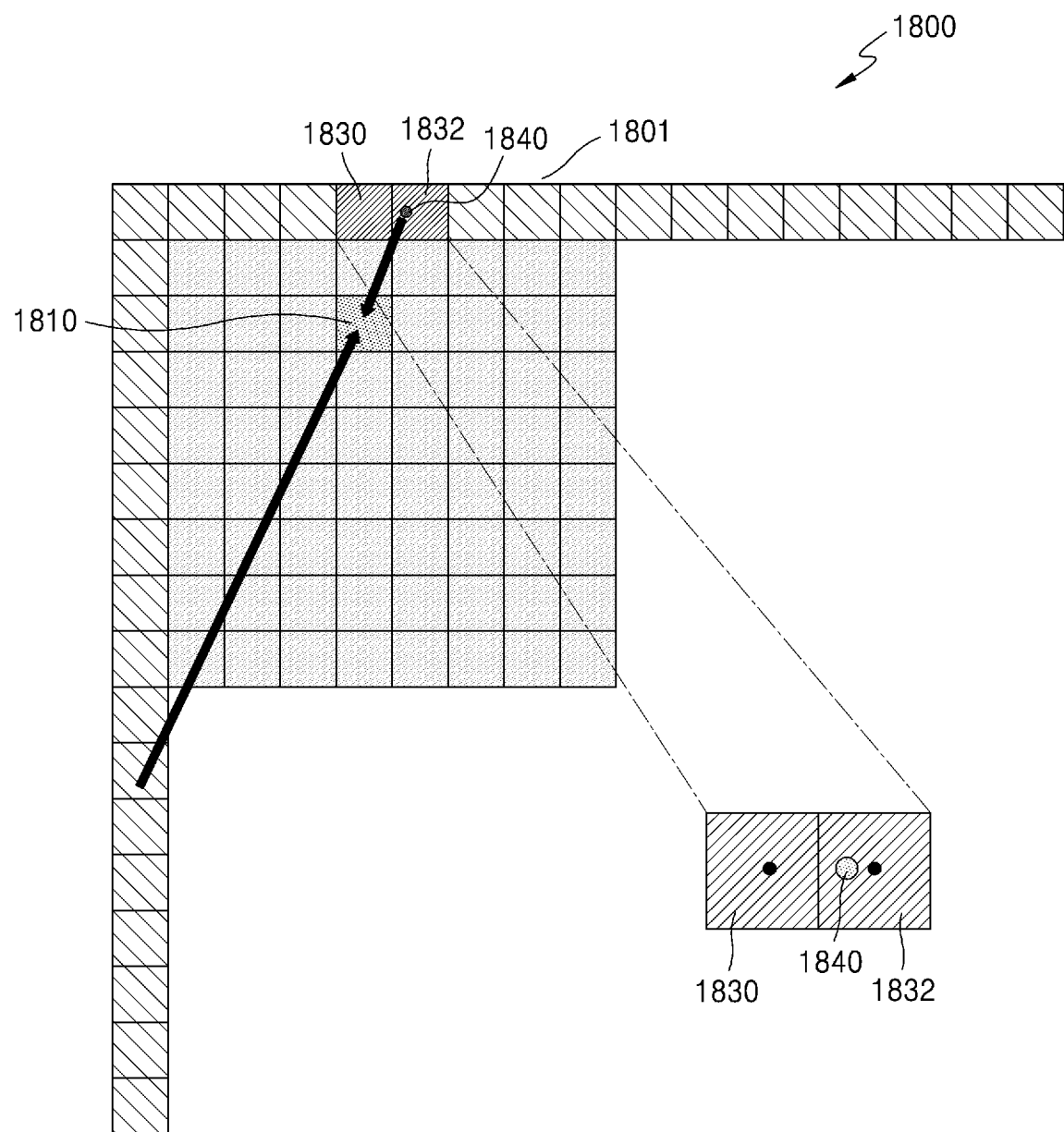
FIG. 18 illustrates a position dependent intra prediction filtering method according to a lower left directional intra prediction mode.
Figure 19:
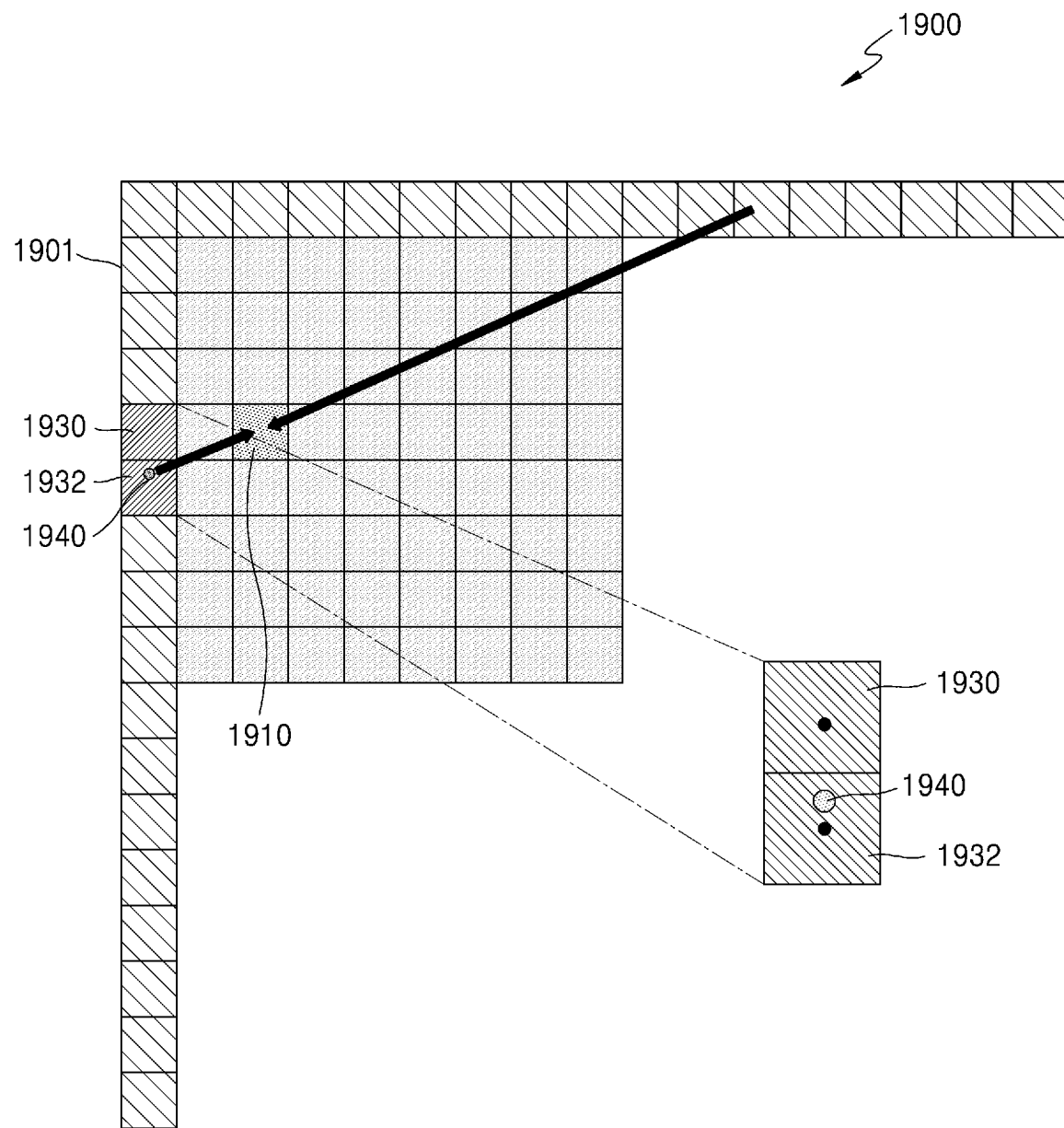
FIG. 19 illustrates a position dependent intra prediction filtering method according to an upper right directional intra prediction mode.

FIGS. 17 through 19 illustrate a position dependent intra prediction filtering method according to an intra prediction mode.

FIG. 17 illustrates a position dependent intra prediction filtering method according to a DC mode and a planar mode.

For position dependent intra prediction filtering of a current block 1700, an upper reference sample, a left reference sample, an upper weight, and a left weight may be determined as follows. An upper reference sample 1720 may be determined according to a reference sample located in an upper direction of a current sample 1710. A left reference sample 1722 may be determined as a reference sample located in a left direction of the current sample 1710. An upper weight may be determined according to a vertical distance between the current sample 1710 and an upper sample 1730. A left weight may be determined according to a horizontal distance between the current sample 1710 and a left sample 1732 of the current block 1700.

According to an embodiment, the upper weight may be set to decrease as the vertical distance between the current sample 1710 and the upper sample 1730 of the current block 1700 increases. The left weight may be set to decrease as the horizontal distance between the current sample 1710 and the left sample 1732 of the current block 1700 increases.

According to the position dependent intra prediction filtering, the current sample 1710 is adjusted according to the upper reference sample 1720 and the left reference sample 1722. For example, a value of the new current sample 1710 according to the position dependent intra prediction filtering is determined to be a weighted average value of the current sample 1710 before being filtered, the upper reference sample 1720, and the left reference sample 1722. Hence, as the upper weight and the left weight for the upper reference sample 1720 and the left reference sample 1722 increase, a degree of adjustment of a prediction value of the current sample 1710 increases due to the position dependent intra prediction filtering.

Hence, as the current sample 1710 is closer to the left or the upper side of the current block 1700, a degree of adjustment of a prediction value of the current sample 1710 according to the position dependent intra prediction filtering increases. In contrast, as the current sample 1710 is closer to the right or the lower side of the current block 1700, a degree of adjustment of a prediction value of the current sample 1710 according to the position dependent intra prediction filtering decreases.

That is, prediction values of left or upper samples close to reference samples may greatly change according to the position dependent intra prediction filtering. In contrast, prediction values of right or lower samples far from the reference samples may hardly change due to the position dependent intra prediction filtering.

FIG. 18 illustrates a position dependent intra prediction filtering method according to a lower left directional intra prediction mode. A lower left directional intra prediction mode is an intra prediction mode that refers to an adjacent sample of a current block located in a lower left direction from a current sample.

When an intra prediction mode of a current block 1800 is a lower left directional intra prediction mode, a left reference sample and a left weight of a current sample 1810 may be determined to be 0. That is, in position dependent intra prediction filtering, the left reference sample may not be referenced.

An upper weight may be determined according to a vertical distance between the current sample 1810 and an upper surface 1801 of the current block 1800. An upper reference sample of the current sample 1810 may be determined according to an upper reference position 1840 in a direction opposite to a prediction direction of the lower left directional intra prediction mode from the current sample 1810.

When the upper reference position 1840 is an integer, a sample located at the upper reference position 1840 is determined as the upper reference sample. However, referring to FIG. 18, the upper reference position 1840 is located between a first reference sample 1830 and a second reference sample 1832. Hence, the upper reference sample may be determined based on the first reference sample 1830 and the second reference sample 1832.

According to an embodiment, a sample closest to the upper reference position 1840 may be determined as the upper reference sample. Accordingly, the second reference sample 1832 close to the upper reference position 1840 may be determined as the upper reference sample.

According to an embodiment, a sample located on the left of the upper reference position 1840 may be determined as the upper reference sample. Accordingly, the first reference sample 1830 on the left of the upper reference position 1840 may be determined as the upper reference sample.

According to an embodiment, a sample located on the right of the upper reference position 1840 may be determined as the upper reference sample. Accordingly, the second reference sample 1832 on the right of the upper reference position 1840 may be determined as the upper reference sample.

According to an embodiment, a sample interpolated according to a sample located on the left of the upper reference position 1840 and a sample located on the right of the upper reference position 1840 may be determined as the upper reference sample. Accordingly, a sample interpolated based on the first reference sample 1830, the second reference sample 1832, and the upper reference position 1840 may be determined as the upper reference sample. In detail, a weighted average value of the second reference sample 1832 of the first reference sample 1830 may be determined as the upper reference sample. A weight required to calculate the weighted average value may be determined according to the upper reference position 1840. When the upper reference position 1840 is close to the first reference sample 1830, a weight of the first reference sample 1830 is set to be greater than a weight of the second reference sample 1832. In contrast, when the upper reference position 1840 is close to the second reference sample 1832, a weight of the second reference sample 1832 is set to be greater than a weight of the first reference sample 1832.

According to an embodiment, position dependent intra prediction filtering may be applied to samples whose distance with respect to an upper side of the current block 1800 is less than a certain threshold value. For example, when the certain threshold value is 3 and a distance between the current sample 1810 and the upper side of the current block 1800 is 4, an upper weight may be set to be 0. Accordingly, position dependent intra prediction filtering may be applied only to samples close to the upper side of the current block 1800.

FIG. 19 illustrates a position dependent intra prediction filtering method according to an upper right directional intra prediction mode. An upper right directional intra prediction mode is an intra prediction mode that refers to an adjacent sample of a current block located in an upper right direction from a current sample.

When an intra prediction mode of a current block 1900 is an upper right directional intra prediction mode, an upper reference sample and an upper weight of a current sample 1910 may be determined to be 0. That is, in position dependent intra prediction filtering, the upper reference sample is not referenced.

A left weight may be determined according to a horizontal distance between the current sample 1910 and a left surface 1901 of the current block 1900. A left reference sample of the current sample 1910 may be determined according to a left reference position 1940 in a direction opposite to a prediction direction of the upper right directional intra prediction mode from the current sample 1910.

When the left reference position 1940 is an integer, a sample located at the left reference position 1940 is determined as the left reference sample. However, referring to FIG. 19, the left reference position 1940 is located between a third reference sample 1930 and a fourth reference sample 1932. Hence, the upper reference sample may be determined based on the third reference sample 1930 and the fourth reference sample 1932.

According to an embodiment, a sample closest to the left reference position 1940 may be determined as the left reference sample. Accordingly, the fourth reference sample 1932 close to the left reference position 1940 may be determined as the left reference sample.

According to an embodiment, a sample located above the left reference position 1940 may be determined as the left reference sample. Accordingly, the third reference sample 1930 located above the left reference position 1940 may be determined as the left reference sample.

Accordingly, a sample located below the left reference position 1940 may be determined as the left reference sample. Accordingly, the fourth reference sample 1932 below the left reference position 1940 may be determined as the left reference sample.

According to an embodiment, a sample interpolated according to a sample located above the left reference position 1940 and a sample located below the left reference position 1940 may be determined as the left reference sample. Accordingly, a sample interpolated based on the third reference sample 1930, the fourth reference sample 1932, and the left reference position 1940 may be determined as the left reference sample. In detail, a weighted average value of the fourth reference sample 1932 of the third reference sample 1930 may be determined as the left reference sample. A weight required to calculate the weighted average value may be determined according to the left reference position 1940. When the left reference position 1940 is close to the third reference sample 1930, a weight of the third reference sample 1930 is set to be greater than a weight of the fourth reference sample 1932. In contrast, when the left reference position 1940 is close to the fourth reference sample 1932, a weight of the fourth reference sample 1932 is set to be greater than a weight of the third reference sample 1930.

According to an embodiment, position dependent intra prediction filtering may be applied to samples whose distance with respect to a left side of the current block 1900 is less than a certain threshold value. For example, when the certain threshold value is 3 and a distance between the current sample 1910 and the left side of the current block 1900 is 4, an upper weight may be set to be 0. Accordingly, position dependent intra prediction filtering may be applied only to samples close to the left side of the current block 1900.

Figure 20:
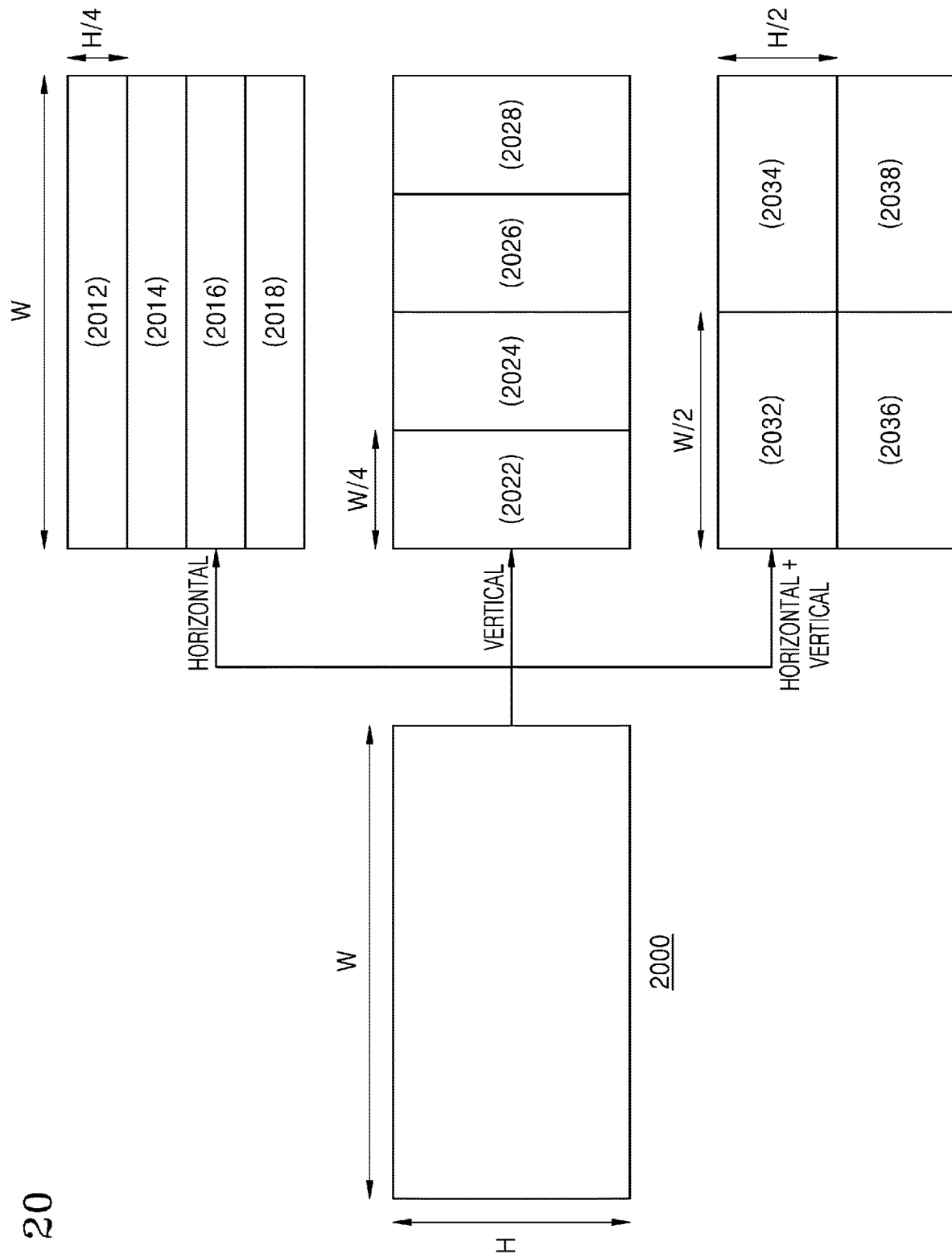
FIG. 20 illustrates partition splitting of a current luma block according to an intra sub-partition coding mode.

FIG. 20 illustrates partition splitting of a current luma block 2000 according to an intra sub-partition coding mode.

When split information indicates that the current luma block 2000 is split into a plurality of partitions, the current luma block 2000 is split. According to split mode information, the current luma block 2000 is split into the plurality of partitions. The split mode information may indicate whether a split direction of the current luma block 2000 is a vertical direction or a horizontal direction. Also, the split mode information may indicate the number of partitions split from the current luma block 2000. A method of splitting the current luma block 2000 according to the split mode information will be described.

For example, the current luma block 2000 may be split in a horizontal direction. Referring to FIG. 20, the current luma block 2000 is split into four partitions 2012, 2014, 2016, and 2018 whose height is ¼ of the current luma block 2000. Unlike in FIG. 20, the current luma block 2000 may be split into two partitions whose height is ½ of the current luma block 2000. Also, the current luma block 2000 may be split into eight partitions whose height is ⅛ of the current luma block 2000. Also, the number of partitions split from the current luma block 2000 may be determined to be 8 or more.

Also, the current luma block 2000 may be split in a vertical direction. Referring to FIG. 20, the current luma block 2000 is split into four partitions 2022, 2024, 2026, and 2028 whose width is ¼ of the current luma block 2000. Unlike in FIG. 20, the current luma block 2000 may be split into two partitions whose width is ½ of the current luma block 2000. Also, the current luma block 2000 may be split into eight partitions whose width is ⅛ of the current luma block 2000. Also, the number of partitions split from the current luma block 2000 may be determined to be 8 or more.

Also, the current luma block 2000 may be split in a horizontal direction once and a vertical direction once. Referring to FIG. 20, the current luma block 2000 is split into four partitions 2032, 2034, 2036, and 2038 whose width and height are ½ of the current luma block 2000.

According to an embodiment, an intra prediction mode indicated by intra prediction mode information may be equally applied to all partitions of the current luma block 2000.

According to an embodiment, the intra prediction mode information may indicate a main directional intra prediction mode. The main directional intra prediction mode may be applied to one of a plurality of partitions. One or more adjacent directional intra prediction modes determined from the main directional intra prediction mode may be applied to the remaining partitions.

For example, when the current luma block 2000 is split in a horizontal direction, a main directional intra prediction mode may be applied to one of the four partitions 2012, 2014, 2016, and 2018. One or more adjacent directional intra prediction modes adjacent to the main directional intra prediction mode may be applied to the remaining partitions.

In detail, when a main directional intra prediction mode is an intra prediction mode having a $33^{rd}$ index, three adjacent directional intra prediction modes may be determined to be intra prediction modes having 32, 34, and $35^{th}$ indexes. The intra prediction modes having the 32 to $35^{th}$ indexes may be applied to the four partitions 2012, 2014, 2016, and 2018. Accordingly, the intra prediction mode having the $32^{th}$ index may be applied to the partition 2012, the intra prediction mode having the $33^{th}$ index may be applied to the partition 2014, the intra prediction mode having the $34^{th}$ index may be applied to the partition 2016, and the intra prediction mode having the $35^{th}$ index may be applied to the partition 2018.

In another embodiment, when a main directional intra prediction mode is an intra prediction mode having a $33^{th}$ index, three adjacent directional intra prediction modes may be respectively determined to be intra prediction modes having 32, 31, and $30^{th}$ indexes. The intra prediction modes having the 30 to $33^{th}$ indexes may be applied to the four partitions 2012, 2014, 2016, and 2018. Accordingly, the intra prediction mode having the $33^{th}$ index may be applied to the partition 2012, the intra prediction mode having the $32^{th}$ index may be applied to the partition 2014, the intra prediction mode having the $31^{th}$ index may be applied to the partition 2016, and the intra prediction mode having the $30^{th}$ index may be applied to the partition 2018.

Likewise, when the current luma block 2000 is split in a vertical direction, a main directional intra prediction mode may be applied to one of the four partitions 2022, 2024, 2026, and 2028. One or more adjacent directional intra prediction modes adjacent to the main directional intra prediction mode may be applied to the remaining partitions.

In detail, when a main directional intra prediction mode is an intra prediction mode having a $33^{th}$ index, three adjacent directional intra prediction modes may be respectively determined to be intra prediction modes having 31, 32, and $34^{th}$ indexes. The intra prediction modes having the 31 to $34^{th}$ indexes may be applied to the four partitions 2022, 2024, 2026, and 2028. Accordingly, the intra prediction mode having the $31^{th}$ index may be applied to the partition 2022, the intra prediction mode having the $32^{th}$ index may be applied to the partition 2024, the intra prediction mode having the $33^{th}$ index may be applied to the partition 2026, and the intra prediction mode having the $34^{th}$ index may be applied to the partition 2028.

According to another embodiment, when a main directional intra prediction mode is an intra prediction mode having a $33^{th}$ index, three adjacent directional intra prediction modes may be respectively determined to be intra prediction modes having 34, 35, and $36^{th}$ indexes. The intra prediction modes having the 33 to $36^{th}$ indexes may be applied to the four partitions 2022, 2024, 2026, and 2028. Accordingly, the intra prediction mode having the $33^{th}$ index may be applied to the partition 2022, the intra prediction mode having the $34^{th}$ index may be applied to the partition 2024, the intra prediction mode having the $35^{th}$ index may be applied to the partition 2026, and the intra prediction mode having the $36^{th}$ index may be applied to the partition 2028.

Also, likewise, when the current luma block 2000 is split in a horizontal direction once and a vertical direction once, a main directional intra prediction mode may be applied to one of the four partitions 2032, 2034, 2036, and 2038. One or more adjacent directional intra prediction modes adjacent to the main directional intra prediction mode may be applied to the remaining partitions.

In detail, when a main directional intra prediction mode is an intra prediction mode having a $40^{th}$ index, three adjacent directional intra prediction modes may be respectively determined to be intra prediction modes having 41, 42, and $43^{th}$ indexes. The intra prediction modes having the 40 to $42^{th}$ indexes may be applied to the four partitions 2032, 2034, 2036, and 2038. Accordingly, the intra prediction mode having the $40^{th}$ index may be applied to the partition 2032, the intra prediction mode having the $41^{th}$ index may be applied to the partition 2034, the intra prediction mode having the $42^{th}$ index may be applied to the partition 2036, and the intra prediction mode having the $33^{th}$ index may be applied to the partition 2038. Alternatively, in a modification of the above examples, the intra prediction mode having the $41^{th}$ index may be applied to the partition 2036, and the intra prediction mode having the $42^{th}$ index may be applied to the partition 2034.

These are merely examples, and intra prediction modes of consecutive indexes for a plurality of partitions may be determined from intra prediction mode information by using various methods. A method of determining an adjacent directional intra prediction mode from a main directional intra prediction mode may be easily changed by one of ordinary skill in the art. Consecutive intra prediction modes may be sequentially applied to a plurality of partitions according to spatial positions.

According to an embodiment, a main directional intra prediction mode and one adjacent directional intra prediction mode may be determined from intra prediction mode information. A prediction value of a sample of a partition may be determined to be a weighted average value of a prediction value according to the main directional intra prediction mode and a prediction value according to the adjacent directional intra prediction mode. A weight used to determine the weighted average value may be determined according to a position of the partition in a current luma block.

For example, when the current luma block 2000 is split in a horizontal direction, both prediction according to the main directional intra prediction mode and prediction according to the adjacent directional intra prediction mode may be performed for each of the four partitions 2012, 2014, 2016, and 2018. A weight of the prediction value according to the main directional intra prediction mode and a weight of the prediction value according to the adjacent directional intra prediction mode are differently set for each partition. For example, for the partition 2012, a ratio between the weight of the prediction value according to the main directional intra prediction mode and the weight of the prediction value according to the adjacent directional intra prediction mode may be set to be 1:0. For the partition 2014, a ratio between the weight of the prediction value according to the main directional intra prediction mode and the weight of the prediction value according to the adjacent directional intra prediction mode may be set to be ¾:¼. For the partition 2016, a ratio between the weight of the prediction value according to the main directional intra prediction mode and the weight of the prediction value according to the adjacent directional intra prediction mode may be set to be ½:½. For the partition 2018, a ratio between the weight of the prediction value according to the main directional intra prediction mode and the weight of the prediction value according to the adjacent directional intra prediction mode may be set to be ¼:¾. Each partition is predicted according to a weight for each partition.

In another example, when the current luma block 2000 is split in a vertical direction, both prediction according to the main directional intra prediction mode and prediction according to the adjacent directional intra prediction mode may be performed for each of the four partitions 2022, 2024, 2026, and 2028. A weight of the prediction value according to the main directional intra prediction mode and a weight of the prediction value according to the adjacent directional intra prediction mode are differently set for each partition. For example, for the partition 2022, a ratio between the weight of the prediction value according to the main directional intra prediction mode and the weight of the prediction value according to the adjacent directional intra prediction mode may be set to be 1:0. For the partition 2024, a ratio between the weight of the prediction value according to the main directional intra prediction mode and the weight of the prediction value according to the adjacent directional intra prediction mode may be set to be ¾:¼. For the partition 2026, a ratio between the weight of the prediction value according to the main directional intra prediction mode and the weight of the prediction value according to the adjacent directional intra prediction mode may be set to be ½:½. For the partition 2028, a ratio between the weight of the prediction value according to the main directional intra prediction mode and the weight of the prediction value according to the adjacent directional intra prediction mode may be set to be ¼:¾. Each partition is predicted according to a weight for each partition.

These are merely examples, and a ratio of weights applied to a partition may be easily changed by one of ordinary skill in the art. A ratio of weights applied to a partition may be set to be determined according to spatial positions for a plurality of partitions.

According to an embodiment, an MPM may be determined according to a shape of a partition.

For example, when the current luma block 2000 is split in a horizontal direction, a width of a partition may be greater than a height. Accordingly, an intra prediction mode having horizontal directivity may be preferentially allocated to the MPM of the current luma block 2000. Also, when the current luma block 2000 is split in a vertical direction, a height of a partition may be greater than a width. Accordingly, an intra prediction mode having vertical directivity may be preferentially allocated to the MPM of the current luma block 2000.

Figure 21:
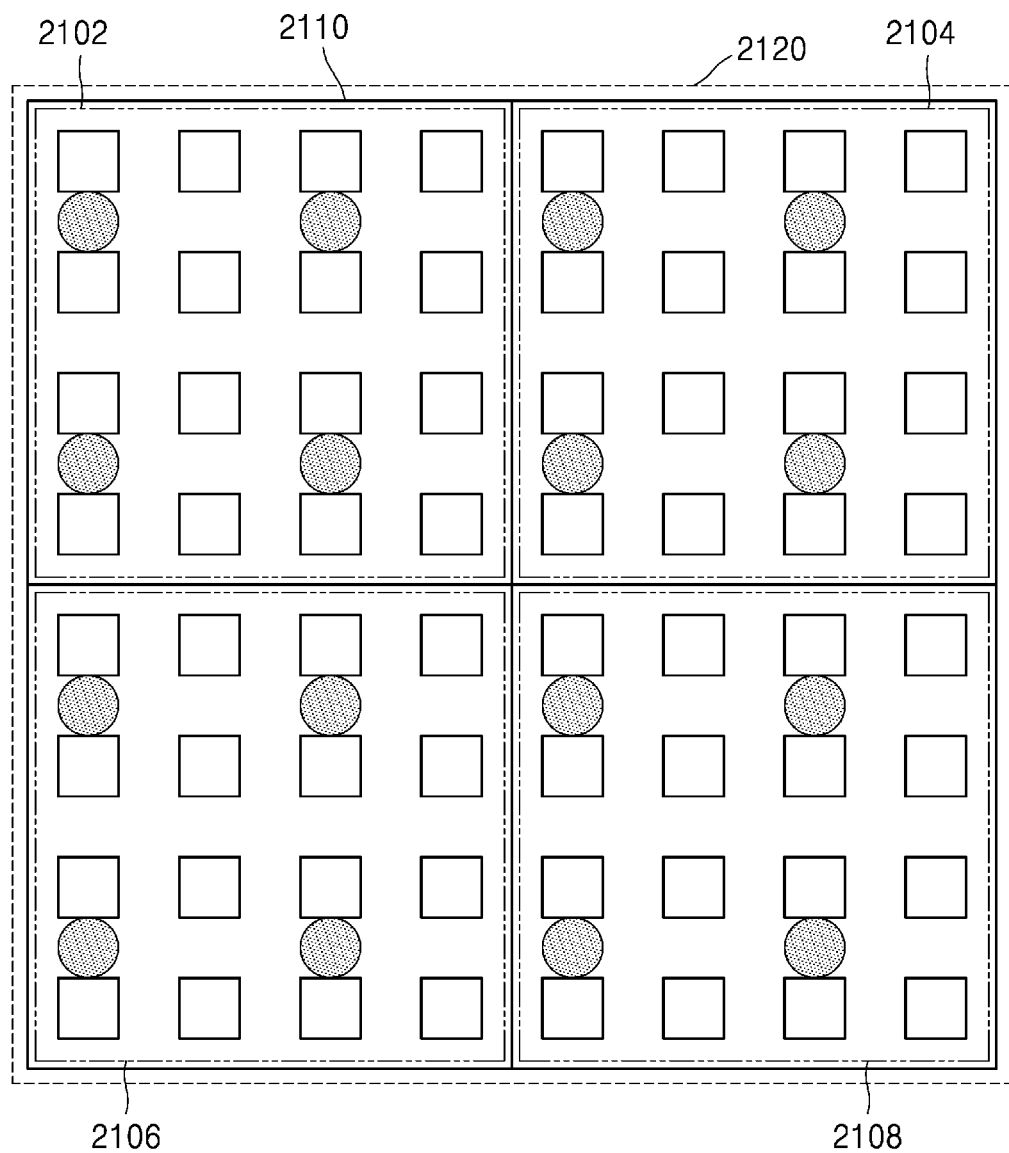
FIG. 21 illustrates a method of determining an intra prediction mode of a current chroma block from intra prediction modes of partitions of a current luma block, according to an embodiment.

FIG. 21 illustrates a method of determining an intra prediction mode of a current chroma block 2120 from intra prediction modes of partitions 2102, 2104, 2106, and 2108 of a current luma block 2110, according to an embodiment.

FIG. 21 illustrates an image having a color format of 4:2:0. In FIG. 21, a rectangle indicates a luma sample, and a circle indicates a chroma sample.

According to an embodiment, assuming that a size of the current luma block 2110 is less than a certain size, even when the current block 2110 is split into the plurality of partitions 2102, 2104, 2106, and 2108, the current chroma block 2120 may not be split unlike the current luma block 2110. In this case, various embodiments of deriving an intra prediction mode of the current chroma block 2120 from the plurality of partitions 2102, 2104, 2106, and 2108 of the current luma block 2110 are provided.

According to an embodiment, when the current luma block 2110 is split into the plurality of partitions 2102, 2104, 2106, and 2108, an LM chroma mode may not be applied to the current chroma block 2120 corresponding to the current luma block 2110.

According to an embodiment, when a DM mode is applied to the current chroma block 2120, an intra prediction mode of the current chroma block 2110 may be determined according to intra prediction modes of the partitions 2102, 2104, 2106, and 2108 of the current luma block 2110. For example, an intra prediction mode of the current chroma block 2110 may be determined to be an intra prediction mode of one of the partitions 2102, 2104, 2106, and 2108. Alternatively, an intra prediction mode of the current chroma block 2110 may be determined according to intra prediction modes of two or more of the partitions 2102, 2104, 2106, and 2108. For example, an intra prediction mode of the current chroma block 2110 may be determined according to an average direction of four prediction directions of four intra prediction modes of the partitions 2102, 2104, 2106, and 2108.

Figure 22:
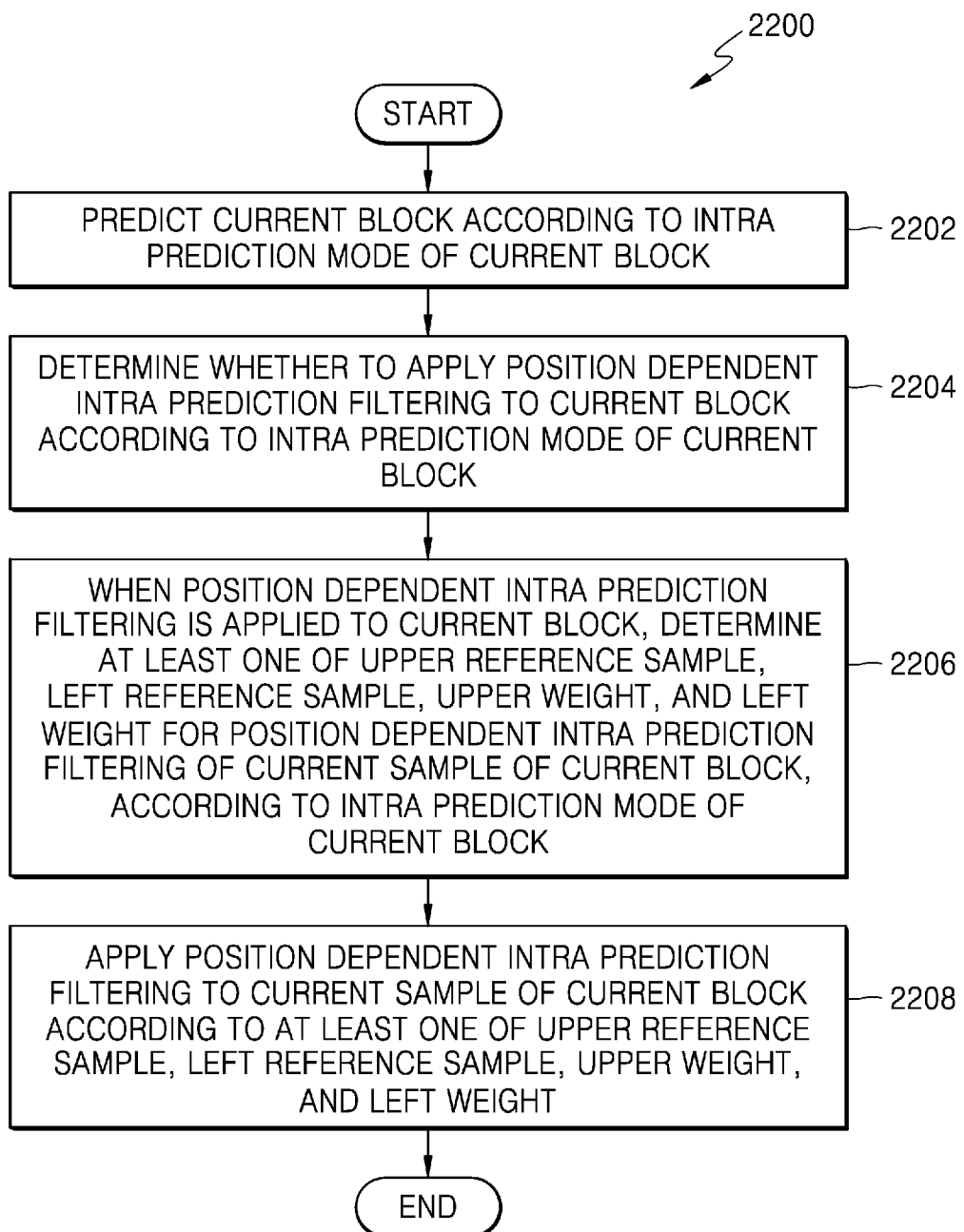
FIG. 22 is a flowchart illustrating a video decoding method to which position dependent intra prediction filtering is applied, according to an embodiment.

FIG. 22 is a flowchart illustrating a video decoding method 2200 to which position dependent intra prediction filtering is applied, according to an embodiment.

In operation 2202, a current block is predicted according to an intra prediction mode of the current block.

In operation 2204, whether to apply position dependent intra prediction filtering to the current block is determined according to the intra prediction mode of the current block.

According to an embodiment, when the intra prediction mode of the current block is a certain intra prediction mode, it may be determined to apply the position dependent intra prediction filtering to the current block. Examples of the certain intra prediction mode may include a DC mode, a planar mode, a vertical mode, a horizontal mode, a lower left diagonal mode, and an upper right diagonal mode.

In operation 2206, when the position dependent intra prediction filtering is applied to the current block, at least one of an upper reference sample, a left reference sample, an upper weight, and a left weight for the position dependent intra prediction filtering of a current sample of the current block is determined according to the intra prediction mode of the current block.

According to an embodiment, when the intra prediction mode of the current block is a lower left directional intra prediction mode, the left reference sample and the left weight of the current sample are not determined, and the upper reference sample of the current sample is determined according to an upper reference position in a direction opposite to a prediction direction of the lower left directional intra prediction mode from the current sample. For example, a sample closest to the upper reference position may be determined as the upper reference sample. Also, the upper weight may be determined according to a distance between the current sample and an upper surface of the current block.

The upper weight may be determined to be 0 when the distance between the current sample and the upper surface of the current block is equal to or greater than a certain threshold value.

According to an embodiment, when the intra prediction mode of the current block is an upper right directional intra prediction mode, the upper reference sample and the upper weight of the current sample are not determined, and the left reference sample of the current sample may be determined according to a left reference position in a direction opposite to a prediction direction of the upper right directional intra prediction mode from the current sample. For example, a sample closest to the left reference position may be determined as the left reference sample. Also, the left weight may be determined according to a distance between the current sample and a left surface of the current block. The left weight may be determined to be 0 when the distance between the current sample and the left surface of the current block is equal to or greater than a certain threshold value.

According to an embodiment, the certain threshold value for the upper weight and the left weight may be determined according to a size of the current block.

In operation 2208, the position dependent intra prediction filtering is applied to the current sample of the current block, according to at least one of the upper reference sample, the left reference sample, the upper weight, and the left weight.

According to an embodiment, a position dependent intra prediction filtered current sample may be determined, according to a weighted average value of the current sample, the upper reference sample, and the left reference sample. Weights of the upper reference sample and the left reference sample applied to obtain the weighted average value may be determined according to the upper weight and the left weight, and a weight of the current sample may be determined according to the upper weight and the left weight.

A function of the video decoding apparatus 1600 to which position dependent intra prediction filtering is applied, described with reference to FIG. 16, may be applied to the video decoding method 2200. Each operation of the video decoding method 2200 may be performed by the processor 1602 of the video decoding apparatus 1600.

Figure 23:
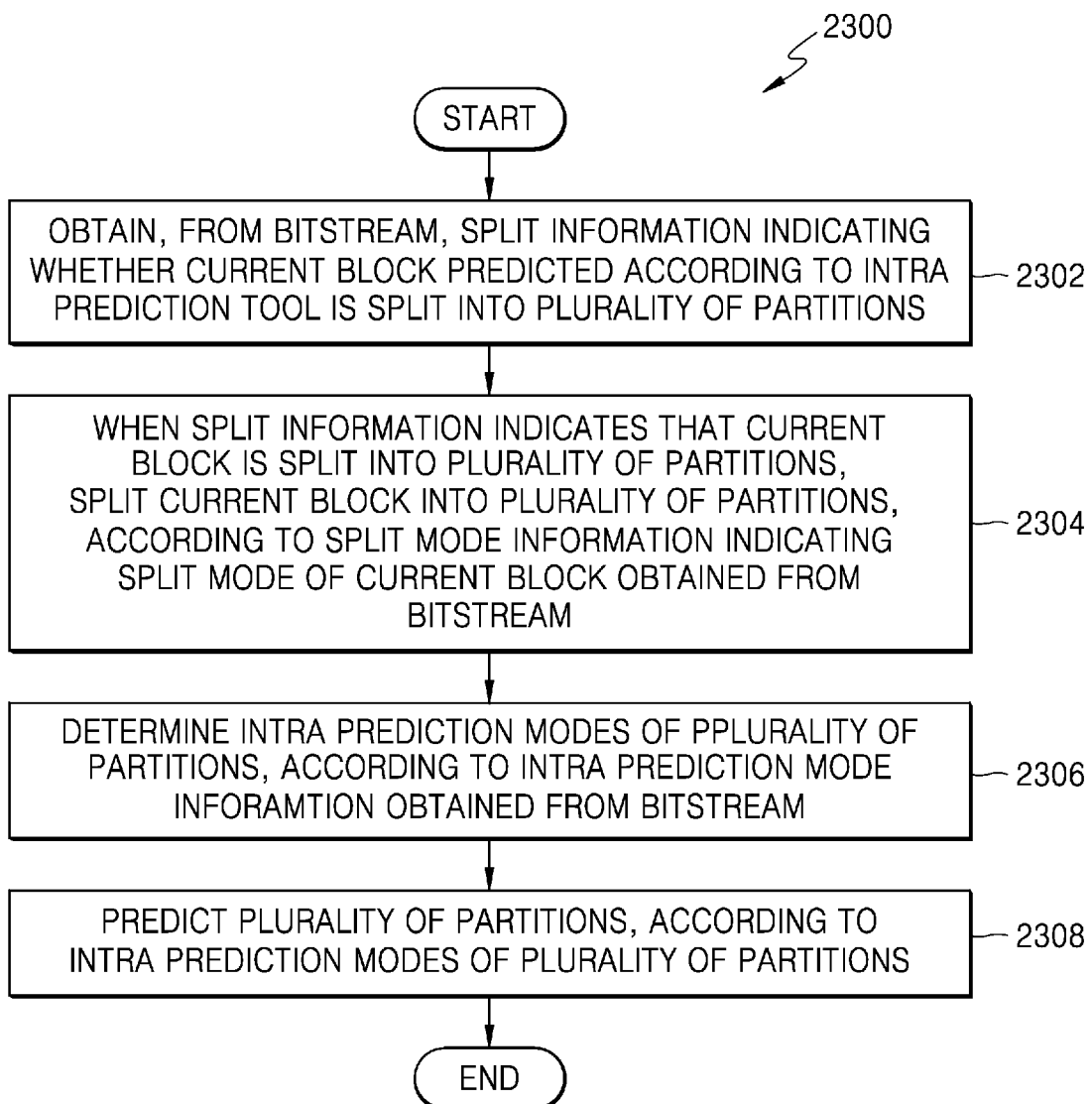
FIG. 23 is a flowchart illustrating a video decoding method to which an intra sub-partition coding mode is applied, according to an embodiment.

FIG. 23 is a flowchart illustrating a video decoding method 2300 to which an intra sub-partition coding mode is applied, according to an embodiment.

In operation 2302, split information indicating whether a current block predicted according to an intra prediction tool is split into a plurality of partitions is obtained from a bitstream.

In operation 2304, when the split information indicates that the current block is split into the plurality of partitions, the current block is split into the plurality of partitions, according to split mode information indicating a split mode of the current block obtained from the bitstream. The split mode information may indicate whether a split direction of the current block is a vertical direction or a horizontal direction. Also, the split mode information may indicate the number of the plurality of partitions.

In operation 2306, intra prediction modes of the plurality of partitions are determined according to intra prediction mode information obtained from the bitstream.

According to an embodiment, along with a main directional intra prediction mode indicated by the intra prediction mode information, one or more adjacent directional intra prediction modes adjacent to the main directional intra prediction mode may be determined. An intra prediction mode of one of the plurality of partitions may be determined as the main directional intra prediction mode, and intra prediction modes of the other partitions may be determined as the one or more adjacent directional intra prediction modes.

In operation 2308, the plurality of partitions are predicted according to the intra prediction modes of the plurality of partitions.

A function of the video decoding apparatus 1600 to which an intra sub-partition coding mode is applied, described with reference to FIG. 16, may be applied to the video decoding method 2300. Each operation of the video decoding method 2300 may be performed by the processor 1602 of the video decoding apparatus 1600.

Figure 24:
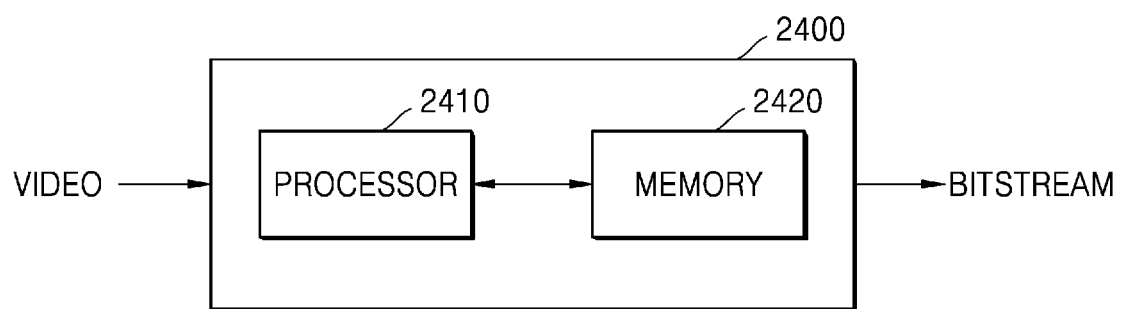
FIG. 24 is a block diagram of a video encoding apparatus to which various intra prediction tools are applied.

FIG. 24 is a block diagram of a video encoding apparatus 2400 to which various intra coding tools are applied.

Referring to FIG. 24, the video encoding apparatus 2400 according to an embodiment may include a processor 2410 and a memory 2420.

The processor 2410 according to an embodiment may generally control the video encoding apparatus 2400. The processor 2410 according to an embodiment may execute one or more programs stored in the memory 2420.

The memory 2420 according to an embodiment may store various data, program, or application for driving and controlling the video encoding apparatus 2400. The program stored in the memory 2420 may include one or more instructions. The program (the one or more instructions) or the application stored in the memory 2420 may be executed by the processor 2410.

The processor 2410 may perform position dependent intra prediction filtering on an intra predicted block.

First, the processor 2410 predicts a current block according to each of a plurality of intra prediction modes. The processor 2410 determines whether to apply the position dependent intra prediction filtering to the current block according to each of the plurality of intra prediction modes. For example, the position dependent intra prediction filtering may be applied to a prediction mode of the current block for a lower left directional intra prediction mode, an upper right directional intra prediction mode, a DC mode, and a planar mode.

The processor 2410 applies the position dependent intra prediction filtering to the current block, for an intra prediction mode to which the position dependent intra prediction filtering is applied. Accordingly, the position dependent intra prediction filtering may be applied to each of prediction blocks according to the lower left directional intra prediction mode, the upper right directional intra prediction mode, the DC mode, and the planar mode.

The processor 2410 determines an intra prediction mode of the current block, according to a prediction result according to each intra prediction mode to which the position dependent intra prediction filtering is applied. For example, according to a prediction result of the lower left directional intra prediction mode to which the position dependent intra prediction filtering is applied, a prediction accuracy of the lower left directional intra prediction mode is calculated. Likewise, prediction accuracies of the upper right directional intra prediction mode, the DC mode, and the planar mode are calculated according to prediction blocks to which the position dependent intra prediction filtering is applied. Prediction accuracies of remaining intra prediction modes are calculated according to prediction blocks to which the position dependent intra prediction filtering is not applied. An intra prediction mode having a highest prediction accuracy may be determined as the intra prediction mode of the current block.

The processor 2410 may perform partitioning on the current block to which the intra prediction mode is applied, according to an intra sub-partition coding mode.

The processor 2410 determines whether the current block predicted according to an intra prediction tool is split into a plurality of partitions. When the current block is split into the plurality of partitions, the processor 2410 determines a split mode of the current block. Whether to split the current block is determined according to a comparison result between coding efficiency when splitting is not performed and coding efficiency when splitting is performed. The split mode of the current block is determined according to coding efficiency for the current block in a plurality of split modes.

The processor 2410 splits the current block into the plurality of partitions according to the split mode. The processor 2410 determines intra prediction modes of the plurality of partitions. An intra prediction mode having a highest prediction accuracy for the plurality of partitions is set as the intra prediction mode of the current block.

The processor 2410 outputs a bitstream including split information indicating whether the current block is split into a plurality of partitions, split mode information indicating a split mode of the current block, and intra prediction mode information indicating intra prediction modes of the plurality of partitions.

A position dependent intra prediction filtering mode and an intra sub-partition coding mode of the video encoding apparatus 2400 of FIG. 24 may be set in the same manner as a position dependent intra prediction filtering mode and an intra sub-partition coding mode of the video decoding apparatus 1600 of FIG. 16. Accordingly, the position dependent intra prediction filtering mode and the intra sub-partition coding mode of FIG. 24 may have the same characteristics as those of the position dependent intra prediction filtering mode and the intra sub-partition coding mode of FIG. 16. Also, the video encoding apparatus 2400 of FIG. 24 may perform a function of an encoding end corresponding to a function of a decoding end performed by the video decoding apparatus 1600 of FIG. 16.

Figure 25:
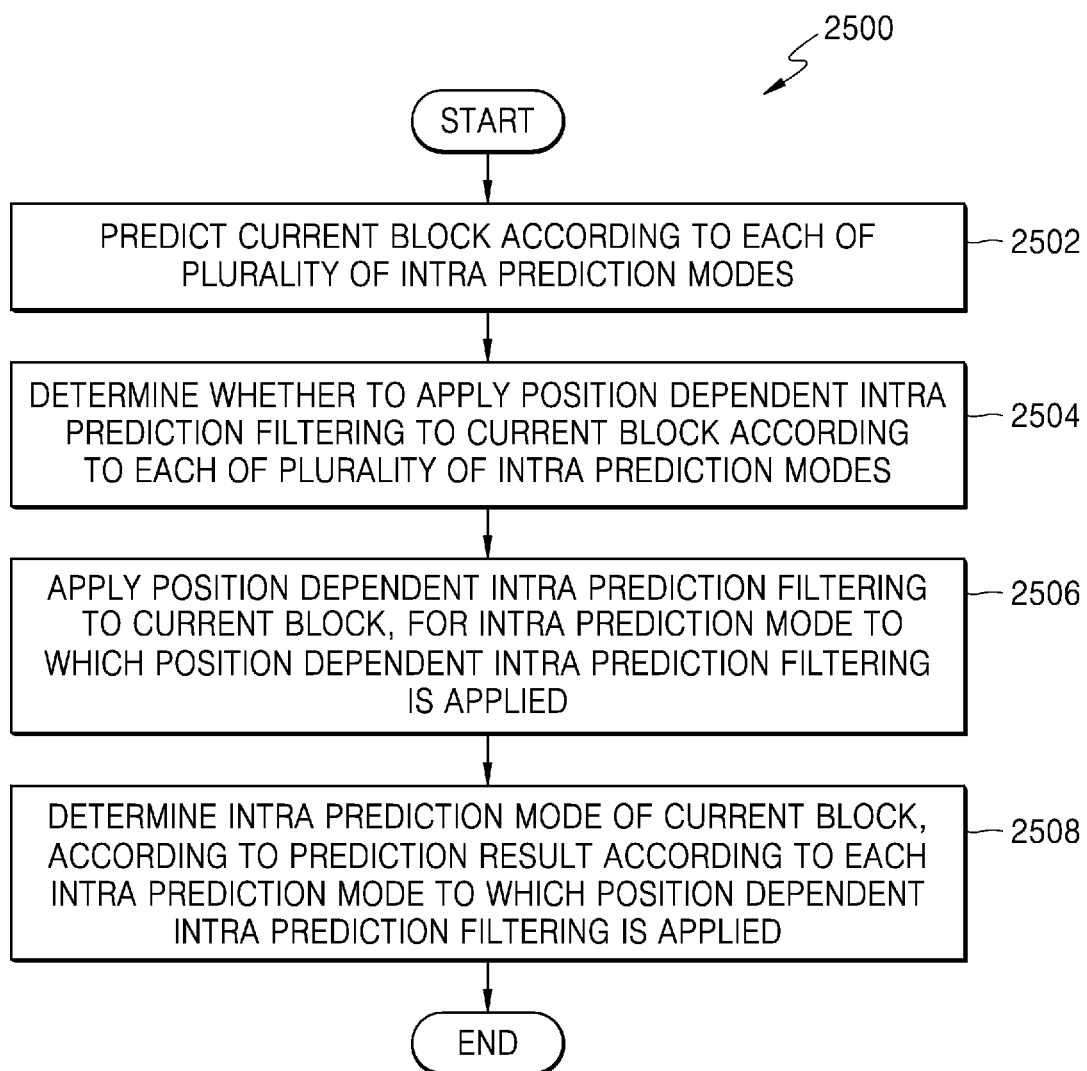
FIG. 25 is a flowchart illustrating a video encoding method to which position dependent intra prediction filtering is applied, according to an embodiment.

FIG. 25 is a flowchart illustrating a video encoding method 2500 to which position dependent intra prediction filtering is applied, according to an embodiment.

In operation 2502, a current block is predicted according to each of a plurality of intra prediction modes.

In operation 2504, it is determined whether to apply position dependent intra prediction filtering to the current block, according to each of the plurality of intra prediction modes.

In operation 2506, the position dependent intra prediction filtering is applied to the current block, for an intra prediction mode to which the position dependent intra prediction filtering is applied.

In operation 2508, an intra prediction mode of the current block is determined according to a prediction result according to each intra prediction mode to which the position dependent intra prediction filtering is applied.

A function of the video encoding apparatus 2400 according to a position dependent intra prediction filtering mode described with reference to FIG. 25 may be applied to the video encoding method 2500 according to a position dependent intra prediction filtering mode. Each operation of the video encoding method 2500 may be performed by the processor 2402 of the video encoding apparatus 2400.

Figure 26:
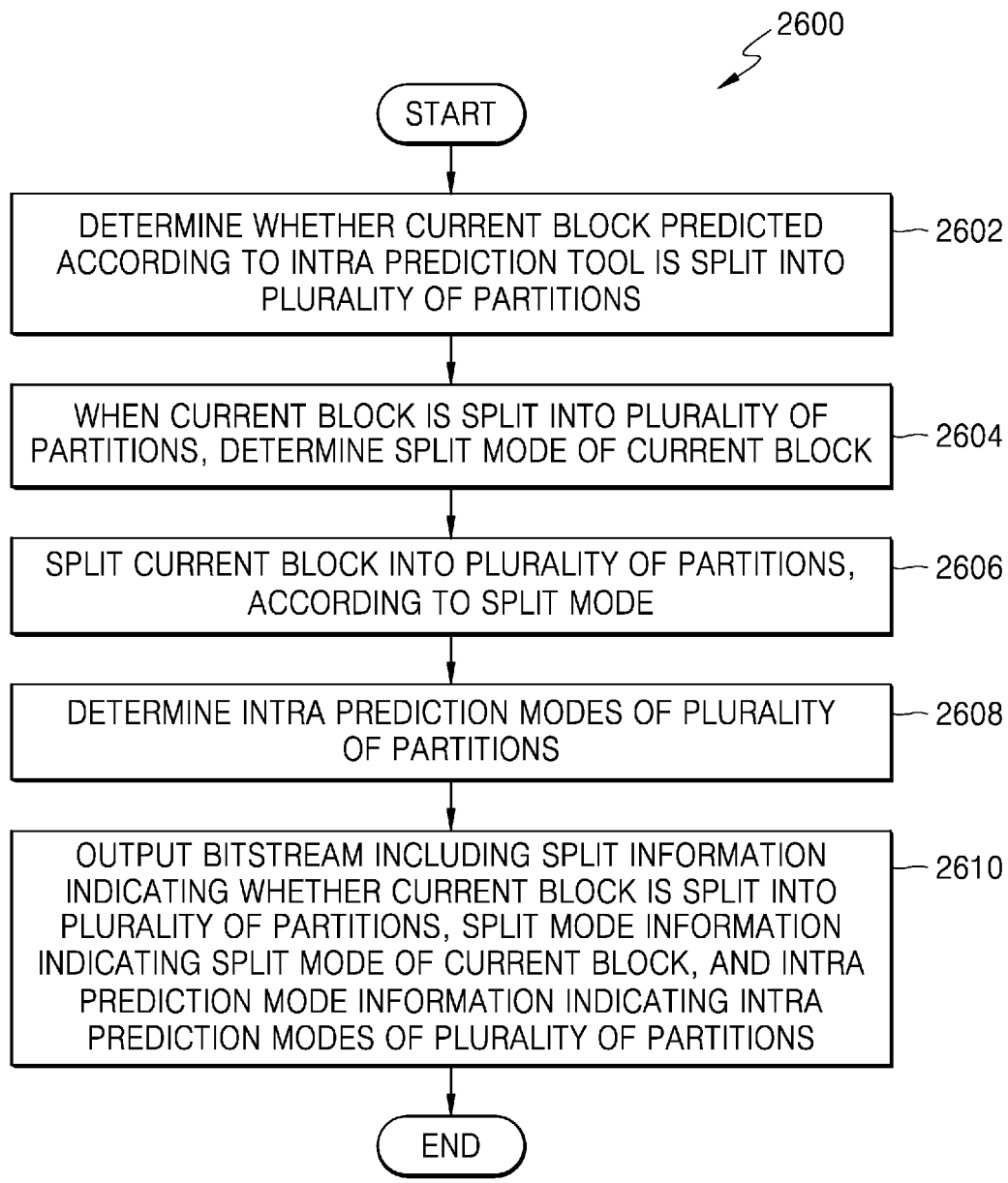
FIG. 26 is a flowchart illustrating a video encoding method to which an intra sub-partition coding mode is applied, according to an embodiment.

FIG. 26 is a flowchart illustrating a video encoding method 2600 to which an intra sub-partition coding mode is applied, according to an embodiment.

In operation 2602, it is determined whether a current block predicted according to an intra prediction tool is split into a plurality of partitions.

In operation 2604, when the current block is split into the plurality of partitions, a split mode of the current block is determined.

In operation 2606, the current block is split into the plurality of partitions, according to the split mode.

In operation 2608, intra prediction modes of the plurality of partitions are determined.

In operation 2610, a bitstream including split information indicating whether the current block is split into a plurality of partitions, split mode information indicating a split mode of the current block, and intra prediction mode information indicating intra prediction modes of the plurality of partitions is output.

A function of the video encoding apparatus 2400 according to an intra sub-partition coding mode described with reference to FIG. 26 may be applied to the video encoding method 2600 according to an intra sub-partition coding mode. Each operation of the video encoding method 2600 may be performed by the processor 2402 of the video encoding apparatus 2400.

According to a video encoding scheme described with reference to FIGS. 1 through 26, image data of a spatial domain may be encoded for each of coding units having a tree structure, and according to a video decoding scheme based on the coding units having the tree structure, decoding may be performed on each of largest coding units and the image data of the spatial domain may be reconstructed, and thus a video such as a picture and a picture sequence may be reconstructed. The reconstructed video may be reproduced by a reproducing device, may be stored in a storage medium, or may be transmitted through a network.

Meanwhile, the embodiments of the present disclosure may be implemented as a computer-executable program, and may be implemented in a general-purpose digital computer that operates the program using a computer-readable recording medium.

The foregoing exemplary embodiments are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A video decoding method comprising:
    obtaining a prediction sample of a current sample in a current block according to an intra prediction mode of the current block;
    when the intra prediction mode of the current block is a lower left directional intra prediction mode and a position dependent intra prediction filtering is applied to the current block, determining a first integer sample position by using a first angle value corresponding to the lower left directional intra prediction mode and a first shift-value corresponding to a first predetermined value used to obtain the first angle value,
    determining a first reference sample at the first integer sample position from among a plurality of reference samples of an upper side of the current block as a first upper reference sample of the current sample,
    determining a first upper weight according to a vertical distance between the current sample and the first upper reference sample, and obtaining a first modified prediction sample by applying the position dependent intra prediction filtering to the current sample according to the first upper reference sample and the first upper weight;

when the intra prediction mode of the current block is an upper right directional intra prediction mode and the position dependent intra prediction filtering is applied to the current block, determining a second integer sample position by using a second angle value corresponding to the upper right directional intra prediction mode and a second shift-value corresponding to a second predetermined value used to obtain the second angle value, determining a second reference sample at the second integer sample position from among a plurality of reference samples of a left side of the current block as a first left reference sample of the current sample, determining a first left weight according to a horizontal distance between the current sample and the first left reference sample, and obtaining a second modified prediction sample by applying the position dependent intra prediction filtering to the current sample according to the first left reference sample and the first left weight;

when the intra prediction mode of the current block is a horizontal mode and the position dependent intra prediction filtering is applied to the current block, determining a second upper reference sample of the current sample based on a reference sample of the upper side of the current block, determining a second upper weight according to a vertical distance between the current sample and the second upper reference sample, and obtaining a third modified prediction sample by applying the position dependent intra prediction filtering to the current sample according to the second upper reference sample and the second upper weight; and when the intra prediction mode of the current block is a vertical mode and the position dependent intra prediction filtering is applied to the current block, determining a second left reference sample of the current sample based on a reference sample of the left side of the current block, determining a second left weight according to a horizontal distance between the current sample and the second left reference sample, and obtaining a fourth modified prediction sample by applying the position dependent intra prediction filtering to the current sample according to the second left reference sample and the second left weight.

2. A video decoding apparatus comprising:
a memory configured to store one or more instructions; and
a processor configured to:
obtain a prediction sample of a current sample in a current block according to an intra prediction mode of the current block;
when the intra prediction mode of the current block is a lower left directional intra prediction mode and a position dependent intra prediction filtering is applied to the current block, determine a first integer sample position by using a first angle value corresponding to the lower left directional intra prediction mode and a first shift-value corresponding to a first predetermined value used to obtain the first angle value,
determine a first reference sample at the first integer sample position from among a plurality of reference samples of an upper side of the current block as a first upper reference sample of the current sample,
determine a first upper weight according to a vertical distance between the current sample and the first upper reference sample, and
obtain a first modified prediction sample by applying the position dependent intra prediction filtering to the current sample according to the first upper reference sample and the first upper weight;
when the intra prediction mode of the current block is an upper right directional intra prediction mode and the position dependent intra prediction filtering is applied to the current block, determine a second integer sample position by using a second angle value corresponding to the upper right directional intra prediction mode and a second shift-value corresponding to a second predetermined value used to obtain the second angle value,
determine a second reference sample at the second integer sample position from among a plurality of reference samples of a left side of the current block as a first left reference sample of the current sample,
determine a first left weight according to a horizontal distance between the current sample and the first left reference sample, and
obtain a second modified prediction sample by applying the position dependent intra prediction filtering to the current sample according to the first left reference sample and the first left weight;
when the intra prediction mode of the current block is a horizontal mode and the position dependent intra prediction filtering is applied to the current block, determine a second upper reference sample of the current sample based on a reference sample of the upper side of the current block,
determine a second upper weight according to a vertical distance between the current sample and the second upper reference sample, and
obtain a third modified prediction sample by applying the position dependent intra prediction filtering to the current sample according to the second upper reference sample and the second upper weight; and
when the intra prediction mode of the current block is a vertical mode and the position dependent intra prediction filtering is applied to the current block, determine a second left reference sample of the current sample based on a reference sample of the left side of the current block,
determine a second left weight according to a horizontal distance between the current sample and the second left reference sample, and
obtain a fourth modified prediction sample by applying the position dependent intra prediction filtering to the current sample according to the second left reference sample and the second left weight.

3. A video encoding method comprising:
obtaining a prediction sample of a current sample in a current block according to each of a plurality of intra prediction modes;
applying a position dependent intra prediction filtering to the current block, for an intra prediction mode to which the position dependent intra prediction filtering is applied; and
determining an intra prediction mode of the current block according to the prediction sample according to each intra prediction mode to which the position dependent intra prediction filtering is applied, wherein, when the intra prediction mode of the current block is a lower left directional intra prediction mode, a first integer sample position is determined by using a first angle value corresponding to the lower left directional intra prediction mode and a first shift-value corresponding to a first predetermined value used to obtain the first angle value, a first reference sample at the first integer sample position is determined from among a plurality of reference samples of an upper side of the current block as a first upper reference sample of the current sample, a first upper weight is determined according to a vertical distance between the current sample and the first upper reference sample, and a first modified prediction sample is obtained by applying the position dependent prediction filtering to the current sample according to the first upper reference sample and the first upper weight, and when the intra prediction mode of the current block is an upper right directional intra prediction mode, a second integer sample position is determined by using a second angle value corresponding to the upper right directional intra prediction mode and a second shift-value corresponding to a second predetermined value used to obtain the second angle value, a second reference sample at the second integer sample position is determined from among a plurality of reference samples of a left side of the current block as a first left reference sample of the current sample, a first left weight is determined according to a horizontal distance between the current sample and the first left reference sample, and a second modified prediction sample is obtained by applying the position dependent intra prediction filtering to the current sample according to the first left reference sample and the first left weight;

when the intra prediction mode of the current block is a horizontal mode, a second upper reference sample of the current sample is determined based on a reference sample of the upper side of the current block, a second upper weight is determined according to a vertical distance between the current sample and the second upper reference sample, and a third modified prediction sample is obtained by applying the position dependent intra prediction filtering to the current sample according to the second upper reference sample and the second upper weight; and when the intra prediction mode of the current block is a vertical mode, a second left reference sample of the current sample is determined based on a reference sample of the left side of the current block, a second left weight is determined according to a horizontal distance between the current sample and the fourth left reference sample, and a third modified prediction sample is obtained by applying the position dependent intra prediction filtering to the current sample according to the second left reference sample and the second left weight.

4. A non-transitory computer-readable medium storing a bitstream, the bitstream being decoded by a video decoding method, the video decoding method comprising:

obtaining a prediction sample of a current sample in a current block according to an intra prediction mode of the current block;

when the intra prediction mode of the current block is a lower left directional intra prediction mode and a position dependent intra prediction filtering is applied to the current block, determining a first integer sample position by using a first angle value corresponding to the lower left directional intra prediction mode and a first shift-value corresponding to a first predetermined value used to obtain the first angle value, determining a first reference sample at the first integer sample position from among a plurality of reference samples of an upper side of the current block as a first upper reference sample of the current sample, determining a first upper weight according to a vertical distance between the current sample and the first upper reference sample, and obtaining a first modified prediction sample by applying the position dependent intra prediction filtering to the current sample according to the first upper reference sample and the first upper weight; and when the intra prediction mode of the current block is an upper right directional intra prediction mode and the position dependent intra prediction filtering is applied to the current block, determining a second integer sample position by using a second angle value corresponding to the upper right directional intra prediction mode and a second shift-value corresponding to a second predetermined value used to obtain the second angle value, determining a second reference sample at the second integer sample position from among a plurality of reference samples of a left side of the current block as a first left reference sample of the current sample, determining a first left weight according to a horizontal distance between the current sample and first the left reference sample, and obtaining a second modified prediction sample by applying the position dependent intra prediction filtering to the current sample according to the first left reference sample and the first left weight; and when the intra prediction mode of the current block is a horizontal mode and the position dependent intra prediction filtering is applied to the current block, determining a second upper reference sample of the current sample based on a reference sample of the upper side of the current block, determining a second upper weight according to a vertical distance between the current sample and the second upper reference sample, and obtaining a third modified prediction sample by applying the position dependent intra prediction filtering to the current sample according to the second upper reference sample and the second upper weight; and when the intra prediction mode of the current block is a vertical mode and the position dependent intra prediction filtering is applied to the current block, determining a second left reference sample of the current sample based on a reference sample of the left side of the current block, determining a second left weight according to a horizontal distance between the current sample and the second left reference sample, and obtaining a fourth modified prediction sample by applying the position dependent intra prediction filtering to the current sample according to the second left reference sample and the second left weight.

* * * * *